United States Patent
Motoyama et al.

(10) Patent No.: US 7,447,766 B2
(45) Date of Patent: *Nov. 4, 2008

(54) METHOD FOR EFFICIENTLY STORING INFORMATION USED TO EXTRACT STATUS INFORMATION FROM A DEVICE COUPLED TO A NETWORK IN A MULTI-PROTOCOL REMOTE MONITORING SYSTEM

(75) Inventors: Tetsuro Motoyama, Cupertino, CA (US); Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 843 days.

This patent is subject to a terminal disclaimer.

(21) Appl. No.: 10/460,150

(22) Filed: Jun. 13, 2003

(65) Prior Publication Data

US 2004/0255014 A1    Dec. 16, 2004

(51) Int. Cl.
    *G06F 15/16*      (2006.01)
    *G06F 15/177*      (2006.01)
    *G06F 15/173*      (2006.01)

(52) U.S. Cl. .................. 709/224; 709/203; 709/222; 709/223; 709/230

(58) Field of Classification Search ............... 709/201, 709/202, 203, 217–219, 220–226, 228, 230, 709/245, 250; 707/3–4; 358/1.15
See application file for complete search history.

(56) References Cited

U.S. PATENT DOCUMENTS

| | | | | |
|---|---|---|---|---|
| 5,787,248 | A | * | 7/1998 | Zupcsics et al. ............ 709/230 |
| 5,812,826 | A | * | 9/1998 | McLain, Jr. ................. 703/27 |
| 5,818,603 | A | * | 10/1998 | Motoyama .................. 358/296 |
| 5,901,286 | A | * | 5/1999 | Danknick et al. .......... 709/203 |
| 5,996,010 | A | * | 11/1999 | Leong et al. ............... 709/223 |
| 6,122,639 | A | * | 9/2000 | Babu et al. ............. 707/103 R |
| 6,212,160 | B1 | * | 4/2001 | Barbieri et al. ............ 370/217 |
| 6,317,848 | B1 | | 11/2001 | Sorens et al. |
| 6,418,486 | B1 | * | 7/2002 | Lortz et al. .................. 710/10 |
| 6,795,829 | B2 | * | 9/2004 | Alsop et al. ................ 707/102 |
| 6,889,264 | B2 | | 5/2005 | Clough et al. |

(Continued)

OTHER PUBLICATIONS

U.S. Appl. No. 10/460,150, filed Jun. 13, 2003, Motoyama et al.

(Continued)

*Primary Examiner*—John Follansbee
*Assistant Examiner*—Brendan Y Higa
(74) *Attorney, Agent, or Firm*—Oblon, Spivak, McClelland, Maier & Neustadt, P.C.

(57) ABSTRACT

A method, system, and computer program product for efficiently storing information configured to be used for a plurality of communication protocols to extract status information related to a remotely monitored device among distinct devices communicatively coupled to a network, including selecting a communication protocol among the plurality of communication protocols; determining whether information for accessing the device using the selected communication protocol is stored in an internal storage table; accessing an external information storage unit to obtain the information for accessing the device using the selected communication protocol if the determining step determines that the information for accessing the device using the selected communication protocol is not stored in the internal storage table; and storing, in the internal storage table, the information for accessing the device using the selected communication protocol obtained from the external information storage unit.

17 Claims, 43 Drawing Sheets

U.S. PATENT DOCUMENTS

| | | | |
|---|---|---|---|
| 6,892,299 B2 * | 5/2005 | Abe | 713/2 |
| 6,965,955 B1 * | 11/2005 | Nishiyama | 710/72 |
| 7,053,767 B2 | 5/2006 | Petite et al. | |
| 7,296,079 B2 * | 11/2007 | Motoyama et al. | 709/230 |
| 2003/0095524 A1 * | 5/2003 | Stephens et al. | 370/338 |
| 2004/0207866 A1 * | 10/2004 | Heiney et al. | 358/1.15 |
| 2004/0230646 A1 * | 11/2004 | Clough et al. | 709/203 |
| 2004/0255014 A1 | 12/2004 | Motoyama et al. | |

OTHER PUBLICATIONS

U.S. Appl. No. 10/670,505, filed Sep. 26, 2003, Motoyama.
U.S. Appl. No. 10/670,604, filed Sep. 26, 2003, Motoyama.
U.S. Appl. No. 10/764,582, filed Jan. 27, 2004, Motoyama et al.
U.S. Appl. No. 10/764,467, filed Jan. 27, 2004, Motoyama et al.
U.S. Appl. No. 10/764,569, filed Jan. 27, 2004, Motoyama et al.
U.S. Appl. No. 10/764,527, filed Jan. 27, 2004, Motoyama et al.
U.S. Appl. No. 11/032,039, filed Jan. 11, 2005, Motoyama et al.
U.S. Appl. No. 11/032,192, filed Jan. 11, 2005, Motoyama et al.
U.S. Appl. No. 11/032,016, filed Jan. 11, 2005, Motoyama et al.
U.S. Appl. No. 11/032,063, filed Jan. 11, 2005, Motoyama et al.
U.S. Appl. No. 11/032,088, filed Jan. 11, 2005, Motoyama et al.
U.S. Appl. No. 11/234,319, filed Sep. 26, 2005, Motoyama et al.
U.S. Appl. No. 11/234,322, filed Sep. 26, 2005, Motoyama et al.
U.S. Appl. No. 11/234,224, filed Sep. 26, 2005, Motoyama et al.
U.S. Appl. No. 11/234,323, filed Sep. 26, 2005, Motoyama et al.
U.S. Appl. No. 09/453,937, filed May 17, 2000, Motoyama et al.
U.S. Appl. No. 09/782,064, filed Feb. 14, 2001, Motoyama et al.
U.S. Appl. No. 09/756,120, filed Jan. 9, 2001, Motoyama et al.
U.S. Appl. No. 09/953,359, filed Sep. 17, 2001, Motoyama et al.
U.S. Appl. No. 10/068,861, filed Feb. 11, 2002, Motoyama et al.
U.S. Appl. No. 10/162,402, filed Jun. 5, 2002, Motoyama.
U.S. Appl. No. 10/157,903, filed May 31, 2002, Motoyama et al.
U.S. Appl. No. 10/225,290, filed Aug. 22, 2002, Motoyama.
U.S. Appl. No. 10/328,008, filed Dec. 26, 2002, Motoyama et al.
U.S. Appl. No. 10/328,026, filed Dec. 26, 2002, Motoyama et al.
U.S. Appl. No. 10/328,003, filed Dec. 26, 200, Motoyama et al.
U.S. Appl. No. 10/372,939, filed Feb. 26, 2003, Motoyama.
U.S. Appl. No. 10/460,408, filed Jun. 13, 2003, Motoyama et al.
U.S. Appl. No. 10/460,404, filed Jun. 13, 2003, Motoyama et al.
U.S. Appl. No. 10/460,151, filed Jun. 13, 2003, Motoyama et al.
U.S. Appl. No. 11/517,363, filed Sep. 8, 2006, Motoyama et al.
U.S. Appl. No. 11/517,430, filed Sep. 8, 2006, Motoyama et al.
U.S. Appl. No. 11/517,362, filed Sep. 8, 2006, Motoyama et al.
U.S. Appl. No. 11/517,378, filed Sep. 8, 2006, Motoyama et al.
U.S. Appl. No. 11/517,428, filed Sep. 8, 2006, Motoyama et al.
U.S. Appl. No. 11/833,671, filed Aug. 3, 2007, Motoyama et al.
U.S. Appl. No. 11/867,741, filed Oct. 5, 2007, Motoyama et al.
US. Appl. No. 11/960,248, filed Dec. 19, 2007, Motoyama et al.
U.S. Appl. No. 12/062,146, filed Apr. 3, 2008, Motoyama et al.

* cited by examiner std::vector <pointer of CDevice >

Vendor and Model Support For HTTP Access

Vendor and Model Data For HTTP Access

Vendor and Model Support For SNMP Access
map<string, vector<string> >

Vendor and Model Data For SNMP Access
map<string, map<string, vector<SOIDinfoType> > >

METHOD FOR EFFICIENTLY STORING INFORMATION USED TO EXTRACT STATUS INFORMATION FROM A DEVICE COUPLED TO A NETWORK IN A MULTI-PROTOCOL REMOTE MONITORING SYSTEM

CROSS-REFERENCE TO RELATED APPLICATIONS

This application is related to the following commonly owned co-pending U.S. patent applications:

1. Ser. No. 09/453,937 entitled "Method and System of Remote Diagnostic, Control, and Information Collection using a Dynamic Linked Library of Multiple Formats and Multiple Protocols with Intelligent Formatter," filed May 17, 2000;

2. Ser. No. 09/756,120 entitled "Method and System of Remote Support of Device Using Email," filed Jan. 9, 2001;

3. Ser. No. 09/782,064 entitled "Method and System of Remote Diagnostic, Control, and Information Collection using a Dynamic Linked Library of Multiple Formats and Multiple Protocols with Three-Level Formatting," filed Feb. 14, 2001;

4. Ser. No. 09/921,707 entitled "Universal Controller in The Wireless Networked Environment," filed Aug. 6, 2001;

5. Ser. No. 09/953,358 entitled "Method and System of Remote Support of Device Using Email Through Data Transfer Module," filed Sep. 17, 2001;

6. Ser. No. 09/953,359 entitled "Method and System for Remote Support of Device using Email for Sending Information Related to a Monitored Device," filed Sep. 17, 2001;

7. Ser. No. 09/975,935 entitled "Method and System for Remote Support of Device Using Email Based Upon Pop3 With Decryption Capability Through Virtual Function," filed Oct. 15, 2001;

8. Ser. No. 10/068,861 entitled "Method and Apparatus Utilizing Communication Means Hierarchy to Configure or Monitor an Interface Device," filed Feb. 11, 2002;

9. Ser. No. 10/142,989 entitled "Verification Scheme for Email Message Containing Information About Remotely Monitored Devices," filed May 13, 2002;

10. Ser. No. 10/142,992 entitled "Method for Scrambling Information about Network Devices That is Placed in Email Message," filed May 13, 2002;

11. Ser. No. 10/157,903 entitled "Method and Apparatus for Modifying Remote Devices Monitored by a Monitoring System," filed May 31, 2002;

12. Ser. No. 10/162,402 entitled "Method and System to Use HTTP and Html/Xml for Monitoring the Devices," filed Jun. 5, 2002;

13. Ser. No. 10/167,497 entitled "Method and System of Remote Position Reporting Device," filed Jun. 13, 2002, which is a continuation of Ser. No. 09/575,702 (U.S. Pat. No. 6,421,608);

14. Ser. No. 10/225,290 entitled "Method and System for Monitoring Network Connected Devices with Multiple Protocols," filed Aug. 22, 2002;

15. Ser. No. 10/328,003 entitled "Method of Accessing Information from Database to be used to Obtain Status Information from the Web Pages of Remotely Monitored Devices," filed Dec. 26, 2002;

16. Ser. No. 10/328,008 entitled "Method of using Internal Structure to Store Database Information for Multiple Vendor and Model Support for Remotely Monitored Devices," filed Dec. 26, 2002;

17. Ser. No. 10/328,026 entitled "Method of using Vectors of Structures for Extracting Information from the Web Pages of Remotely Monitored Devices," filed Dec. 26, 2002; and 18. Ser. No. 10/372,939 entitled "Method and System for Monitoring Network Connected Devices with Multiple Protocols," filed Feb. 26, 2003.

The disclosures of each of the above U.S. patents and patent applications are incorporated herein by reference in their entirety.

The present invention includes the use of various technologies referenced and described in the references identified in the following LIST OF REFERENCES by the author(s) and year of publication of the reference:

LIST OF REFERENCES

[1] Goldfart, C., *The SGML Handbook*. Clarendon Press (1990);

[2] Castro, E., *HTML for the World Wide Web*, Peachpit Press, Berkeley (1996); and

[3] Megginson, D., *Structuring XML Documents*, Prentice Hall, N.J. (1998).

The entire contents of each reference listed in the LIST OF REFERENCES are incorporated herein by reference.

BACKGROUND OF THE INVENTION

1. Field of the Invention

This invention relates to the monitoring of devices connected to a network. More particularly, it relates to a method, system, and computer program product for the remote monitoring of network-connected devices using multiple protocols.

2. Discussion of the Background

As is generally known, computer systems include hardware and software. Software includes a list of instructions that are created to operate and manage hardware components that make up a computer system. Typically, computer systems include a variety of hardware components/devices that interface with one another. The computer system can be a stand-alone type or a networked type. In a networked-type computer system, a plurality of distinct devices are connected to a network and thus communication between these distinct devices is enabled via the network.

Further, software for operating the hardware devices must be configured in order to allow communication between the hardware devices so that the hardware devices are enabled to function cooperatively. Further, in order to facilitate such a communication, it is also desirable for hardware devices to be monitored and the status of each hardware device identified in order to ensure that each hardware device is functioning in an efficient manner.

For the purposes of this patent application, the inventor has determined that a hardware device that is controlling, configuring, or monitoring the plurality of distinct devices or hardware devices would be referred to as a monitoring device and the hardware devices that are being controlled, configured, or monitored by the monitoring device would be referred to as "monitored devices."

For hardware devices that are located on a network, it is desirable for these devices to be monitored for maintenance, usage, or other purposes. However, in view of manufacturer differences relating to hardware devices and interfaces, it may be difficult for a monitoring device to communicate with various other devices connected to a network. Such a disadvantage most likely prevents network administrators from obtaining crucial information about the performance and efficiency of the devices connected to the network.

The Simple Network Management Protocol (SNMP) is today a de-facto industry standard for the monitoring and management of devices on data communication networks, telecommunication systems and other globally reachable devices. Practically every organization dealing with computers and related devices expects to be able to centrally monitor, diagnose, and configure each such device across local- and wide-area networks. SNMP is the protocol that enables this interaction.

In order for a device to respond to SNMP requests, it is desirable to equip the device with the software that enables it to properly interpret an SNMP request, perform the actions required by that request, and produce an SNMP reply. The SNMP agent software is typically a subsystem software module residing in a network entity.

The collection of objects implemented by a system is generally referred to as a Management Information Base (MIB). An MIB may also be a database with information related to the monitoring of devices. Examples of other MIB's include Ethernet MIB, which focuses on Ethernet interfaces; Bridge MIB, which defines objects for the management of 802.1D bridges, to name a few.

Using SNMP for monitoring devices is difficult as private MIB's include values that are hard to decipher without a valid key. A company using SNMP for monitoring various devices connected to its network creates a unique identifier/key that is maintained as proprietary information of the company. For the most part, the results are displayed as binary or integer values. Thus, using SNMP, results received from the devices that are being monitored ("monitored devices") fail to provide a user with the status of the monitored devices in a user comprehensible manner. Further, using SNMP, it is difficult for one to obtain detailed information about a monitored device without a valid key or access to a private MIB to decipher the results obtained as binary or integer values. In addition, a given protocol (e.g., SNMP or HTTP/HTML) may fail for various reasons, such as time out or lost packets. Thus, when the monitoring of a device is accomplished using multiple protocols in sequence in response to a failure, some information extracted from a given device using the multiple protocols may be duplicated for each protocol. Accordingly, if the extraction of data from the device is not properly managed in such situations, time and memory inefficiencies result since some protocols require more resources than other protocols. In addition, information extraction using some protocols may require much less processing and memory than using others.

SUMMARY OF THE INVENTION

The system and method of the present invention addresses solutions to the above-identified problems by enabling monitoring of devices that are connected to a network. Accordingly, a method of monitoring a device among distinct devices communicatively coupled to a network is described.

The method includes accessing a first database via a hardware access module, the first database being configured to support a plurality of communication protocols. The first database is stored with information used by the plurality of communication protocols in order to obtain various information, such as manufacturer and model information of a monitored device. A communication protocol is selected from among a plurality of communication protocols, and the selected communication protocol is configured to receive status information from the monitored device. The method further includes accessing the monitored device using the selected communication protocol and information from the first database, receiving status information from the accessed device, and storing the received status information in a second database (DeviceODBC).

In another embodiment, the present invention provides a method of monitoring a device among distinct devices communicatively coupled to a network. A plurality of communication protocols may be used to retrieve information from a monitored device. For example, an SNMP protocol is first selected to access a monitored device, and device information that is configured to be efficiently retrieved using the SNMP protocol is obtained. Subsequently, an HTTP protocol is selected to obtain information that was incapable of efficient retrieval using the SNMP protocol. The selection of protocols is performed by a protocol manager in conjunction with support information stored in a database.

In the present invention, a monitoring system enables the monitoring of at least one device (monitored device) connected to a network, such as, for example, a LAN or a WAN. The monitored device is configured to have a unique IP address. The IP address allocated to the monitored device, and the details of the vendor/manufacturer for the monitored device, are stored in a database. By scanning the network and interrogating the devices the IP addresses of the devices can be obtained. Such methods are well-known. Therefore, it is assumed that IP addresses of the devices to be monitored are already acquired and stored in a database.

The present invention specifies how to extract necessary information from the HTML information received from a monitored device. Once a web page location of the monitored device is accessed (i.e., through the IP address and the specified port), a specific web page corresponding to the monitored device is displayed. Information in the web page is in the form of key and value pairs. For example, the toner level may be shown as "Black 100%" in the color printer web page. An HTML/XML parser is used to parse the page in order to retrieve required information from the information in the web page. The required information and parameter values extracted from the web page using the HTML/XML parser are stored in the DeviceODBC database.

In one aspect of the present invention, a method of monitoring a network connected device among distinct devices is described. The method includes accessing a first database via a hardware access module, the first database being configured to support a plurality of communication protocols. The first database is stored with information used by the plurality of communication protocols in order to determine various information, including the manufacturer and model information of a monitored device. A communication protocol is selected from among a plurality of communication protocols, the selected communication protocol being used to receive various information, including status information from the monitored device. The method further includes accessing the monitored device using the selected communication protocol and information from the first database, receiving status information from the accessed device, and storing the received status information in a second database.

In another aspect of the present invention, a system for monitoring a device among distinct devices communicatively coupled to a network is provided. The system includes a first database configured to support a plurality of communication protocols, the first database having information used by the plurality of communication protocols in order to extract information related to the device. The device is accessed using a communication protocol selected from a plurality of communication protocols in order to receive various information, such as manufacturer, model, unique ID, and status information from the device. Information from the first database supporting the communication protocol is also used. The system further includes a hardware access module for receiving status information from the device in the form of data strings, a processor for processing the data strings in order to extract status information values of the device using information from the first database, and a second database for storing the extracted status information values.

The present invention also identifies various vendors of monitored devices and the device models that are supported by the monitoring system as described herein. Since various vendors of the monitored devices present information about a monitored device in a vendor-specific manner, the present invention enables the identification of the vendor and model of the monitored device to determine the operational status of the monitored device.

According to an aspect of the present invention, there is provided a method, system, and computer program product for extracting requested information associated with a remotely monitored device communicatively coupled to a network, comprising: (1) obtaining an IP address of the device; (2) accessing the device using an HTTP protocol and the IP address to obtain an information string associated with the device; (3) extracting the requested information from the information string; (4) extracting additional device information from the information string, wherein the additional device information was not requested; and (5) caching the requested information, the additional device information, and the IP address.

According to a further aspect of the present invention, there is provided a method, system, and computer program product for efficiently storing information configured to be used by a plurality of communication protocols to extract status information related to a remotely monitored device among distinct devices communicatively coupled to a network, comprising: (1) selecting a communication protocol among the plurality of communication protocols; (2) determining whether information for the selected communication protocol is stored in an internal storage table; (3) accessing an external information storage unit to obtain the information for accessing the device using the selected communication protocol if the determining step determines that the information for accessing the device using the selected communication protocol is not stored in the internal storage table; and (4) accessing the internal storage table to obtain the information for accessing the device using the selected communication protocol if the determining step determines that the information for accessing the device using the selected communication protocol is stored in the internal storage table.

According to another aspect of the present invention, there is provided a method, system, and computer program product for parsing an information string to extract requested information related to a remotely monitored device communicatively coupled to a network, comprising: (1) accessing the device using an HTTP protocol to obtain an information string associated with the device; (2) determining, based on a type of the requested information, data extraction information for optimally extracting the requested information from the device; (3) parsing the information string according to the data extraction information to identify substrings within the information string; and (4) determining the requested information based on the information string, identified substrings, and the data extraction information.

According to still another aspect of the present invention, there is provided a method, system, and computer program product for efficiently extracting status information related to a remotely monitored device communicatively coupled to a network, comprising: (1) determining requested first status values to be obtained from the device using a first communication protocol among a plurality of communication protocols; (2) determining requested second status values to be obtained from the device using a second communication protocol among the plurality of communication protocols; (3) accessing the device to extract the requested first status values using the first communication protocol; (4) storing, in a device status map, each extracted first status value in association with a respective unique identifier; and (5) accessing the device using the second communication protocol to extract those status values of the requested second status values not stored in the device status map.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein.

DETAILED DESCRIPTION OF THE PREFERRED EMBODIMENTS

Figure 1:
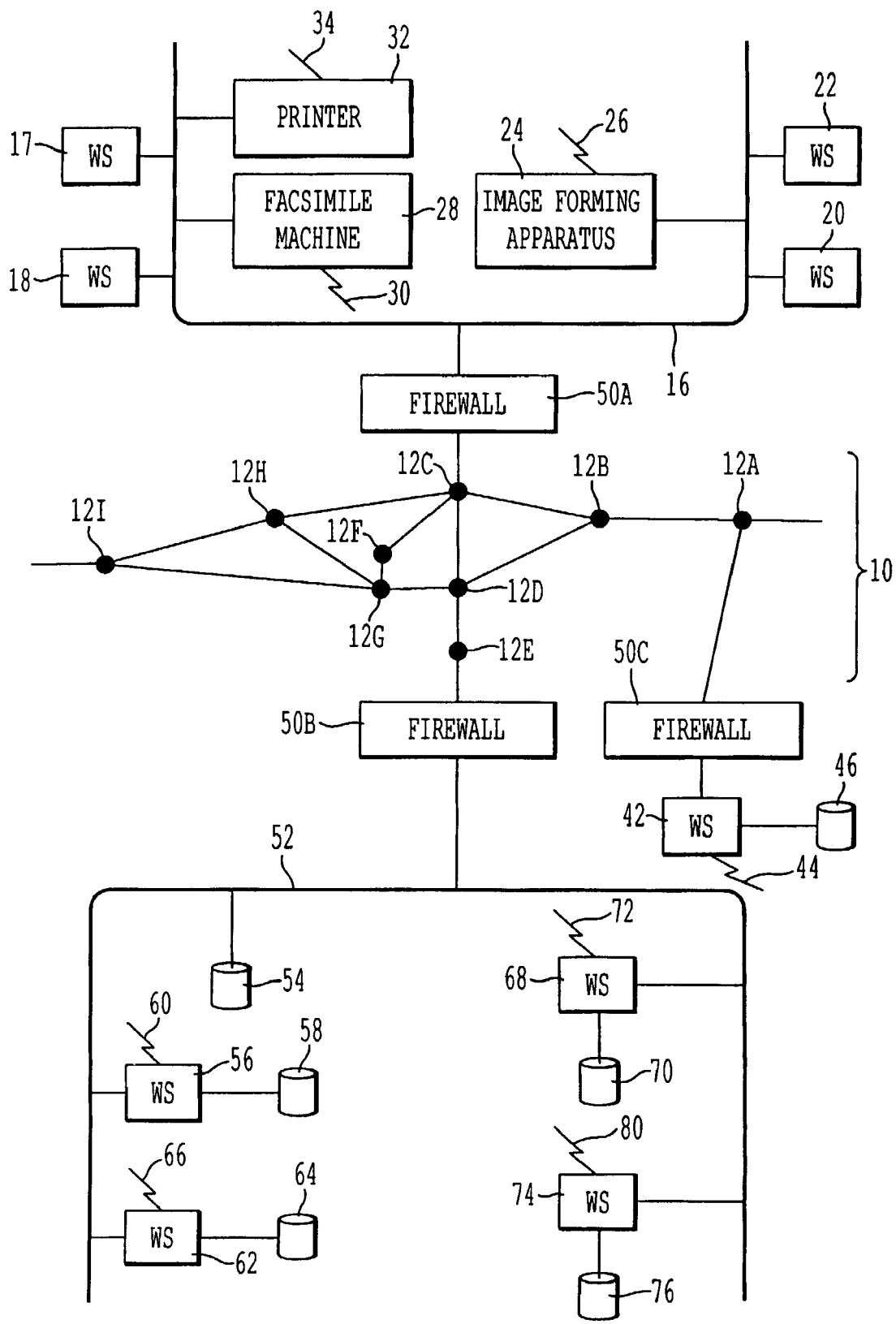
FIG. 1 illustrates three networked business office devices connected to a network of computers and databases through the Internet.

FIG. 1 illustrates a schematic having various devices and computers for monitoring, diagnosing, and controlling the operation of the devices. Specifically, FIG. 1 includes a first network 16, such as a Local Area Network (LAN) connected to computer workstations 17, 18, 20, and 22. The workstations can be any type of computers including, e.g., Personal Computer devices, Unix-based computers, Linux-based computers, or Apple Macintoshes. Also connected to the network 16 are a digital image-forming apparatus 24, a facsimile machine 28, and a printer 32. As would be appreciated by one of ordinary skill in the art, two or more of the components of the digital image forming apparatus 24 and the facsimile machine 28 can be combined into a unified "image forming apparatus." For example, the image forming apparatus 24, facsimile machine 28, the printer 32, and the workstations 17, 18, 20, and 22 may be referred to as machines or monitored devices. In some configurations, one or more workstations may be converted to business office appliances. In addition, any network business office appliance/device can be attached to the network 16.

One example of such a business office appliance is eCabinet® from Ricoh Corporation. Also, a facsimile server (not illustrated) may be connected to the network 16 and have a telephone, cable, or wireless connection. Each of the digital image forming apparatus 24, facsimile machine 28, and printer 32, in addition to being connected to the network 16, may also include conventional telephone and/or cable and/or wireless connections 26, 30, and 34, respectively. As explained below, the monitored devices 24, 28, and 32, communicate with a remote monitoring, diagnosis, and control station, also referred to as a monitoring device, through, for example, the Internet via the network 16 or by a direct telephone, wireless, or cable connection.

In another exemplary business environment, monitored devices may include such devices as a multi-function imaging device, a scanner, a projector, a conferencing system, and a shredder. In another application, the network 16 may be a home network where monitored devices are meters (electricity, gas, water) or appliances such as, for example, microwave oven, washer, dryer, dishwasher, home entertainment system, refrigerator, rice cooker, heater, air condition, water heater, security camera.

In FIG. 1, a wide area network (WAN) (e.g., the Internet or its successor) is generally designated by 10. The WAN 10 can be either a private WAN, a public WAN, or a hybrid type. The WAN 10 includes a plurality of interconnected computers and routers designated by 12A-12I. The manner of communicating over a WAN is known through a series of Request for Comments (RFC) documents available from the Internet Engineering Task Force (IETF) at www.ietf.org/rfc.html, including RFC 821, entitled "Simple Mail Transfer Protocol"; RFC 822, entitled "Standard for the Format of ARPA Internet Text Message"; RFC 959, entitled "File Transfer Protocol (FTP)"; RFC 2045, entitled "Multipurpose Internet Mail Extensions (MIME) Part One: Format of Internet Message Bodies"; RFC 1894, entitled "An Extensible Message Format for Delivery Status Notifications"; RFC 1939, entitled "Post Office protocol—Version 3"; RFC 2068, "Hypertext Transfer Protocol—HTTP/1.1"; and RFC 2298, entitled "An Extensible Message Format for Message Disposition Notifications." The contents of each of these references are incorporated herein by reference.

Transmission Control Protocol/Internet Protocol (TCP/IP) related communication is described, for example, in the book "TCP/IP Illustrated," Vol. 1, The Protocols, by W. R. Stevens, from Addison-Wesley Publishing Company, 1994, the entire contents of which is incorporated herein by reference. Volumes 1-3 of "Internetworking with TCP/IP" by Comer and Stevens are also incorporated herein by reference in their entirety.

Continuing to refer to FIG. 1, a firewall 50A is connected between the WAN 10 and the network 16. A firewall is a device that allows only authorized computers on one side of the firewall to access a network, computers, or individual parts on the other side of the firewall. Firewalls are known and commercially available devices and/or software (e.g., ZoneAlarm from Zone Labs). Similarly, firewalls 50B and 50C separate the WAN 10 from a network 52 and a workstation 42, respectively. Additional details on firewalls can be found in "Firewalls and Internet Security" by W. R. Cheswick, and S. M. Bellovin, 1994, AddisonWesley Publishing, and "Building Internet Firewalls" by D. B. Chapman and E. D. Zwicky, 1995, O'Reilly & Associates, Inc. The entire contents of those two references are incorporated herein by reference.

The network 52 is a conventional network and includes a plurality of workstations 56, 62, 68, and 74. These workstations may be located in a distributed fashion within different departments (e.g., marketing, manufacturing, design engineering, and customer service departments) within a single company. In addition to the workstations connected via the network 52, a workstation 42 that is not directly connected to the network 52 is also provided. Information in a database stored in a disk 46 connected to the workstation 42 may be shared using proper encryption and protocols over the WAN 10 to the workstations connected directly to the network 52. Also, the workstation 42 includes a direct connection to a telephone line and/or a cable network and/or a wireless network 44, and the database in disk 46 may be accessed through the telephone line, the cable network, or via the wireless network 44. The cable network used by this invention may be implemented using a cable network that is typically used to carry television programming, a cable that provides for high-speed communication of digital data typically used with computers or the like, or any other desired type of cable.

In another embodiment, the workstation 42 can be a laptop computer, a PDA, a palm top computer, or a cellular phone with network capability. These devices may be used to access information stored in the database stored in the disk 46.

Information related to the business office machines, business devices or business office appliances 24, 28, and 32, respectively, may be stored in one or more of the databases stored in the disks 46, 54, 58, 64, 70, and 76. Known databases include (1) SQL databases by Microsoft, IBM, Oracle, and Sybase; (2) other relational databases; and (3) non-relational databases (including object-oriented databases from Objectivity, JYD Software Engineering, and Orient Technologies). Each of the customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. For example, disk 64 may be stored with a marketing database, disk 58 may be stored with a manufacturing database, disk 70 may be stored with an engineering database, and disk 76 may be stored with a customer service database. Alternatively, the disks 54 and 46 may be stored with one or more of the databases.

In addition to the workstations 56, 62, 68, 74, and 42 being connected to the WAN 10, these workstations may also include a connection to a telephone line, cable, or wireless networks for providing a secure connection to a machine/device being monitored, diagnosed, and/or controlled. Additionally, if one of the communication media is not operating properly, one of the others may be automatically used, as a backup, for communication.

A feature of the present invention is the use of a "store-and-forward" mode of communication (e.g., Internet electronic mail, also referred to herein as e-mail) or transmission between a machine and a computer/monitoring system for diagnosing and controlling the machine. Alternatively, the message which is transmitted may be implemented using a mode of communication that makes direct, end-to-end connections (e.g., using a socket connection to the ultimate destination) such as FTP and Hyper Text Transfer Protocol (HTTP).

Figure 2:
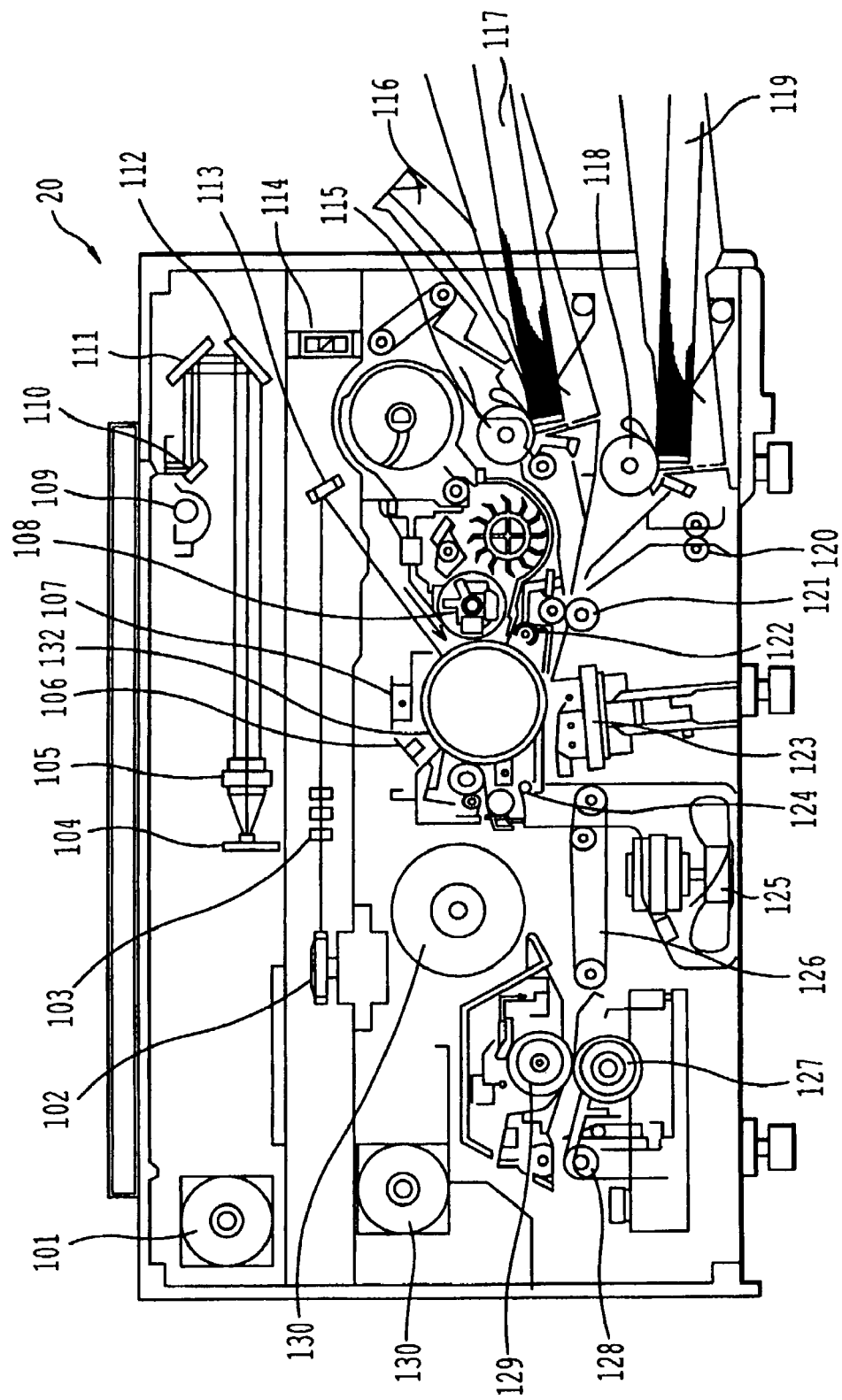
FIG. 2 illustrates the components of a digital image forming apparatus.

FIG. 2 illustrates the mechanical layout of the digital image forming apparatus 24 illustrated in FIG. 1. In FIG. 2, 101 is a fan for the scanner, 102 is a polygonal mirror used with a laser printer, and 103 designates an F θ lens used to collimate light from a laser (not illustrated). Reference numeral 104 designates a sensor for detecting light from the scanner. Reference numeral 105 designates a lens for focusing light from the scanner onto the sensor 104, and reference numeral 106 designates a quenching lamp used to erase images on the photoconductive drum 132. There is a charging corona unit 107 and a developing roller 108. Reference numeral 109 designates a lamp used to illustrate a document to be scanned and elements 110, 111, and 112 designate mirrors for reflecting light onto the sensor 104. A drum mirror 113 is provided to reflect light to the photoconductive drum 132 originating from the polygon mirror 102. A fan 114 is used to cool the charging area of the digital image forming apparatus, and a first paper feed roller 115 is used for feeding paper from the first paper cassette 117, and a reference numeral 116 designates a manual feed table. Similarly, a second feed paper feed roller 118 is used in conjunction with the second cassette 119. Reference numeral 120 designates a relay roller, 121 designates a registration roller, 122 designates an image density sensor, and 123 designates a transfer/separation corona unit. Reference numeral 124 designates a cleaning unit, 125 designates a vacuum fan, 126 designates a transport belt, 127 designates a pressure roller; and 128 designates an exit roller. A hot roller 129 is used to fix toner onto the paper, 130 designates an exhaust fan, and a main motor 131 is used to drive the digital image forming apparatus 24.

Figure 3:
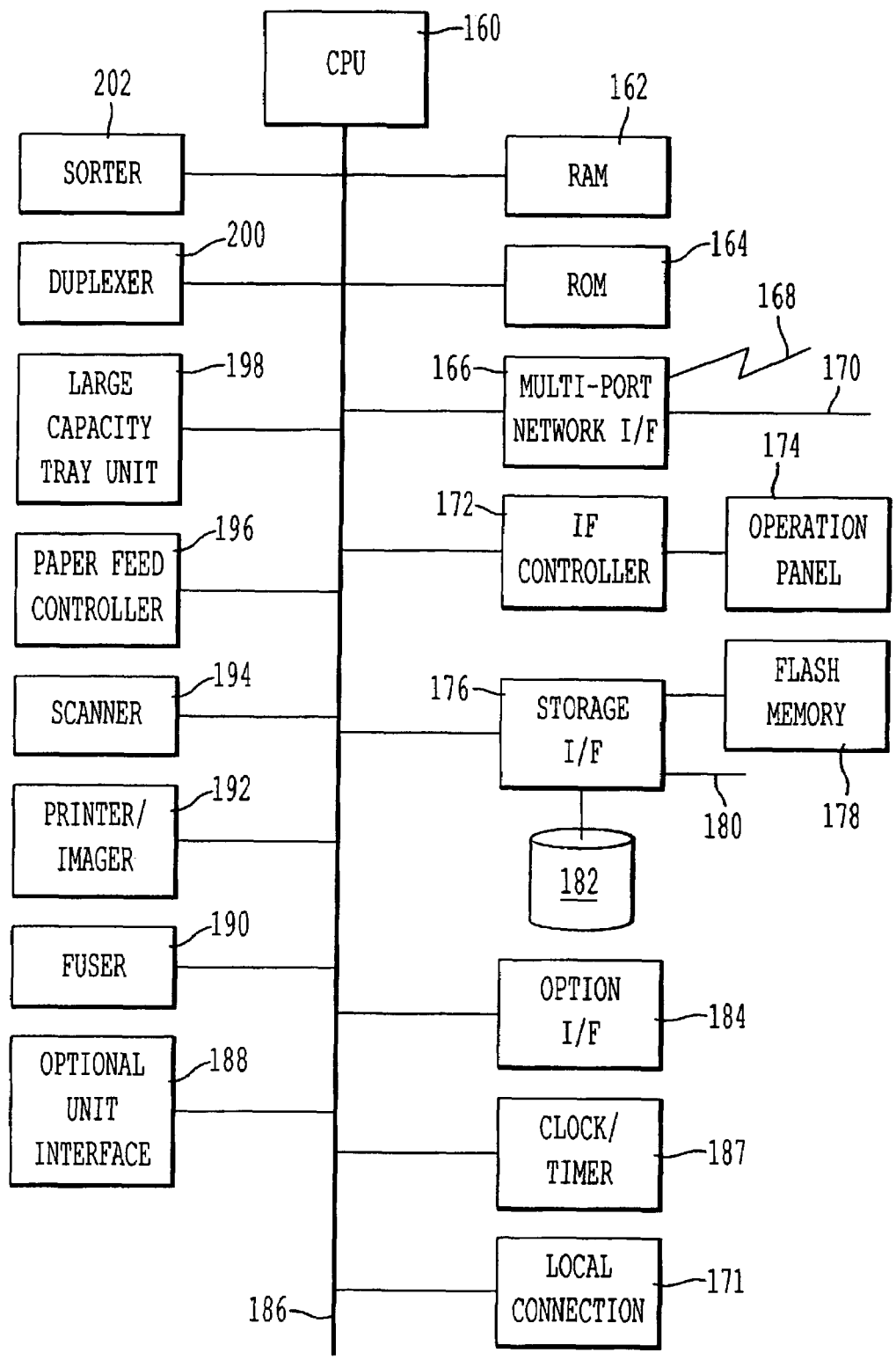
FIG. 3 illustrates the electronic components of the digital image forming apparatus illustrated in FIG. 2.

FIG. 3 is a block diagram illustrating the electronic components of the digital image forming apparatus 24 of FIG. 2, wherein CPU 160 is a microprocessor that acts as a controller of the apparatus. Random access memory (RAM) 162 stores dynamically changing information including operating parameters of the digital image forming apparatus 24. A non-volatile memory (e.g., a read only memory (ROM) 164 or a Flash Memory) stores program code used to run the digital image forming apparatus as well as static-state data, describing the image forming apparatus 24 (e.g., the model number, serial number of the copier, and default parameters).

A multi-port network interface 166 is provided to enable the digital image forming apparatus 24 to communicate with external devices through at least one communication network. Reference number 168 represents a telephone, or cable line, and numeral 170 represents another type of network different from the network identified at 168. Additional details of the multi-port network interface are set forth with respect to FIG. 4. An interface controller 172 is used to connect an operation panel 174 to a system bus 186. The operation panel 174 includes standard input and output devices found on a digital image forming apparatus 24 including a copy button, keys to control the operation of the image forming apparatus such as, for example, number of copies, reduction/enlargement, darkness/lightness, etc. Additionally, a liquid crystal display may be included within the operation panel 174 to display parameters and messages of the digital image forming apparatus 24 to a user.

A local connection interface 171 is a connection through local ports such as RS232, the parallel printer port, USB, and IEEE 1394. FireWire (IEEE 1394) is described in Wickelgren, I., "The Facts About "FireWire", IEEE Spectrum, April 1997, Vol. 34, Number 4, pp. 19-25, the entire contents of which are incorporated herein by reference. Preferably, a "reliable" communication protocol is used which includes error detection and retransmission.

A storage interface 176 connects storage devices to the system bus 186. For example, the storage devices include a flash memory 178, which can be substituted by a conventional Electrically Erasable Programmable Read Only Memory (EEPROM), and a disk 182. The disk 182 may be a hard disk, optical disk, and/or a floppy disk drive. Additional memory devices may be connected to the digital image forming apparatus 24 via connection 180. The flash memory 178 is used to store semi-static state data that describes parameters of the digital image forming apparatus 24 that infrequently change over the life of the apparatus 24. Such parameters include, for example, the options and configuration of the digital image forming apparatus. An option interface 184 allows additional hardware, such as an external interface, to be connected to the digital image forming apparatus 24. A clock/timer 187 is utilized to keep track of both the time and date and also to measure elapsed time.

FIG. 3 also illustrates the various sections making up the digital image forming apparatus 24. Reference numeral 202 designates a sorter and contains sensors and actuators that are used to sort the output of the digital image forming apparatus 24. A duplexer 200 allows performance of a duplex operation. The duplexer 200 includes conventional sensors and actuators. A large capacity tray unit 198 is provided for allowing paper trays holding a large number of sheets. As with the duplexer 200, the tray unit 198 includes conventional sensors and actuators as well.

A paper feed controller 196 is used to control the operation of feeding paper into and through the digital image forming device. A scanner 194 is used to scan images into the digital image forming device and includes conventional scanning elements such as a light, mirror, etc. Additionally, scanner sensors are used such as a home position sensor to determine that the scanner is in the home position, and a lamp thermistor is used to ensure proper operation of the scanning lamp. A printer/imager 192 prints the output of the digital image forming device, and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming device such as an automatic document feeder, a different type of sorter/collator, or other elements which can be added to the digital image forming device. Other elements include a GPS unit that can identify the location of the device.

Figure 4:
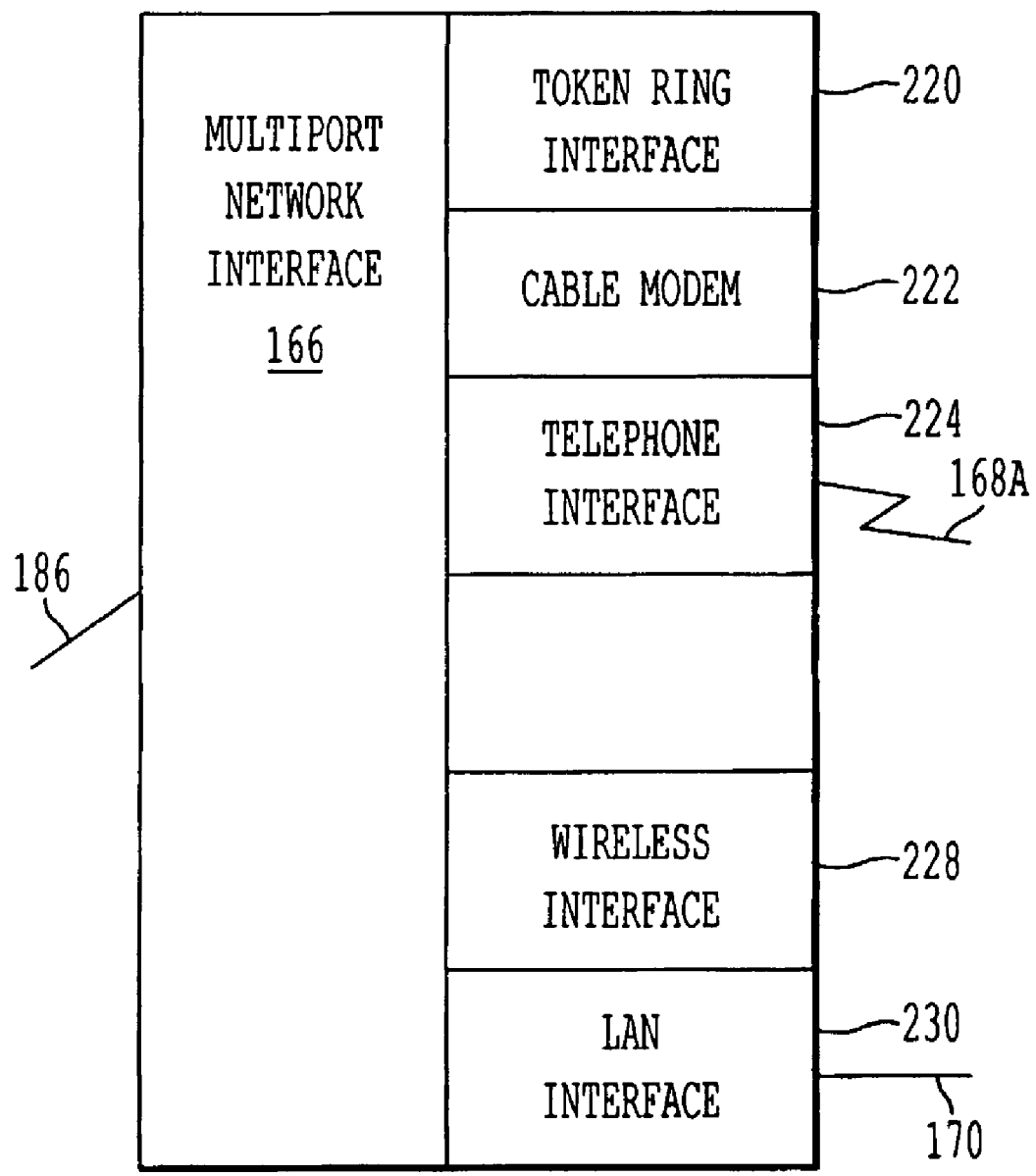
FIG. 4 illustrates details of a multi-port communication interface illustrated in FIG. 3.

FIG. 4 illustrates details of the multi-port network interface 166. The digital image forming device may communicate to external devices through a token ring interface 220, a cable modem unit 222, which has a high speed connection over cable, a conventional telephone interface 224, which connects to a telephone line 168A, a wireless interface 228, or an Ethernet interface 230, which connects to a LAN 170. Other interfaces may include, but are not limited to, a Digital Subscriber Line (DSL) (original DSL, concentric DSL, and asymmetric DSL). A single device which connects to both a Local Area Network and a telephone line is commercially available from Intel and is known as Intel Pro 10/100+Modem.

The CPU or other microprocessor or circuitry executes a monitoring process to monitor the state of each of the sensors of the digital image forming device, and a sequencing process is used to execute the instructions of the code used to control and operate the digital image forming device. Additionally, there is (1) a central system control process executed to control the overall operation of the digital image forming device, and (2) a communication process used to assure reliable communication to external devices connected to the digital image forming device. The system control process monitors and controls data storage in a static state memory (e.g., the ROM 164 of FIG. 3), a semi-static memory (e.g., the flash memory 178 or disk 182), or the dynamic state memory (e.g., a volatile or non-volatile memory (e.g., the RAM 162, the flash memory 178, or disk 182). Additionally, the static state memory may be a device other than the ROM 164 such as a non-volatile memory including either of the flash memory 178 or disk 182.

The above details have been described with respect to a digital image forming device, but the present invention is equally applicable to other business office machines or devices such as an analog copier, a facsimile machine, a scanner, a printer, a facsimile server, projector, conferencing equipment, shredder, or other business office machines, a business office appliance, or other appliances (e.g., a microwave oven, VCR, digital camera, cellular phone, palm top computer). Additionally, the present invention includes other types of devices that operate using store-and-forward or direct connection-based communication. Such devices include metering systems (including gas, water, or electricity metering systems), vending machines, or any mechanical device (e.g., automobiles) that needs to be monitored during operation or remote diagnosis. In addition to monitoring special purpose machines and computers, the invention can be used to monitor, control, and diagnose a general purpose computer that would be the monitored and/or controlled device.

Figure 5:
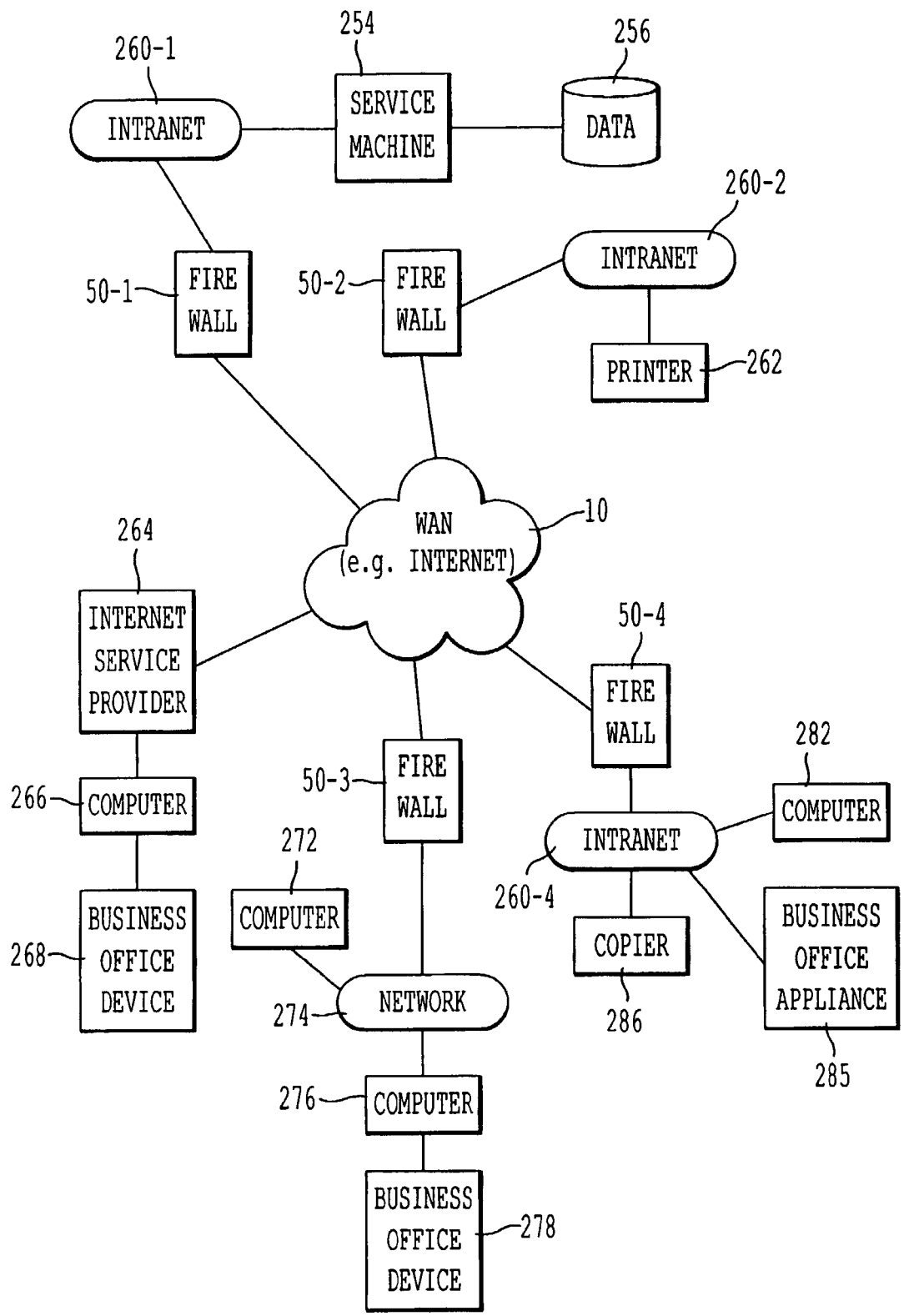
FIG. 5 illustrates an alternative system configuration in which business office devices are either connected directly to the network or connected to a computer which is connected to the network.

FIG. 5 illustrates an alternative system diagram of the present invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 50-1 connected to an intranet 260-1. A service machine 254 connected to the intranet 260-1 includes therein, or has connected thereto, data 256 that may be stored in a database format. The data 256 includes history, performance, malfunction, and any other information such as statistical information of the operation or failure or set-up of the monitored devices, or configuration information such as which components or optional equipment is included with the monitored devices. The service machine 254 may be implemented as the device or computer that requests the monitored devices to transmit data, or that requests that remote control and/or diagnostic tests be performed on the monitored devices. The service machine 254 may be implemented as any type of device, and is preferably implemented using a computerized device such as a general purpose computer.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer).

An alternate type of sub-system includes the use of an Internet Service Provider 264, which may be any type of Internet Service Provider (ISP), including known commercial companies such as America Online, Earthlink, and Niftyserve. In this sub-system, a computer 266 is connected to the ISP 264 through a digital or analog modem (e.g., a telephone line modem, a cable modem, modems which use any type of wires such as modems used over an Asymmetric Digital Subscriber Line (ADSL), modems that use frame relay communication, wireless modems such as a radio frequency modem, a fiber optic modem, or a device that uses infrared light waves). Further, a business office device 268 is connected to the computer 266. As an alternative to the business office device 268 (or any other device illustrated in FIG. 5), a different type of machine may be monitored or controlled such as a digital copier, any type of appliance, security system, or utility meter, such as an electrical, water, or gas utility meter, or any other device discussed herein.

Also illustrated in FIG. 5 is a firewall 50-3 connected to a network 274. The network 274 may be implemented as any type of computer network, (e.g., an Ethernet or token ring network). Networking software that may be used to control the network includes any desired networking software including software commercially available from Novell or Microsoft. The network 274 may be implemented as an intranet, if desired. A computer 272 connected to the network 274 may be used to obtain information from a business office device 278 and generate reports such as reports showing problems that occurred in various machines connected to the network, and a monthly usage report of the devices connected to the network 274. In this embodiment, a computer 276 is connected between the business office device 278 and the network 274. This computer receives communications from the network and forwards the appropriate commands or data, or any other information, to the business office device 278.

Communication between the business office device 278 and the computer 276 may be accomplished using wire-based or wireless methods including, but not limited to, radio frequency connections, electrical connections, and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique disclosed in the Bluetooth Specification (available at the World Wide Web site www.bluetooth.com), which is incorporated herein by reference.

Another sub-system illustrated in FIG. 5 includes a firewall 50-4, an intranet 260-4, a computer 282 connected thereto, a business office appliance 285 and a copier 286. The computer 282 may be used to generate reports and request diagnostic or control procedures. These diagnostic and control procedures may be performed with respect to the business office appliance 285 and the copier 286 or any of the other devices illustrated in or used with FIG. 5. While FIG. 5 illustrates a plurality of firewalls, the firewalls are preferable, but optional equipment, and therefore, the invention may be operated without the use of firewalls, if desired. For the monitoring and controlling of the networked equipment, any computers (266, 272, or 282) can be used instead of 254.

Figure 6A:
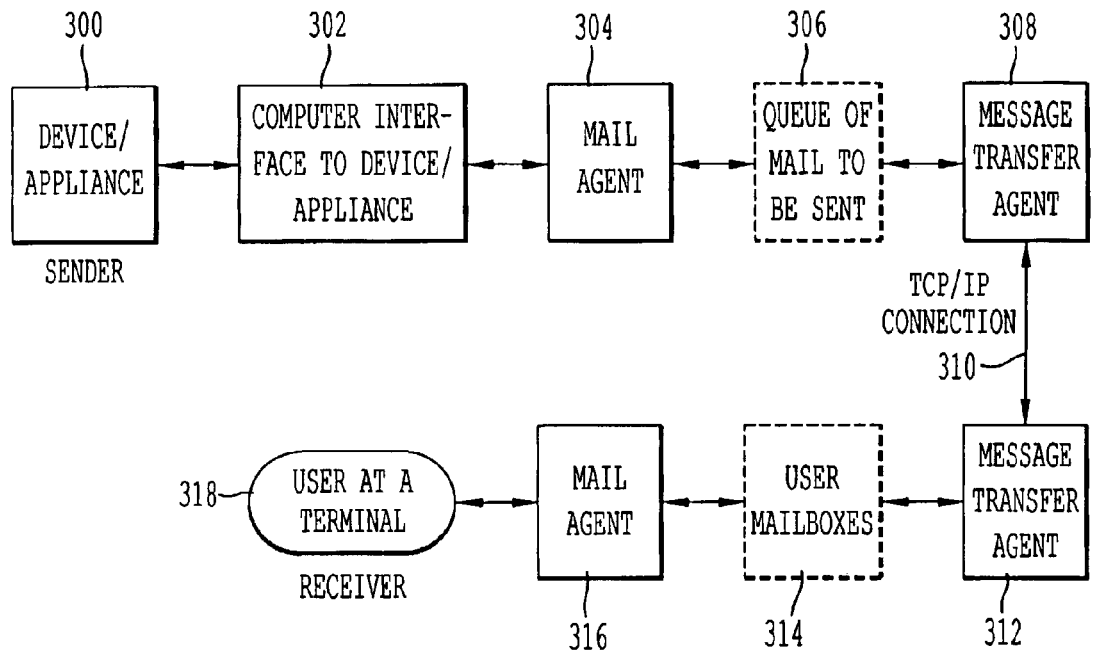
FIG. 6A is a block diagram illustrating a flow of information to and from an application unit using electronic mail.
Figure 28:
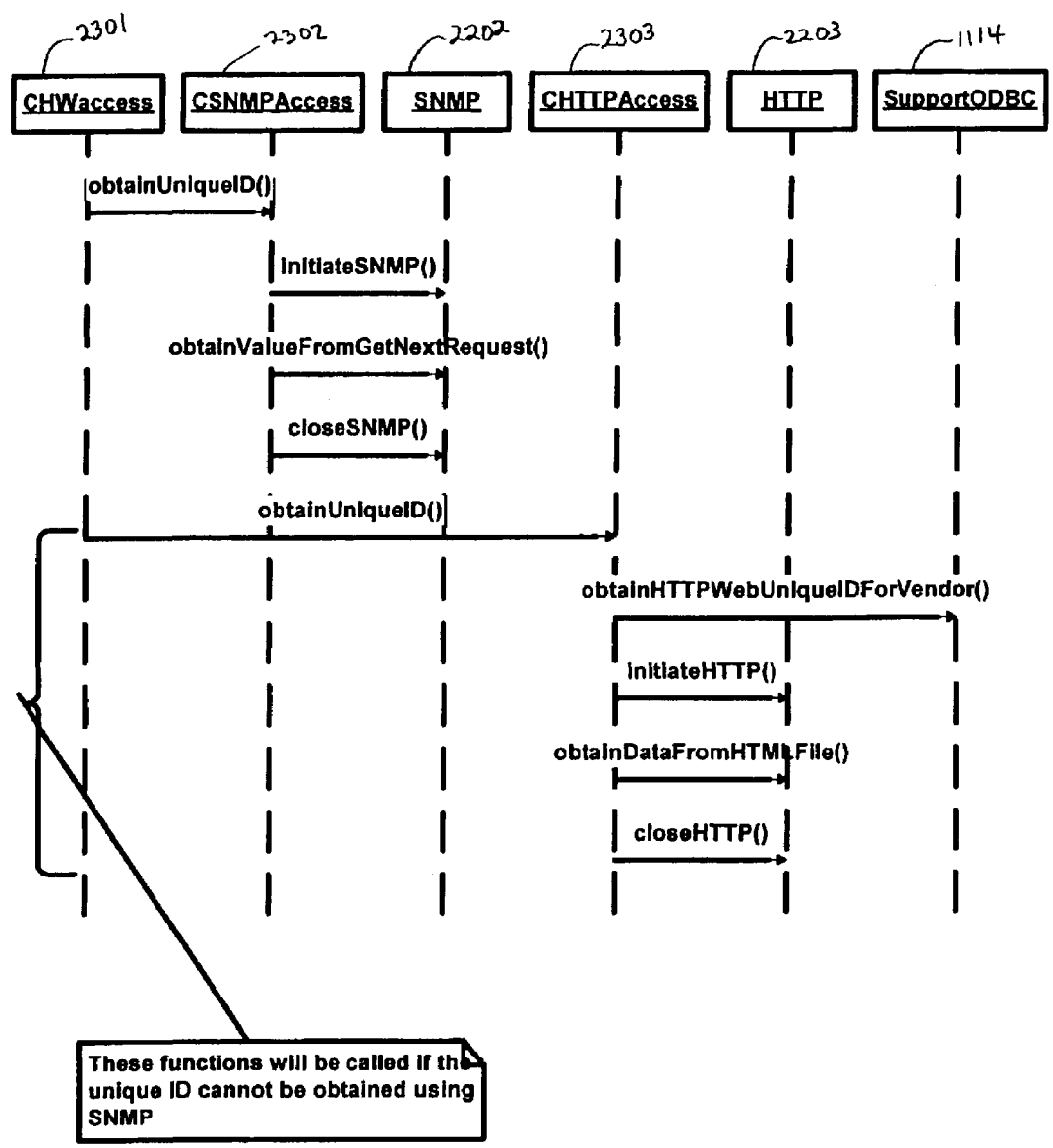
FIG. 28 illustrates the sequence to obtain a unique ID from a device, first through SNMP and second, if SNMP fails, through HTTP, according to the present invention.

FIG. 6A illustrates a device/appliance 300 connected to a typical e-mail exchange system, which includes components 302, 304, 306, 308, 310, 312, 314, 316, and 318, which may be implemented in a conventional manner, and are adapted from FIG. 28.1 of Stevens, above. A computer interface 302 interfaces with any of the application units or devices/appliances 300 described herein. While FIG. 6A illustrates that the device/appliance 300 is the sender, the sending and receiving functions may be reversed in FIG. 6A. Furthermore, if desired, the user may not need to interface with the device/appliance 300 at all. The computer interface 302 then interacts with a mail agent 304. Popular mail agents for Unix include MH, Berkeley Mail, Elm, and Mush. Mail agents for the Windows family of operating systems include Microsoft Outlook and Microsoft Outlook Express. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP/IP connection 310. Notably, the communication between the message transfer agents 308 and 312 may occur over any size network (e.g., WAN or LAN). Further, the message transfer agents 308 and 312 may use any communication protocol. In one embodiment the present invention, elements 302 and 304 of FIG. 6A reside in the library to monitor the usage of the application unit.

From the message transfer agent 312, e-mail messages are stored in user mailboxes 314, which are transferred to the mail agent 316 and ultimately transmitted to the user at a terminal 318 which functions as a receiving terminal.

This "store-and-forward" process relieves the sending mail agent 304 from having to wait until a direct connection is established with the mail recipient. Because of network delays, the communication could require a substantial amount of time during which the application would be unresponsive. Such delays in responsiveness may generally be unacceptable to users of the application unit. By using e-mail as the store-and-forward process, retransmission attempts after failures occur automatically for a fixed period of time (e.g., three days). In an alternate embodiment, the application can avoid waiting by passing communicating requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include Telnet, File Transfer Protocol (FTP), and Hyper Text Transfer Protocol (HTTP).

Public WANs, such as the Internet, are generally not considered to be secure. Therefore, if it is desired to keep messages confidential, messages transmitted over the public WANs (and multi-company private WANs) can be encrypted. Encryption mechanisms are known and commercially available and may be used with the present invention. For example, a C++ library function, crypt( ), is available from Sun Microsystems for use with the Unix operating system. Encryption and decryption software packages are known and commercially available and may also be used with this invention. One such package is PGP available from PGP Corporation.

Figure 6B:
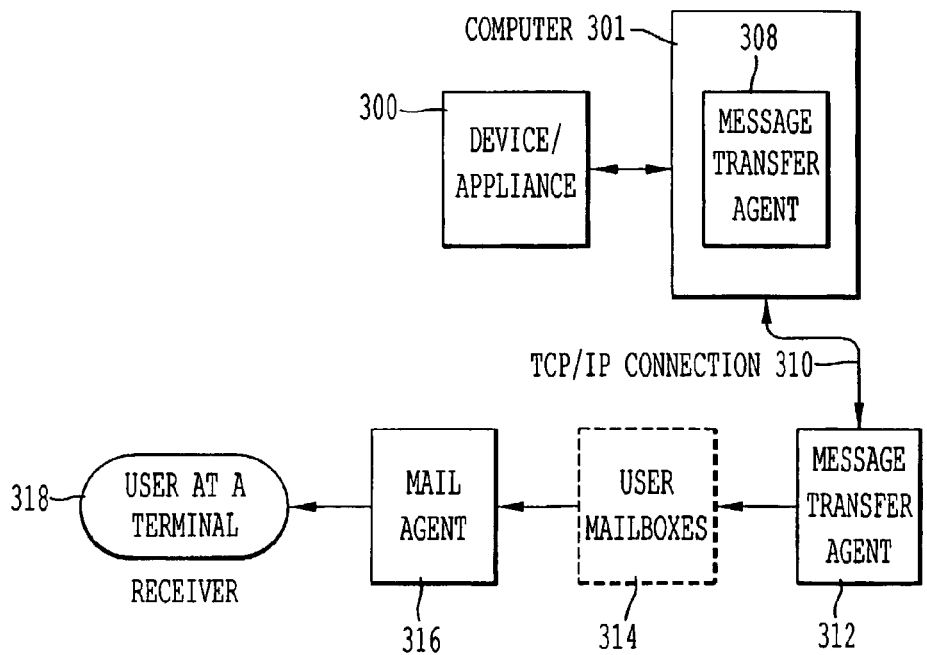
FIG. 6B illustrates an alternative way of communicating using electronic mail in which a computer that is connected to the application unit also serves as a Message Transfer Agent (MTA)

As an alternative to the general structure of FIG. 6A, a single computer that functions as the computer interface 302, the mail agent 304, the mail queue 306, and the message transfer agent 308 may be used. As illustrated in FIG. 6B, the device/appliance 300 is connected to a computer 301, which includes the message transfer agent 308.

Figure 6C:
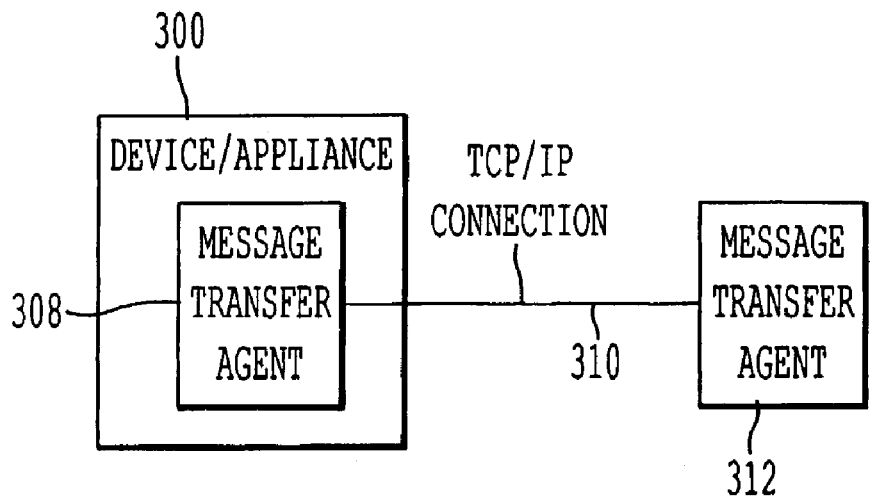
FIG. 6C illustrates an alternative way of communicating using electronic mail in which an application unit includes a message transfer agent for exchanging electronic mail.

A further alternative structure is shown in FIG. 6C in which the message transfer agent 308 is formed as part of the device/appliance 300. Further, the message transfer agent 308 is connected to the message transfer agent 312 by a TCP/IP connection 310. In the embodiment of FIG. 6C, the device/appliance 300 is directly connected to the TCP/IP connection 310 with an e-mail capability. One use of the embodiment of FIG. 6C includes using a facsimile machine with an e-mail capability (e.g., as defined in RFC 2305 (a simple mode of facsimile using Internet mail)) as the device/appliance 300.

Figure 6D:
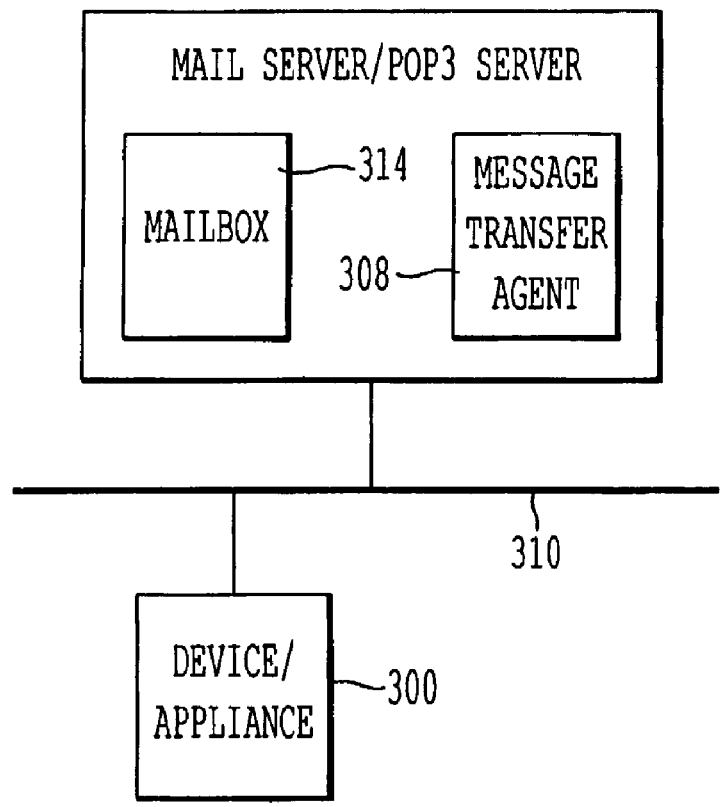
FIG. 6D illustrates an alternative way of communicating using electronic mail in which a mail server acts as a POP3 server to receive mail for an appliance/device and as an Simple Mail Transfer Protocol (SMTP) server to send mail for the appliance/device.

FIG. 6D illustrates a system in which a device/appliance 300 does not by itself have the capability to directly receive e-mail, but has a connection 310 to a mail server/POP3 server including a message transfer agent 308 and a mail box 314 so that the device/appliance 300 uses the POP3 protocol to retrieve received mail from the mail server.

Figure 7:
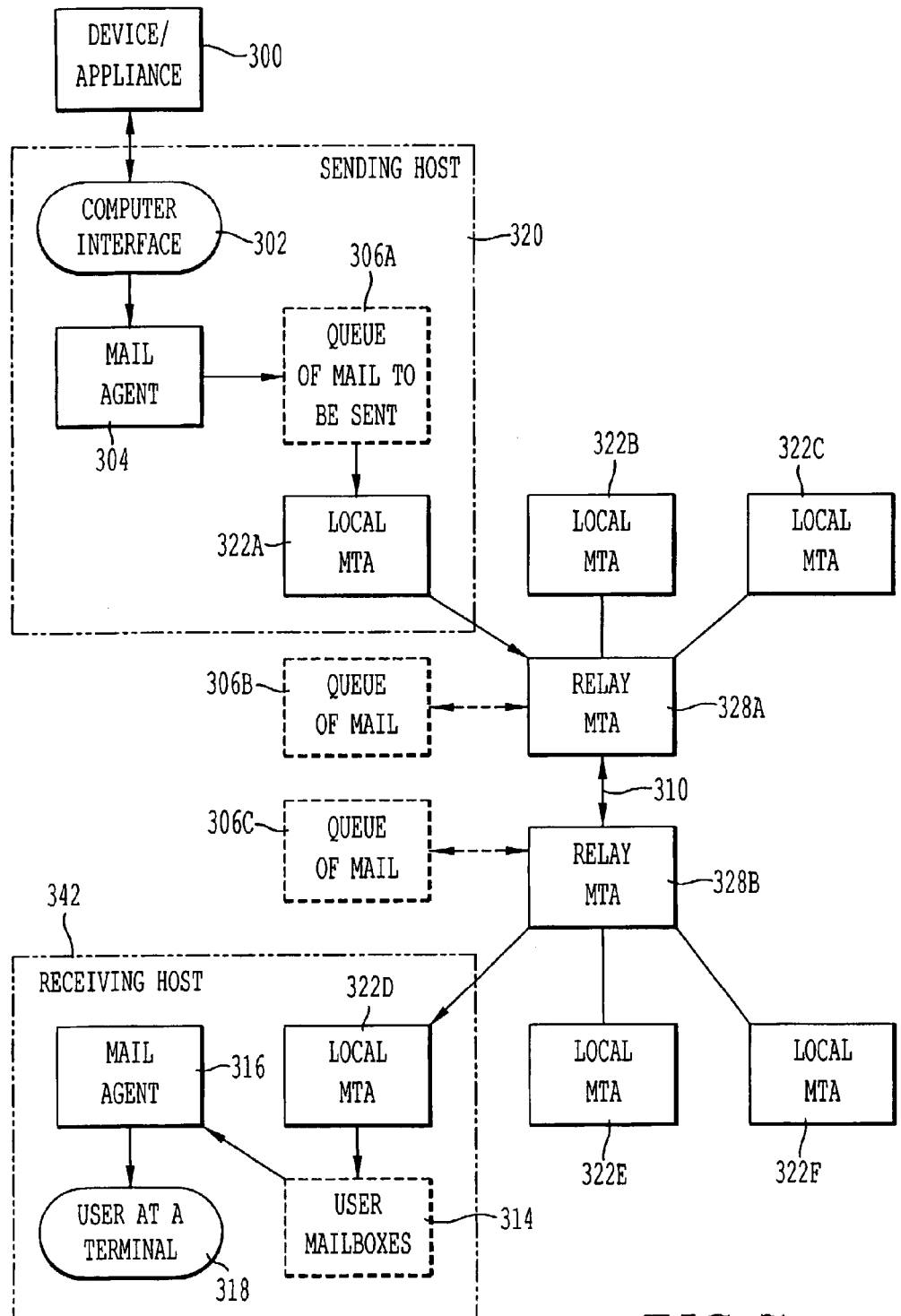
FIG. 7 illustrates an alternative manner of sending messages across the Internet.

FIG. 7 illustrates an alternative implementation of transferring mail and is adapted from FIG. 28.3 of Stevens referenced previously. FIG. 7 illustrates an electronic mail system having a relay system at each end. The arrangement of FIG. 7 allows one system at an organization to act as a mail hub. In FIG. 7, there are four MTAs connected between the two mail agents 304 and 316. These MTAs include local MTA 322A, relay MTA 328A, relay MTA 328B, and local MTA 322D. The most common protocol used for mail messages is SMTP (Simple Mail Transfer Protocol) which may be used with this invention, although any desired mail protocol may be utilized. In FIG. 7, 320 designates a sending host which includes the computer interface 302, the mail agent 304, and the local MTA 322A. The device/appliance 300 is connected to, or alternatively included within, the sending host 320. As another case, the device/appliance 300 and host 320 can be in one machine where the host capability is built into the device/appliance 300. Other local MTAs 322B, 322C, 322E, and 322F may also be included. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 328B and if desired, stored in a queue of mail 306C. The mail is then forwarded to the local MTA 322D of a receiving host 342. The mail may be placed in one or more of the user mailboxes 314 and subsequently forwarded to the mail agent 316, and finally forwarded to the user at a terminal 318. If desired, the mail may be directly forwarded to the terminal without user interaction.

Figure 8:
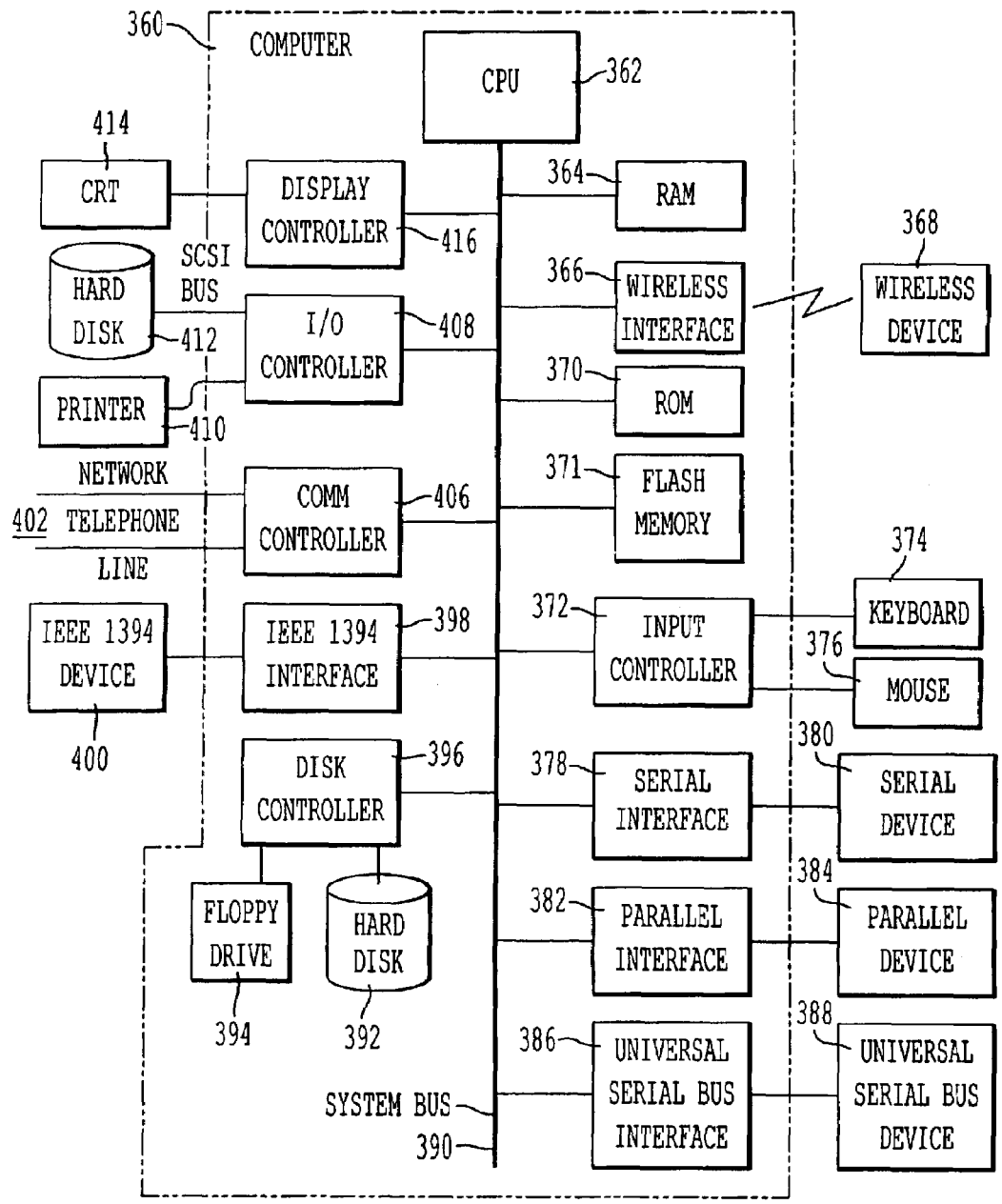
FIG. 8 illustrates an exemplary computer which may be connected to an appliance/device and used to communicate electronic mail messages.

The various computers used in the present invention, including the computers 266 and 276 of FIG. 5, may be implemented as illustrated in FIG. 8. Further, any other computer used in this invention may be implemented in a similar manner to the computer illustrated in FIG. 8, if desired, including the service machine 254, computer 272, and computer 282 of FIG. 5. However, not every element illustrated in FIG. 8 is required in each of those computers.

In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 that communicates with a wireless device 368. The communication between the interface 366 and device 368 may use any wireless medium (e.g., radio waves or light waves). The radio waves may be implemented using a spread spectrum technique such as Code Division Multiple Access (CDMA) communication or using a frequency hopping technique such as that disclosed in the Bluetooth specification.

Computer 360 includes a ROM 370 and a flash memory 371, although any other type of non-volatile memory (e.g., Erasable Programmable ROM, or an EEPROM) may be used in addition to or in place of the flash memory 371. An input controller 372 has connected thereto a keyboard 374 and a mouse 376. There is a serial interface 378 connected to a serial device 380. Additionally, a parallel interface 382 is connected to a parallel device 384, a universal serial bus (USB) interface 386 is connected to a universal serial bus device 388, and also there is an IEEE 1394 device 400, commonly referred to as a fire wire device, connected to an IEEE 1394 interface 398. A system bus 390 connects the various elements of the computer 360. A disk controller 396 is connected to a floppy disk drive 394 and a hard disk drive 392. A communication controller 400 allows the computer 360 to communicate with other computers (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9:
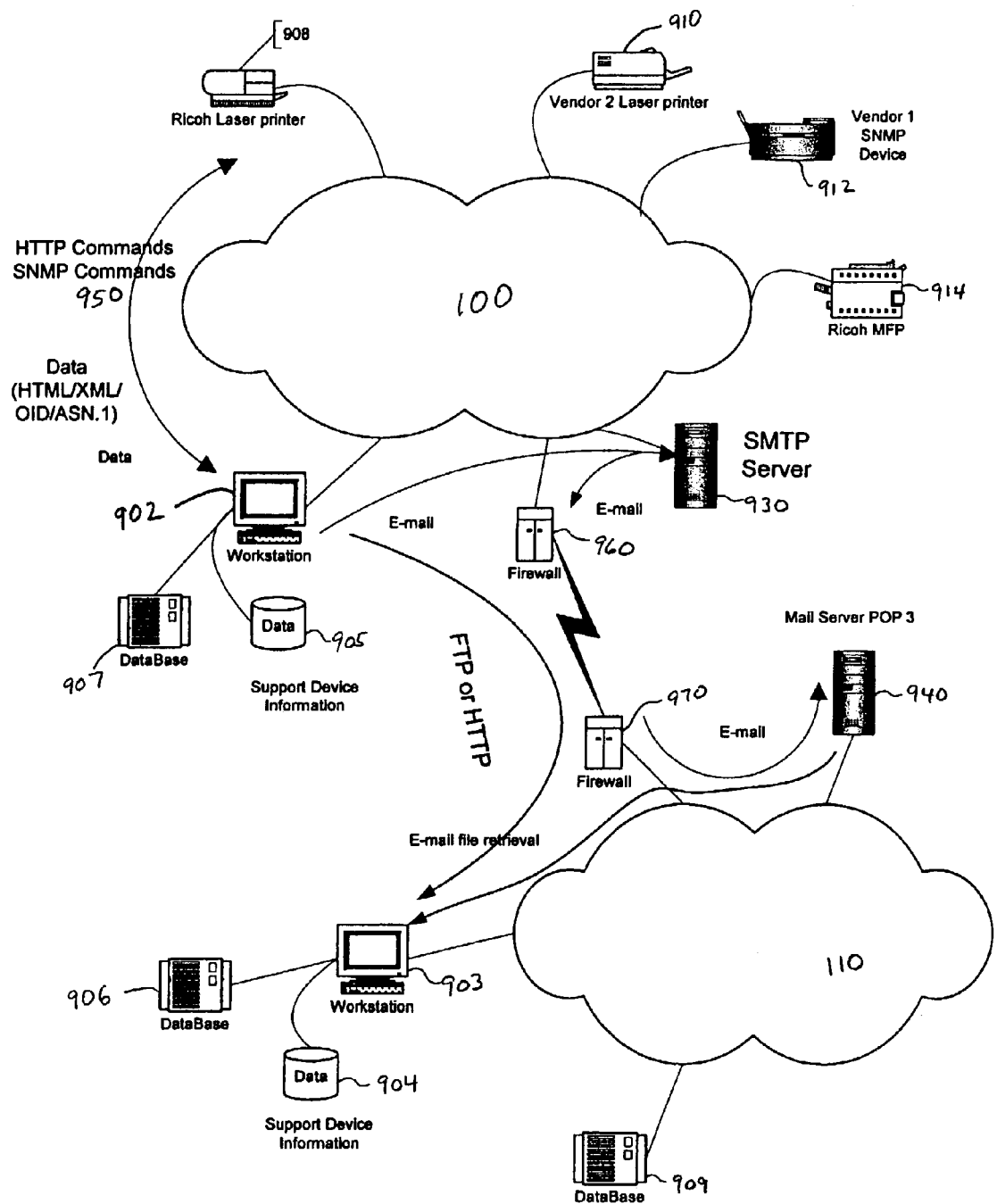
FIG. 9 is a schematic representation of the overall system in accordance with an exemplary embodiment of the present invention.

Referring now to FIG. 9, there is shown a schematic representation of the overall system 900 in accordance with an exemplary embodiment of the present invention. System 900 is shown to include a plurality of devices, for example, laser printers 908 and 910, a network SNMP device 912, and a multi-function printer 914, all connected to a network 100. Devices 908, 910, 912, and 914 are generally referred to herein as "monitored devices." The system 900 also includes a workstation/monitoring system 902 (hereinafter referred to as a controller 902), connected to the network 100 for monitoring and controlling the monitored devices 908, 910, 912, and 914. Each of the monitored devices 908, 910, 912, and 914 are given a unique address. For example, an IP address assigned to a device serves as a unique address for accessing the device. Thus, a user at controller 902 is able to access a respective device among the monitored devices by accessing the unique IP address assigned to the respective monitored device. It will be appreciated that the present invention is not limited to using IP addresses to uniquely identify devices connected to a network.

The system 900 also includes a SMTP email server 930 connected to the network 100 for facilitating the transfer of email messages among the devices communicatively coupled to network 100 and other networks. The operation of the SMTP mail server to facilitate the transfer of email messages among the devices communicatively coupled to a network is discussed in more detail in the following related co-pending U.S. patent applications having Ser. Nos. 09/953,358, 09/953,359, 09/975,935, and 10/142,992. As stated above, the contents of those patent applications are incorporated herein by reference.

The controller 902, upon accessing a device among the monitored devices 908, 910, 912, and 914 obtains device information through various communication protocols, e.g., SNMP and HTTP. Such information includes detailed information about the operational status of the device including troubleshooting information. For example, controller 902 may access and obtain the paper jam error information of a particular device and send a message to the person in charge of the device to clear the jam. The operational status/details of the laser printer 908 include such details as toner level, indication of paper jam, quantity of print paper in printer trays, etc.

It will be appreciated that the controller 902 may be either physically connected or wirelessly coupled to the network 100. For example, a personal digital assistant (PDA) or a laptop computer (not shown) may also be used as a controller 902. Thus, an access point may act as an interface to enable wireless communications between the network 100 and a PDA or laptop computer. Henceforth, the present invention will be described with the assumption that the controller 902 will be controlling and monitoring the status of the monitored devices connected to the network.

The network 100 facilitates communication between the controller 902 and the monitored devices 908, 910, 912, and 914 to enable monitoring and control of such monitored devices. The number of devices that are connected to the network is not limiting of the present invention. It will be appreciated that the network 100 may be a local area network (LAN) or a wide area network (WAN). Likewise, the monitored devices 908, 910, 912, and 914 are shown to be merely exemplary.

The controller 902 is communicatively coupled to an information storage device 905 and a database 907. The storage device 905 may include a hard disk, optical disk, and/or an external disk drive. The database 907 is communicatively linked to the storage device 905, and includes a Relational Database Management System (RDBMS) for easy search and retrieval of data stored in the storage device 905. The storage device 905 preferably stores detailed information about each of the monitored devices 908, 910, 912, and 914. For example, detailed information, such as the make, model, and various functions and trouble-shooting details of the laser printer 908 are stored in the storage device 905. Also, deviation values about the operational status of the laser printer compared to predetermined reference values may also be stored in the storage device 905. Although the database 907 and the storage device 905 are described to be communicatively coupled to the controller 902, it will be appreciated that the controller 902 may be built with the storage device and the database installed therein. In such a case, the storage device 907 and the database 905 would be depicted as being internal to the controller 902.

The system 900 also includes a second network 110 to which Mail server 940, database 909, and workstation 903 are communicatively connected. The workstation 903 is communicatively coupled to an information storage device 904 and a database 906. The storage device 904 may include a hard disk, optical disk, and/or an external disk drive. The database 906 is communicatively linked to the storage device 904, and includes a Relational Database Management System (RDBMS) for easy search and retrieval of data stored in the storage device 904. Further, network 100 and network 110 are remotely connected via firewall units 960 and 970, which are coupled to networks 100 and 110, respectively. Accordingly, email messages may be exchanged between workstations 902 and 903 using HTTP or FTP. Network 110 is equivalent to the network 52 or 260-1 discussed above, and the workstation 903 is equivalent to service machine 254. The workstation 903 can collect data from multiple networks for servicing the connected devices.

The controller 902 is installed with software in order to facilitate monitoring and control of the plurality of devices 908, 910, 912, and 914. Simple Network Management Protocol (SNMP) and Hyper Text Transfer Protocol (HTTP) are used by the controller 902 for monitoring the plurality of devices 908-914 and the data received from the plurality of devices 908-914 is presented in the form of ASN.1 Binary format or HTML or XML formats, as shown by reference label 950.

Although FIG. 9 illustrates only the imaging devices, the network for communicating information between the monitoring device and the plurality of monitored devices may include the home network where the appliances and meters are connected to the network. It will be appreciated that data collected by the controller/workstation 902 can be sent through e-mail, FTP, or any other communication protocol means to a remote device for further processing.

Monitoring System Architecture

Figure 10:
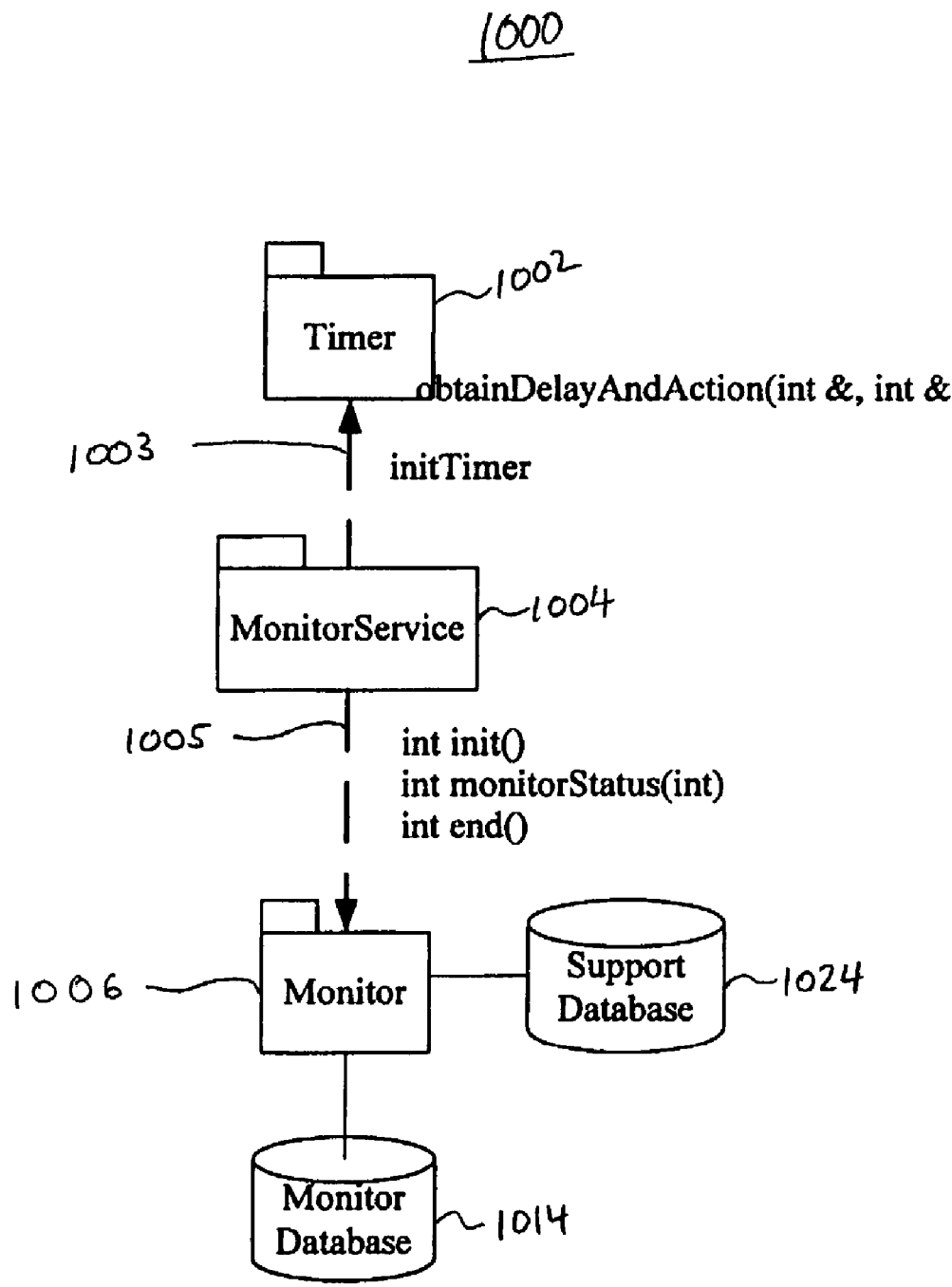
FIG. 10 illustrates modules used in the monitoring of the data and their interface functions in accordance with an exemplary embodiment of the present invention.
Figure 13:
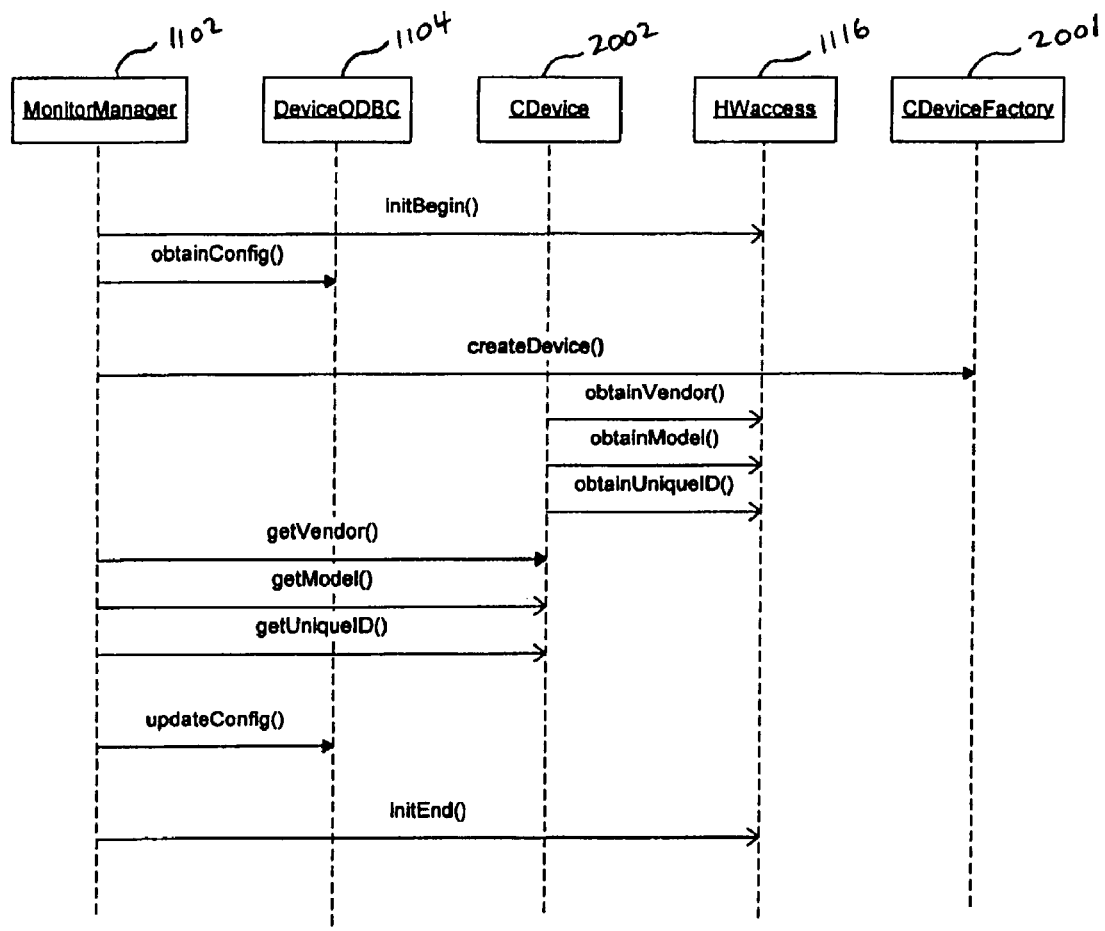
FIG. 13 shows the sequence of the init function of the Monitor module illustrated in FIG. 10.

FIG. 10 illustrates a monitoring system 1000 (and associated interface functions) used in the monitoring of data associated with remote devices according to an exemplary embodiment of the present invention. The monitoring system 1000 includes the software module MonitorService 1004, which is a computer resident program such as Service in NT or Windows 2000, and Daemon in Unix. In a preferred embodiment, the monitoring system is implemented using an objected-oriented software environment. Also included in the monitoring system 1000 are a Timer module 1002 and Monitor module 1006. Timer module 1002 and Monitor module 1006 are library functions to be called by the MonitorService module 1004. For example, MonitorService 1004 initializes the Timer module 1002 by calling the InitTimer 1003 function and obtains delay and action parameters by calling obtainDelayAndAction (int &, int &) function. The inito function is also called by the MonitorService module 1004 to initialize various modules in the Monitor module 1006, as illustrated in FIG. 13. The init( ) function can be used to obtain the IP address assigned to a monitored device through an external source containing IP addresses collected through known methods. The Monitor module 1006 is communicatively coupled to a support database 1024 and to a monitor database 1014, which are described in more detail below.

Once the IP address of a monitored device is obtained, the IP address is used by the monitoring system to contact the monitored device to obtain information such as, manufacturer (vendor) and model information. Some of the functions executed by the monitoring system 1000 include:

void initTimer(void) This function initializes the Timer. In particular, this function triggers the Timer object to get the timing information from the registry.

void obtainDelayAndAction(int & out_nDelay, int & out_nAction) This function returns the delay time in seconds for :: Sleep function (need to multiply 1000) and the action indicator.

int init(void) This function initializes the Monitor. In addition, it creates the devices to be monitored. The return int is the error code in which zero is defined as no error.

int monitorStatus(int in_nAction) This function monitors the preset information. The return int is the error code in which zero is defined as no error.

int end(void) This function cleans up the Monitor before closing the objects. The return int is the error code in which zero is defined as no error.

Monitor Module

Figure 11:
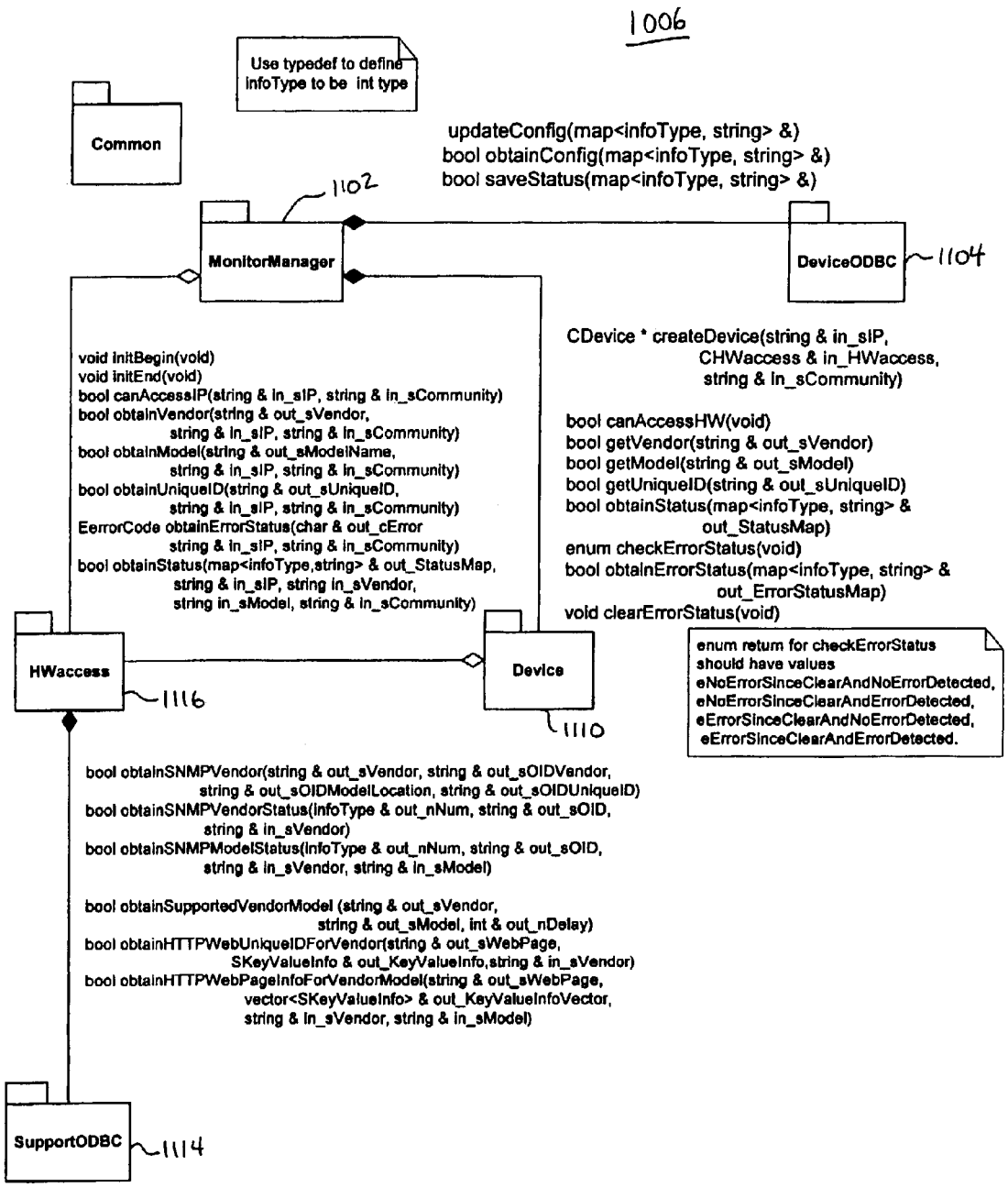
FIG. 11 shows details within the Monitor module and their calling functions between the sub-modules.

FIG. 11 shows the structural details of the Monitor module 1006, including the various software sub-modules, and the calling functions between the sub-modules of the Monitor module 1006. The Monitor module 1006 includes a MonitorManager module 1102 that manages the other sub-modules (including the DeviceODBC module 1104, the Device module 1110, the HWaccess module 1116, and the SupportInfoODBC module 1114) to complete the tasks defined by interface functions as illustrated in FIG. 10. Specifically, the DeviceODBC module 1104 and the SupportInfoODBC module 1114 are accessed in order to access external device information through the standard interface. The MonitorManager module 1102 is coupled to the SupportInfoODBC module 1114 via the HWaccess module 1116. The HWaccess module 1116 obtains vendor, model, unique ID, and status information from the monitored devices using information obtained through the SupportInfoODBC module 1114, which is connected to the database 1024, in order to access the monitored device using a selected communication protocol from among a plurality of communication protocols (e.g., HTTP and SNMP).

Information resident in the SupportInfoODBC module 1114 is used to support a plurality of communication protocols. For example, the SupportInfoODBC module 1114 may be created to support various communication protocols and to store information that may be used by various communication protocols that are specific to a vendor and a device model. Once a monitored device is accessed using a communication protocol and the information stored in the SupportInfoODBC 1114, status information received from the monitored device is stored in the Monitor Database 1014 through the DeviceODBC module 1104. Each of the Monitor software modules will be described in more detail below.

The following is a partial listing and description of the interfaces among the Monitor modules discussed above. For example, some modules may need to have "init" functions or additional functions in order to obtain the information in convenient formats.

void updateConfig(std::map<infoType, std::string>&) Before this function is called, the calling function is preferred not to replace the manufacturer and model entries if get functions return a null string from the VendorModel module. This function updates the device information database of the current record through the DeviceODBC 1104. This function is most efficient when the getConfig below is called initially.

bool obtainConfig(std::map<infoType, std::string>&) This function obtains the map through DeviceODBC 1104 for the device information in the given format. The function returns true if there is data returned, false if there is no more data.

bool saveStatus(std::map<infoType, std::string>&) This function saves the status information into the database 1014 through DeviceODBC 1104. The function returns true when saving is successful, false otherwise.

CDevice * createDevice(std::string & in_sIP, CHWaccess & in_HWaccess, std::string & in_sCommunity) This function creates the device based upon in_sIP and in_sCommunity that is connected to the hardware through CHWaccess. If the device can not be created, the function returns 0. Therefore, the calling object should check if the return object pointer is 0 or not.

bool canAccessHW(void) This function returns true when the hardware can be accessed through the network, false otherwise.

bool getVendor(std::string & out_sVendor) This function returns the vendor name. If the device is not supported by the system, but it can be accessed through SNMP or HTTP, the string shall contain "GENERIC." If the error is detected in the process, the function returns false with null string. Otherwise, the function returns true.

bool getModel(std::string & out_sModel) This function gets the model of the device. If the model is obtained, the function returns true. If the error is detected in the process, the function returns false with null string.

bool getUniqueID(std::string & out_sUniqueID) This function returns the unique ID of the device. If the Unique ID is obtained, the function returns true. If the error is detected in the process, the function returns false with null string.

bool obtainStatus(map<infoType, std::string>& out_StatusMap) This function returns the status map. The function returns true when the status is returned, false when status could not be obtained. Note that this function returns the different maps from the HWaccess and Device modules. In the Device module, error status information is added to the map returned from HWaccess and is cleared to zero.

enum checkErrorStatus(void) This function triggers to obtain the error byte of the printer through SNMP. The enum type and values should be defined in the classes. The enum values should include values eNoErrorSinceClearAndNoErrorDetected, eNoErrorSinceClearAndErrorDetected, eErrorSinceClearAndNoErrorDetected, eErrorSinceClearAndErrorDetected.

bool obtainErrorStatus(map<infoType, std:: string>& out_ErrorStatusMap) This function obtains error status information. The function returns true when the status is returned, false when status could not be obtained.

void clearErrorStatus(void) This function clears the error status accumulated since the last obtainStatus function call or clearErrorStatus.

void initBegin(void) This function starts the initialization process through HWaccess, in particular, to create the software device objects.

void initEnd(void) This function ends the initialization process through HWaccess signifying that the device object creation is finished.

bool canAccessIP(std::string & in_sIP, std::string & in_sCommunity) This function returns true when the device can be accessed at IP address, false otherwise.

bool obtainVendor(std::string & out_sVendor, std::string & in_sIP, std::string & in_sCommunity) This function obtains the Vendor. The function returns true if the operation is successful, false with the empty string otherwise.

bool obtainModel(std::string & out_sModelName, std::string & in_sIP, std::string & in_sCommunity) This function obtains the Model name. The function returns true if the operation is successful, false with the empty string otherwise.

bool obtainUniqueID(std::string & out_sUniqueID, std::string & in_sIP, std::string & in_sCommunity) This function obtains the Unique ID. The function returns true if the operation is successful, false with the empty string otherwise.

ErrorCode obtainErrorStatus(char & out_cError, std::string & in_sIP, std::string & in_sCommunity) This function obtains the error status byte through SNMP. The function returns true if the operation is successful, false with the zero byte otherwise. The EerrorCode is defined below.

bool obtainStatus(map<infoType,std::string>& out_StatusMap, std::string & in_sIP, std::string in_sVendor, std::string in_sModel, std::string & in_sCommunity) This function obtains the status of the device. The function returns true if the operation is successful, false with the empty map otherwise.

bool obtainSNMPVendor(std::string & out_sVendor, std::string & out_sOIDVendor, std::string & out_sOIDModelLocation, std::string & out_sOIDUniqueID) This function obtains, for SNMP, the name of the vendor, its vendor OID, the OID where the model information is stored, and the OID where the unique ID can be obtained. This function returns true when the data is returned, false when no more data is available and all the strings are set to null strings.

bool obtainSNMPVendorStatus(infoType & out_nNum, std::string & out_sOID, std::string & in_sVendor) This function obtains, for SNMP, the infoType and OID associated with the infoType for the given Vendor. The obtained infoType and OID pair is supported by all the devices from the given vendor. This function returns true when the data is returned, false when no more data is available and all the strings are set to null strings. Note: GENERIC is the Vendor common to all the vendors.

bool obtainSNMPModelStatus(infoType & out_nNum, std::string & out_sOID, std::string & in_sVendor, std::string & in_sModel) This function obtains, for SNMP, the infoType and OID associated with the infoType for the given Vendor and Model. This function returns true when the data is returned, false when no more data is available and all the strings are set to null strings.

bool obtainSupportedVendorModel (std::string & out_sVendor, std::string & out_sModel, int & out_nDelay) This function obtains the Vendor and supported Model along with the delay for accessing the web site through HTTP. If only SNMP is supported for the Vendor and Model, out_nDelay shall be −1. There may be more than one instance of the same vendor, but the model is unique for the given vendor. This function returns true when the data is returned, false when no more data is available and all the strings are set to null strings.

bool obtainHTTPWebUniqueIDForVendor(std::string & out_sWebPage, SKeyValueInfo & out_KeyValuemnfo, std::string & in_sVendor) This function obtains the web page and SKeyValueInfo structure of Unique ID for the given Vendor. The same vendor may have more than one web page. This function returns true when the data is returned, false when no more data is available and all the values are set to null values.

bool obtainHTTPWebPageInfoForVendorModel(std::string & out_sWebPage, std::vector<SKeyValueInfo>& out_KeyValueInfoVector, std::string & in_sVendor, std::string & in_sModel) This function obtains the web page and vector of SKeyValueInfo structure associated with the web page for the given Vendor and Model. The same vendor and model may have more than one web page. This function returns true when the data is returned, false when no more data is available and all the values are set to null values.

Figure 12A:
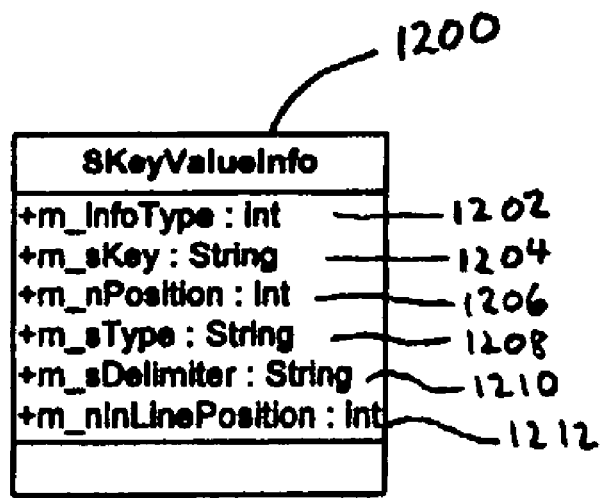
FIG. 12A shows a data structure used by HWaccess sub-module and SupportInfoODBC sub-module as illustrated in FIG. 11.

FIG. 12A shows the data structure used by the HWaccess module 1116 and the SupportODBC module 1114, as illustrated in FIG. 11, to exchange information for retrieval of values associated with key values received by the HWaccess module 1116. For example, the SKeyValueInfo data structure, as shown in FIG. 12A, is used to determine how to obtain information corresponding to a particular information type (corresponding to m_infoType 1202) within a given web page. Typically, a multitude of vendors use vendor-specific identifiers and nomenclature to identify key information, displayed on their respective web pages, related to a monitored device. For example, to determine the number of pages printed by a printer device, Hewlett Packard uses the "Page Count" feature, while Xerox identifies the same using a "Total Sheet Delivered" feature. A feature of the present invention is to overcome the vendor-to-vendor variances and thereby provide a standardized and uniform method of identifying device-specific information and extract the value corresponding to the information by using a data structure/SKeyValueInfo structure 1200. The SKeyValueInfo data structure 1200 includes attributes that are public.

The SKeyValueInfo is typically a data structure created to identify value information from information that is received from a monitored device in the form of a data string or a key string. The SKeyValueInfo includes a plurality of fields, each field represented by information illustrated in FIG. 12A. The SKeyValueInfo structure 1200 includes an m_sKey field 1204 that represents a string key, an m_nPosition field 1206, which is preferably a tag-based value indicating the number of positions in the string where a value information could be located. For example, the Page Count of a printer device, subject to monitoring, may be found at a second position following a key word. m_sType 1208 represents the type of information one can retrieve from a displayed web page of a monitored device.

When the value, such as, for example, model name of the monitored device, is found within the same data line of the key (Product Name), the m_nPosition field is "0." m_sDelimiter 1210 indicates a specific delimiter used to extract the value associated with the key.

Figure 12B:
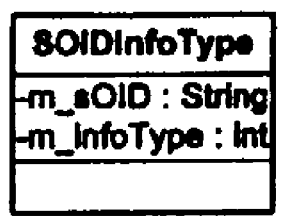
FIG. 12B shows an exemplary data structure associating an object Identifier (OID) with an information type.

The SKeyValueInfo data structure indicates how to extract the value information from information received from a monitored device in an HTML format. FIG. 12B shows an exemplary data structure associating an Object Identifier (OID) with the information type (m_info Type).

FIG. 13 shows the sequence of the init function to describe the calling sequence of Monitor module 1006 as illustrated in FIG. 10. The MonitorManager 1102 initializes the HWaccess module 1116 to start the initialization function. Subsequently, the MonitorManager 1102 obtains information about a monitored device and uses an IP address assigned to the monitored device to communicate with the monitored device. The MonitorManager 1102 accesses DeviceODBC 1104 to obtain configuration information of the monitored device. The configuration information returned to the MonitorManager 1102 includes, for example, an IP address of the monitored device, and vendor/manufacturer and model information of the monitored device. Once the IP address is obtained, the Monitor- Manager 1102 sets the IP address to create a software object based on class structure of the Device module 1110 through the CDeviceFactory class 2001. When the device software object is successfully created, the HWaccess module 1116 is used to obtain Vendor, Model, and Unique ID from the monitored device to be stored in the created device software object.

Once the vendor, model information, and unique ID are obtained from the device software object, the MonitorManager 1102 updates the database (for example, DeviceODBC 1104) with information received from the monitored device.

The methodology of extracting value information, such as vendor, model and unique ID, from the monitored device is obtained from SupportODBC 1114.

Figure 14:
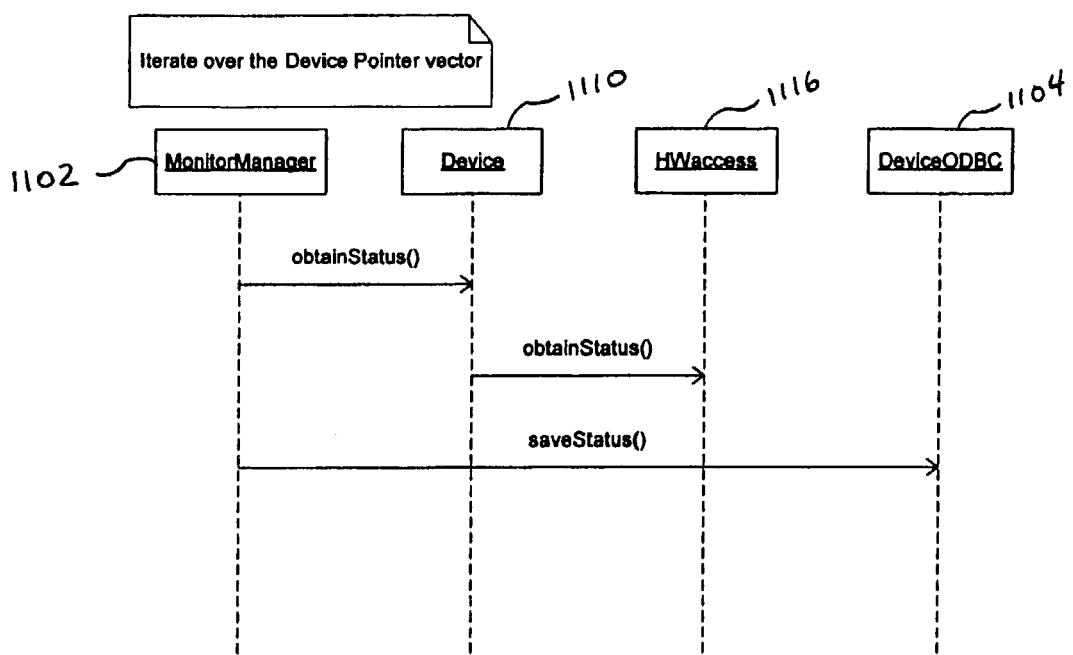
FIG. 14 shows an exemplary sequence of the status monitor function to determine the status of a monitored device by the MonitorManager, as shown in FIG. 11.

FIG. 14 shows the sequence of the status monitor function to determine the status of a monitored device by the MonitorManager module 1102, as illustrated in FIG. 11. This process is repeated over all the monitored devices stored in the vector as shown in FIG. 15.

Figure 15:
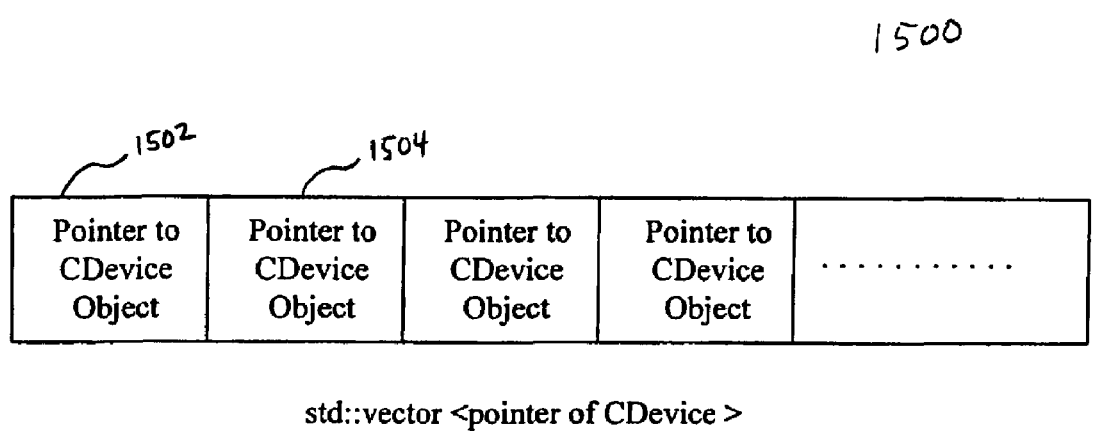
FIG. 15 shows a vector of the reference to the devices created by CDeviceFactory and used by the MonitorManager, as illustrated in FIG. 13.

Referring to FIG. 15, there is shown a vector 1500 having reference to the devices created by the CDeviceFactory 1106 and used by the MonitorManager 1102, as illustrated in FIGS. 13 and 14. MonitorManager 1102 stores device pointers, such as for example, Pointer to CDevice Object 1502, and Pointer to CDevice Object 1504 created by CDeviceFactory 1106, in the vector. The vector sequence is iterated to obtain the status of a monitored device. Polling of monitored devices is performed over the device object by issuing an obtainStatus command. Once the status of each of the software objects is obtained, such status is updated through the DeviceODBC 1104. The status monitor sequence was described above at FIG. 14, and will not be repeated herein.

The DeviceInfo structure shown in Table I reflects the information regarding one example monitored device. The DeviceInfo structure includes the e-mail address of the contact person, in addition to the telephone number.

nVendorModelWebpageID, key string information used to extract the parameter value of interest, value position in the HTML structure, value type delimiters if the value is located in the same data as the key string, nInLinePosition of the value when the value is located in the same data as the key string, and the standard enumerator for the key string.

VendorModelWebPage table 1612 associates the web page ID to actual web page string. The EnumCorrespondence table 1618 includes the standard enumerations and their description. The UniqueIDWebPage table 1608 includes vendor related information for a monitored device wherein the unique ID is obtained from a device, and the VendorModelWebPage table 1612 includes information that is unique to the monitored device from a particular model of a particular vendor.

Exemplary enum types used by the present invention include the following. (The enum types are merely exemplary and therefore should not be construed as limiting the present invention.)

infoType (typedef int infoType) This section describes the definition of the infoType (int). The value range 0 through 99 is assigned to the data type. The value range 100 to 499 is assigned to Device Information. The value range 500 to 1999 is assigned to the common parameters including standard MIB parameters. The range 2000 to 3999 is assigned to Ricoh-specific information. The range 4000 to 4999 is assigned to Xerox. The range 5000 to 5999 is assigned to Lexmark. The range 6000 to 6999 is assigned to HP. The values are defined as follows:

infoType {eNotDefine=0, eDeviceInformation=1, eStatusInformation=2, eVendor=100, eModel, eUniqueID, eIPAddress, eCompanyName, eStreet, eCity, eState, eZipCode, eLocation, eContactPerson, ePhoneNumber, eEMailAd-

TABLE 1

| Type | Name | Description |
| --- | --- | --- |
| std::string | m_sVendor | A string representing the vendor of the network printer. |
| std::string | m_sModel | A string representing the model of the network printer. |
| std::string | m_sUniqueID | A string representing the Unique ID of the network printer. This ID may be a serial number or MAC Address or any unique ID obtainable from the network printer. |
| std::string | m_sIPAddress | A string representing the IP address of the network printer. |
| std::string | m_sCompanyName | A string representing the name of the company which owns the network printer. |
| std::string | m_sStreet | A string representing the street address of the company. |
| std::string | m_sCity | A string representing the city where the company is located. |
| std::string | m_sState | A string representing the state where the company is located. |
| std::string | m_sZipCode | A string representing the zip code of the company. |
| std::string | m_sLocation | A string representing the location of the network printer within the company. |
| std::string | m_sContactPerson | A string representing the name of the contact person responsible for the network printer. |
| std::string | m_sPhoneNumber | A string representing the phone number of the contact person. |
| std::string | m_sEMailAddress | A string representing the e-mail address of the contact person. |
| std::string | m_sCommunity | A string representing the SNMP community for the device. |

Figure 16:
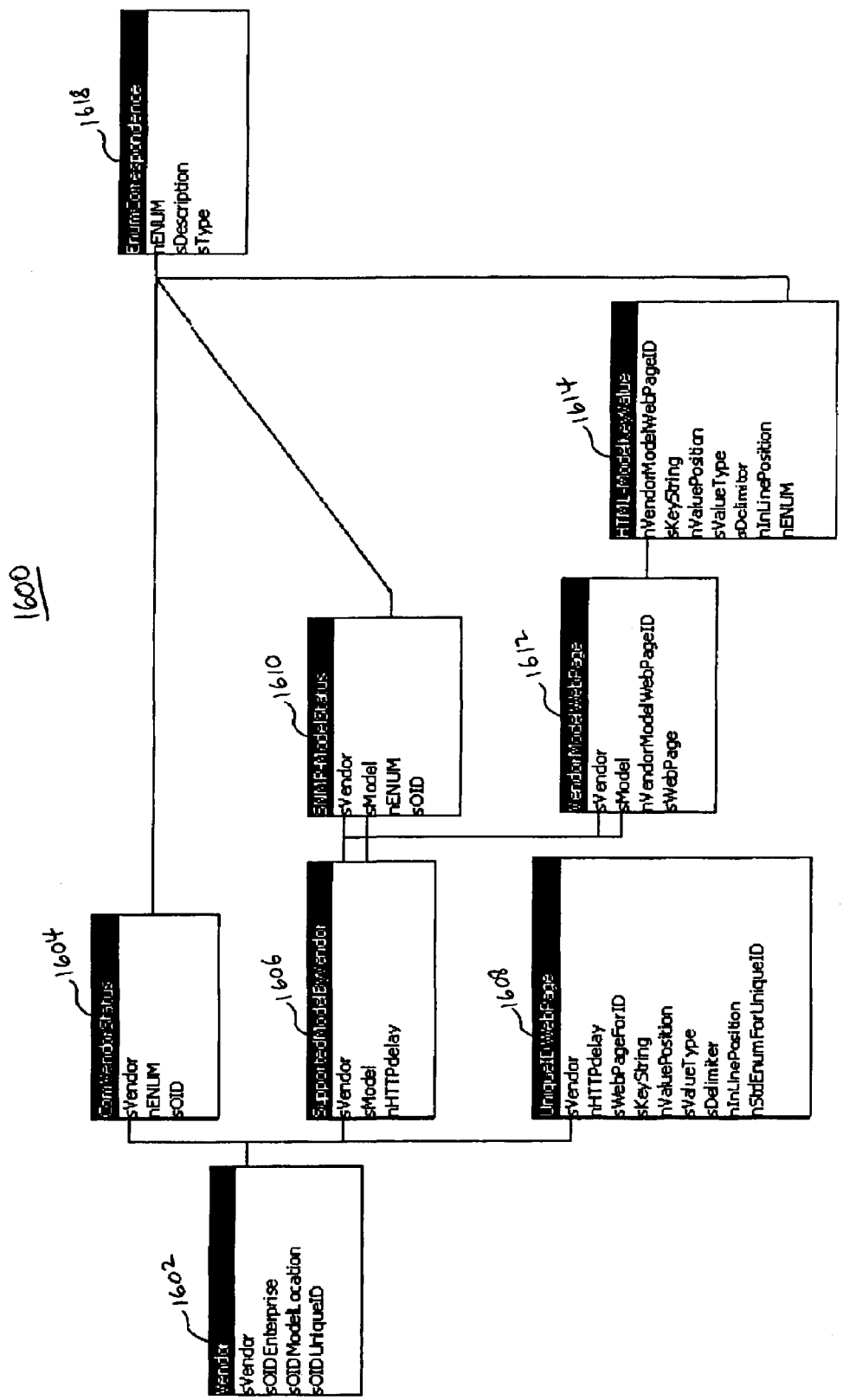
FIG. 16 shows the table relationship stored in a database to support information collection through the HWaccess module as shown in FIG. 11.

FIG. 16 illustrates a table structure to support information collection through the HWaccess module 1116 (FIG. 11). The tables illustrated in FIG. 16 are preferably stored in a database that communicates with the monitoring system 902 (FIG. 9) through SupportInfoODBC 1114 (FIG. 11). Specifically, FIG. 16 shows various tables along with respective fields. Tables 1602, 1604, 1606, and 1610 are related to Object Identifier (OID) used by SNMP. HTML-ModelKeyValue table 1614 includes such information as, for example, the dress, eDateTime=500, eHrDeviceErrors, eLowPaper, eNoPaper, eLowToner, eNoToner, eDoorOpen, eJammed, eOffline, eServiceRequested, ePrtGeneralConfigChanges=600, ePrtLifeCount, ePrtAlertDesc1, ePrtAlertDesc2, ePrtAlertDesc3, ePrtAlertDesc4, ePrtAlertDesc5, eBlack=700, eMagenta, eCyan, eYellow, eTonerCollector=800, eBlackDeveloper=810, eColorDeveloper, eFuser=820, eDrum=830, eTransfer=840, eMaintenanceKit=850, eOilKit=860, eStationInfo1=901, eStationInfo2, eStationInfo3, eStationInfo4, eStationInfo5, eRicohEngineCounterTotal=2000, eRicohEngineCounterPrinter, eRicohEngineCounterFax, eRicohEngineCounterCopier}.

EerrorCode

The following codes are merely exemplary, and more codes may be added to the existing set. The range 0-99 is reserved. The range 100-199 is for SMTP, 200-299 is for POP3, 300-399 is for Socket, and 400-499 is for HTTP. Other ranges not specified may be defined by a user, if needed.

enum EerrorCode(eNoError=0, eUnknownError=1, eSomeError, eCompleteFailure, eSomeDeviceCreationError=20, eCreateDeviceError, eNoDeviceCreated, eObtainConfigError, eSaveStatusError, eObtainUniqueIDError, eObtainStatusError, eStartSendError, eSomeDataSendError, eCompleteDataSendFailure, eEndSendError, eSendHeloCommandFailed=100, eSendMailCommandFailed, eSendRcptCommandFailed, eSendDataCommandFailed, eSendDataFailed, eSendQuitCommandFailed, eSendUserCommandFailed=200, eSendPassCommandFailed, eSendStatCommandFailed, eSendRetrCommandFailed, eSendDeleCommandFailed, eSendQuitPop3CommandFailed, eCreateSocketFailed=300, eConnectSocketFailed, eBadRequest=400, eUnauthorized, ePaymentRequired, eForbidden, eNotFound, eMethodNotAllowed, eNotAcceptable, eProxyAuthenticationRequired, eRequestTimeOut, eConflict, eGone, eLengthRequired, ePreconditionFailed, eRequestEntityTooLarge, eRequestURITooLarge, eUnsupportedMediaType, eRequestedRangeNotSatisfiable, eExpectationFailed, eInternalServerError=450, eNotImplemented, eBadGateway, eServiceUnavailable, eGatewayTimeOut, eHTTPVersionNotSupported, eMultipleChoices=480, eMovedPermanently, eFound, eSeeOther, eNotModified, eUseProxy, eTemporaryRedirect).

Figure 17:
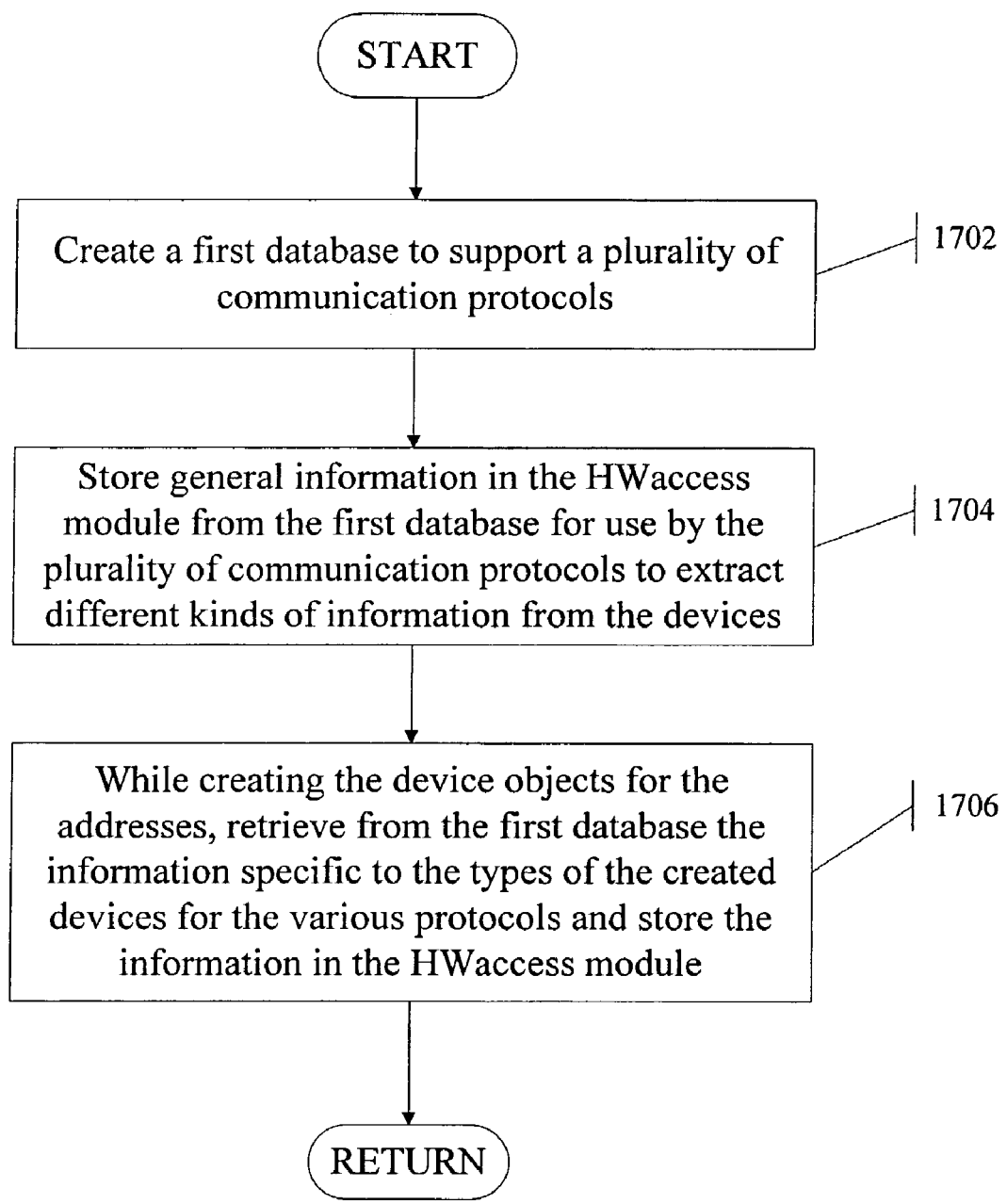
FIG. 17 is an exemplary flowchart disclosing the steps of storing information in the HWaccess Module.

FIG. 17 is an exemplary flowchart disclosing the steps of saving the necessary information in the HWaccess module. In step 1702, a first database, such as for example, the database 1024, is created in order to support a plurality of communication protocols. In step 1704, the general information needed to create the software device object along with the common information among the devices and their access methods are obtained from the first database and stored in the HWaccess module. In step 1706, while creating the software device objects, the information specific to the types of the device objects, such as information specific to the vendor and/or model, and their access methods, are obtained from the first database and stored in the HWaccess module.

Figure 18:
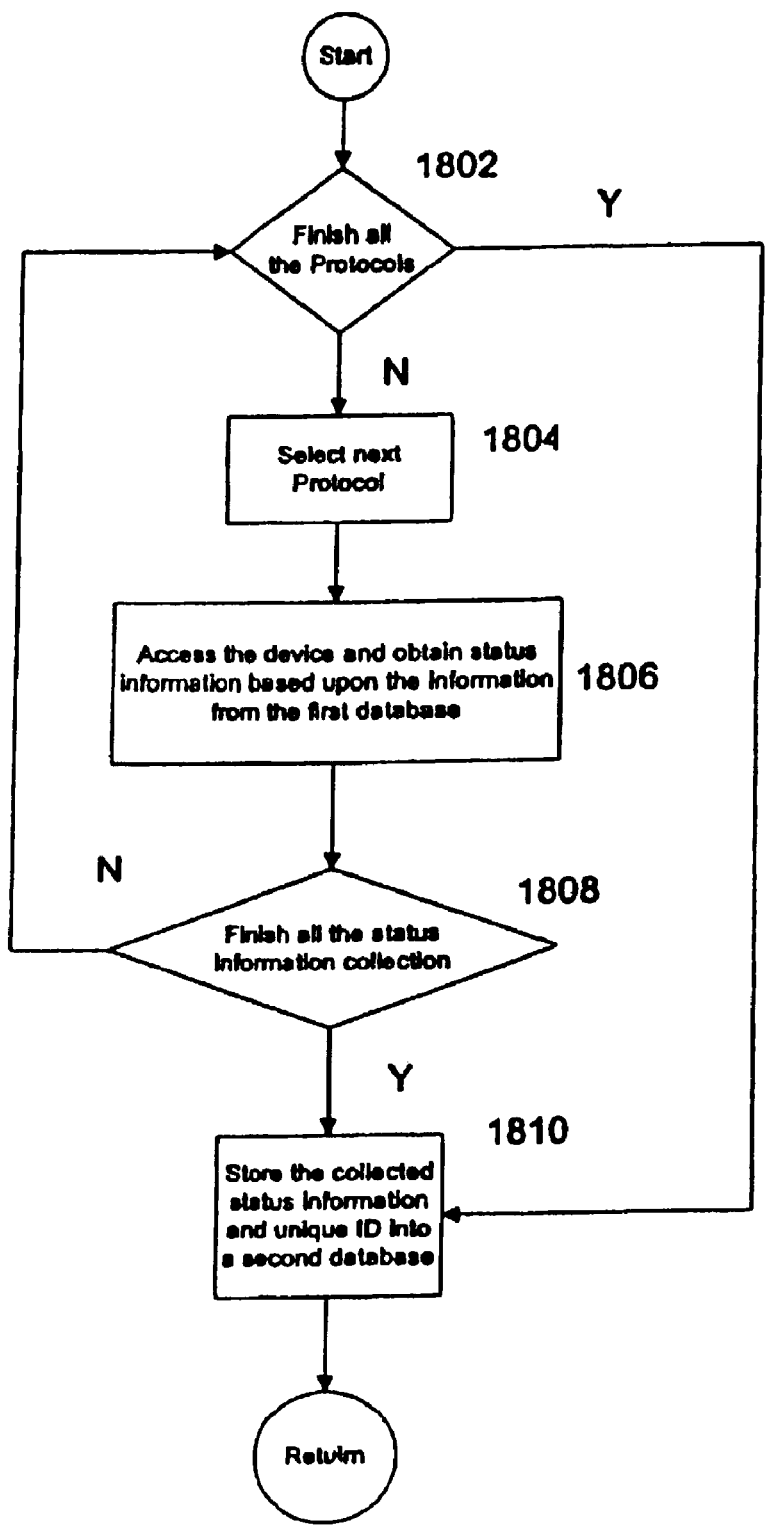
FIG. 18 is an exemplary flowchart disclosing the steps of monitoring a network device using multiple protocols.

FIG. 18 shows the status information retrieval steps from a device. This process is used for all the devices created at initialization. In step 1802, the process checks if all the protocols are processed. If all the protocols are processed, the obtained status and the unique ID are stored into the second database 1014. If the protocol is not finished, the next protocol is selected in step 1804. Then, in step 1806, the system accesses the device through the selected protocol and the status is obtained using the information stored in HWaccess that was obtained from the first database. In step 1808, the system checks if each status has been collected. If not, execution proceeds to step 1802. If each status has been collected, the system stores the status information and unique ID in the second database in step 1810.

The architecture (e.g., class structure) and major functions of each of the Monitor sub-modules (DeviceODBC, Device, HWaccess, and SupportODBC) will be described in more detail below.

DeviceODBC Module

Figure 19:
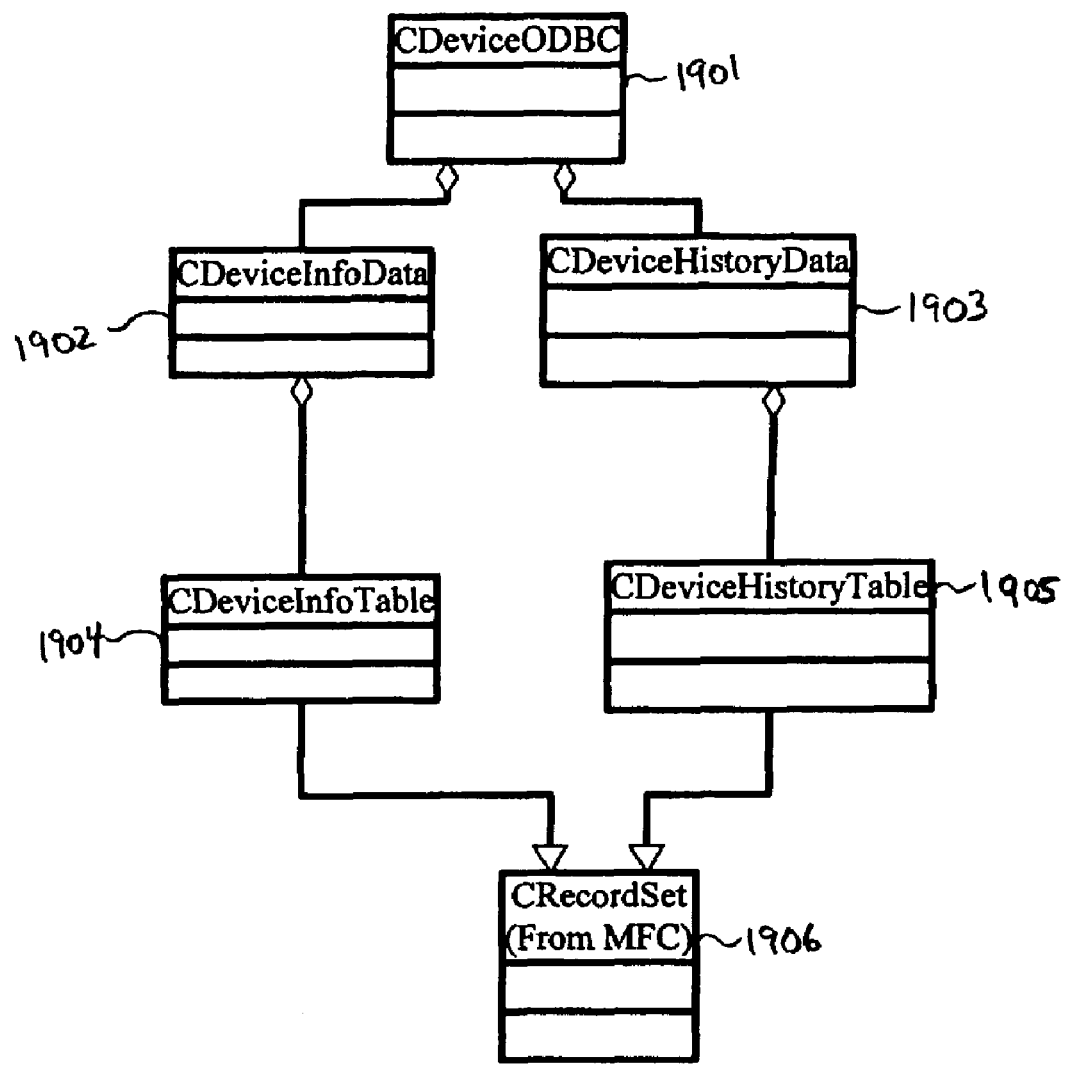
FIG. 19 shows the class structure of the DeviceODBC module.

FIG. 19 shows the class structure within the DeviceODBC Module 1104, which includes the classes CDeviceODBC 1901, CDeviceInfoData 1902, and CDeviceHistoryData 1903. Two additional classes, CDeviceInfoTable 1904 and CDeviceHistoryTable 1905, are subclasses of CRecordSet 1906 (of Microsoft Foundation Class) to connect with tables in the database through Open Database Connectivity (ODBC). The CDeviceODBC class 1901 provides the interfaces specified in FIG. 11.

Device Module

Figure 20:
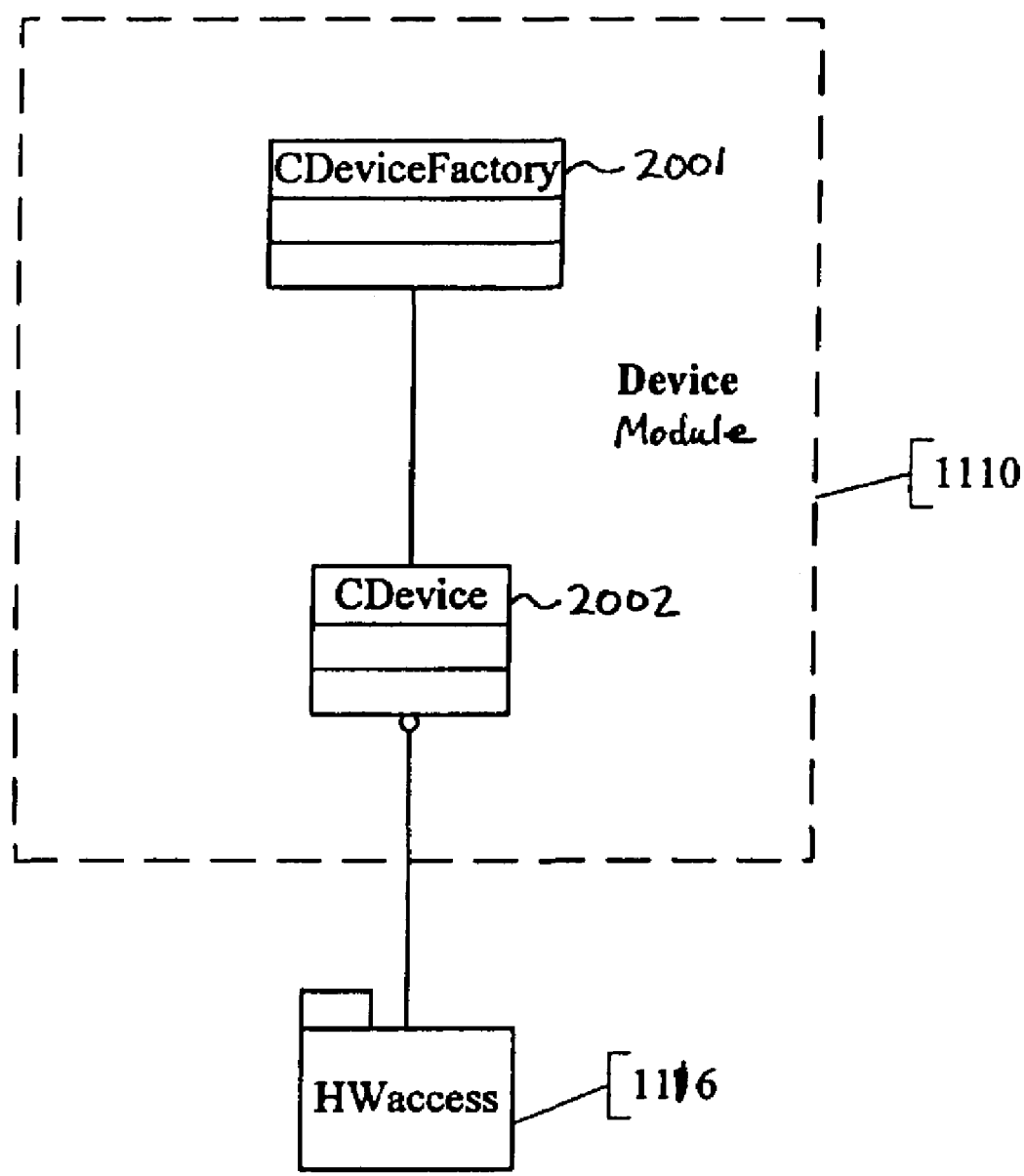
FIG. 20 illustrates the class structure of the Device module according to the present invention.

FIG. 20 shows the class structure of the Device Module 1110, which includes the classes CDeviceFactory 2001 and CDevice 2002. As shown in FIG. 20, the CDeviceFactory class 2001 creates the software device object (CDevice 2002) that is the interface class to the HWaccess Module 1116 and contains the IP address, vendor name, model name, and unique identification of the corresponding device.

Figure 21:
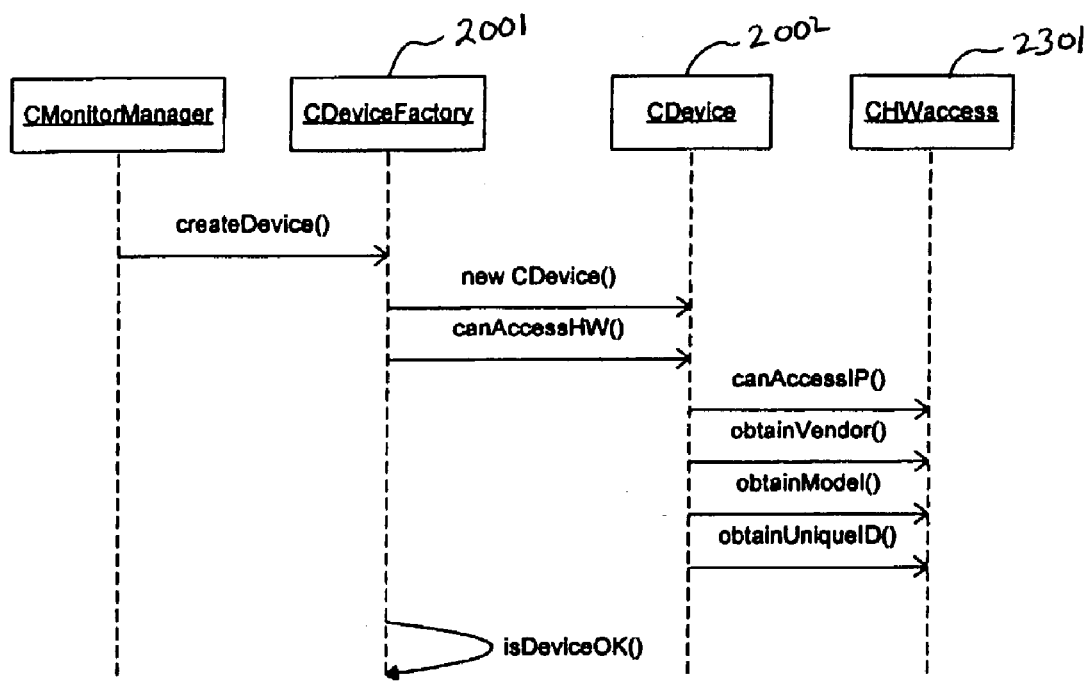
FIG. 21 illustrates the device software object creation sequence according to the present invention.

FIG. 21 shows the device creation sequence, in greater detail than illustrated in FIG. 13. After a software object of the CMonitorManager class obtains the IP address stored in the DeviceODBC module 1104, the object attempts to create a software device object of class CDevice 2002. An object of the CDeviceFactory class 2002 tests to see whether the created software device object can actually access the hardware device (via CHWaccess 2301, described below) through the IP address. CDeviceFactory 2001 also checks the integrity of the device before returning to the software device object (pointer is non-zero) if the created device is fine, or returning no device object (pointer is zero).

HWAccess Module

Figure 22:
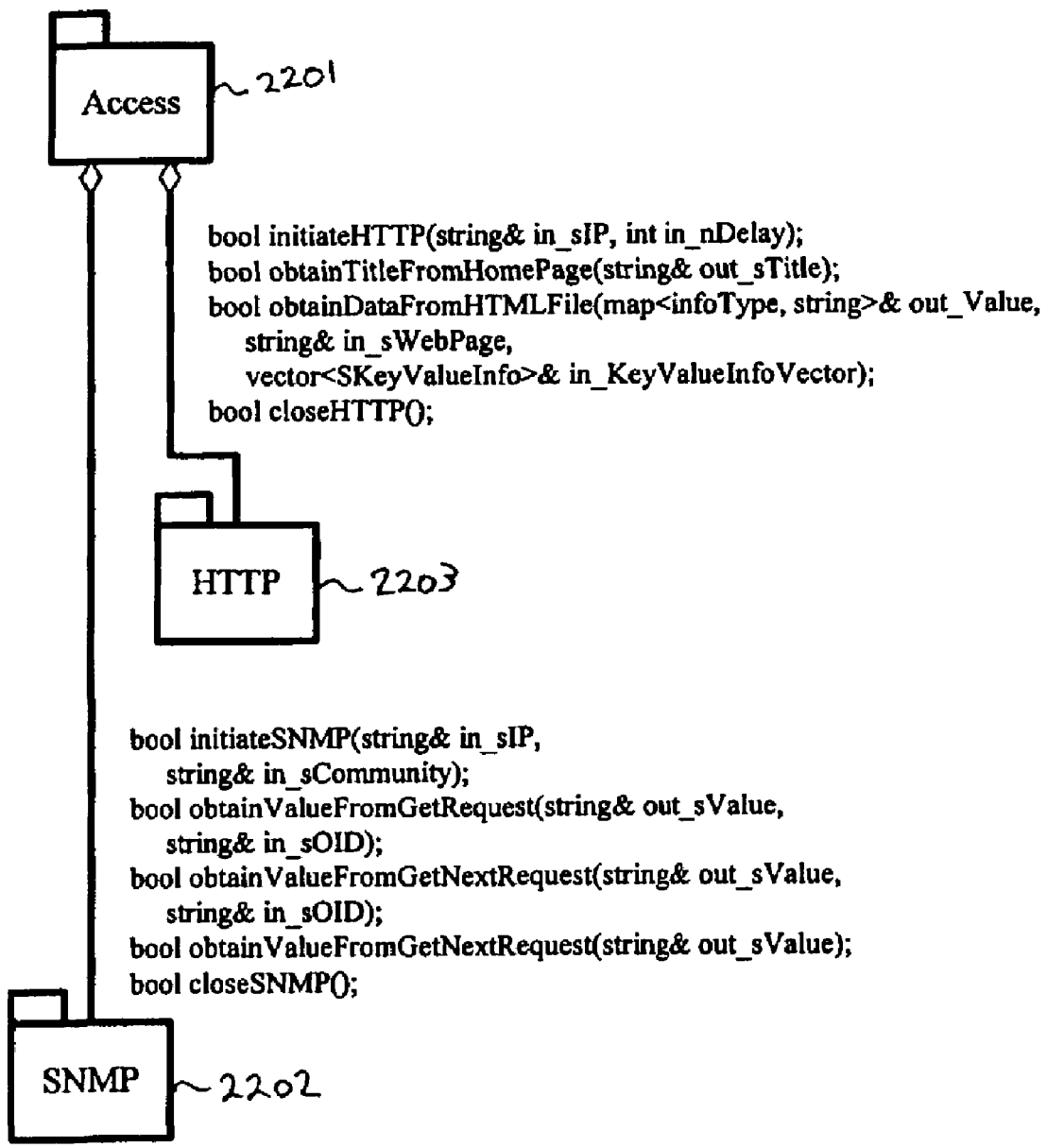
FIG. 22 shows the HWAccess module structure containing the different protocols used to access device, such as SNMP and HTTP, along with the access classes in the Access module.

FIG. 22 illustrates the structure of the HWAccess module 1116, which includes the modules related to the protocols used to access the monitored devices, such as the SNMP module 2202 and the HTTP module 2203, along with the access classes in the Access module 2201. The Access, SNMP, and HTTP modules are discussed in more detail below.

Public functions available in the HWAccess module include the following.

bool initiateHTTP(string& in_sIP, int in_nDelay);

This function initiates an HTTP session with the device corresponding to the IP address. This function returns true if the HTTP session can be initiated. Otherwise, false is returned.

bool obtainTitleFromHomePage(string& out_sTitle);

This function obtains the title from the home page of the device. This function returns true and a string for the title if it can obtain the title. Otherwise, false and an empty string is returned.

bool obtainDataFromHTMLFile(map<infoType, string>& out_Value, string& in_sWebPage, vector<SKeyValueInfo>& in_KeyValueInfoVector);

This function obtains the desired information from a web page of the device. This function returns true and a map for the desired information if the information can be obtained. The desired information is added to the map. This function returns false with the map unmodified if the web page cannot be accessed.

bool closeHTTP( );

This function closes the HTTP session for the device.

bool initiateSNMP(string& in_sIP, string& in_sCommunity);

This function initiates an SNMP session for the device corresponding to the IP address. This function returns true if the SNMP session can be initiated. Otherwise, false is returned.

bool obtainValueFromGetRequest(string& out_sValue, string& in_sOID);

This function obtains the string value associated with the input OID through the GET request of SNMP. This function returns true and a string value associated with the OID if it can be obtained. Otherwise false and an empty string are returned. It is possible that this function can return an empty string for true.

bool obtainValueFromGetNextRequest(string& out_sValue, string& in_sOID);

This function obtains the string value associated with the input OID through the GET NEXT request of SNMP. This function returns true and a string value associated with the next OID that contains the input OID. Otherwise, false and an empty string are returned. The GET NEXT request of SNMP obtains a value associated with the OID following the input OID in the MIB. It is possible that this function can return an empty string for true.

bool obtainValueFromGetNextRequest(string& out_sValue);

This function obtains the string value associated with the next OID through the GET NEXT request of SNMP. This function returns true and a string value associated with the next OID that contains the OID set in the other function with the same name. Otherwise, false and an empty string are returned. The GET NEXT request of SNMP obtains a value associated with the OID following the input OID in the MIB. It is possible that this function can return an empty string for true.

bool closeSNMP( );

This function closes the SNMP session for the device. This function returns true if the SNMP session can be closed. Otherwise, false is returned.

Access Module

The Access module 2201 manages the various network protocols to access information from the network devices. The Access module 2201 interacts with the SNMP module 2202 to obtain information from the devices using SNMP. In addition, the Access module 2201 interacts with the HTTP module 2203 to obtain information from the devices using HTTP.

Figure 23:
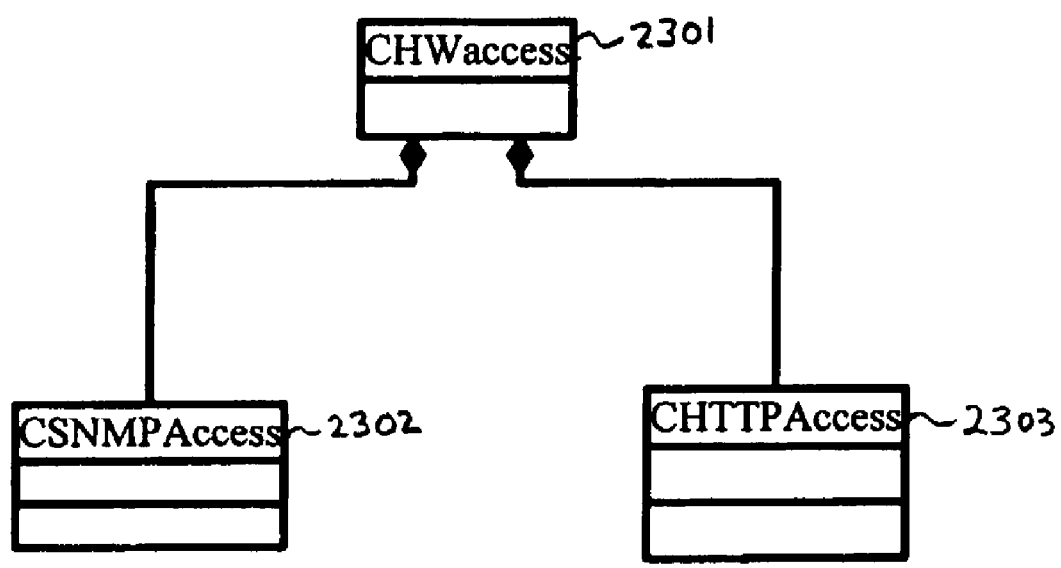
FIG. 23 shows the CHWaccess class, which is the interface class of the HWAccess module according to the present invention.

FIG. 23 shows the class structure of the Access module 2201, which includes classes CHWaccess 2301, CSNMPAccess 2302, and CHTTPAccess 2303. The CHWaccess class 2301 is the interface class of the Access module 2201. Note that the CHWaccess class 2301 includes all the public functions described in the HWaccess 1116, described above. Classes CSNMPAccess 2302 and CHTTPAccess 2303 are the interface classes to the respective SNMP and HTTP supporting protocols. In addition, these two classes store information related to the method of accessing a device according to the common status information entities, vendor specific information entities (if available), and vendor model-specific information entities. Data structures associated with this module are described below.

Figure 24:
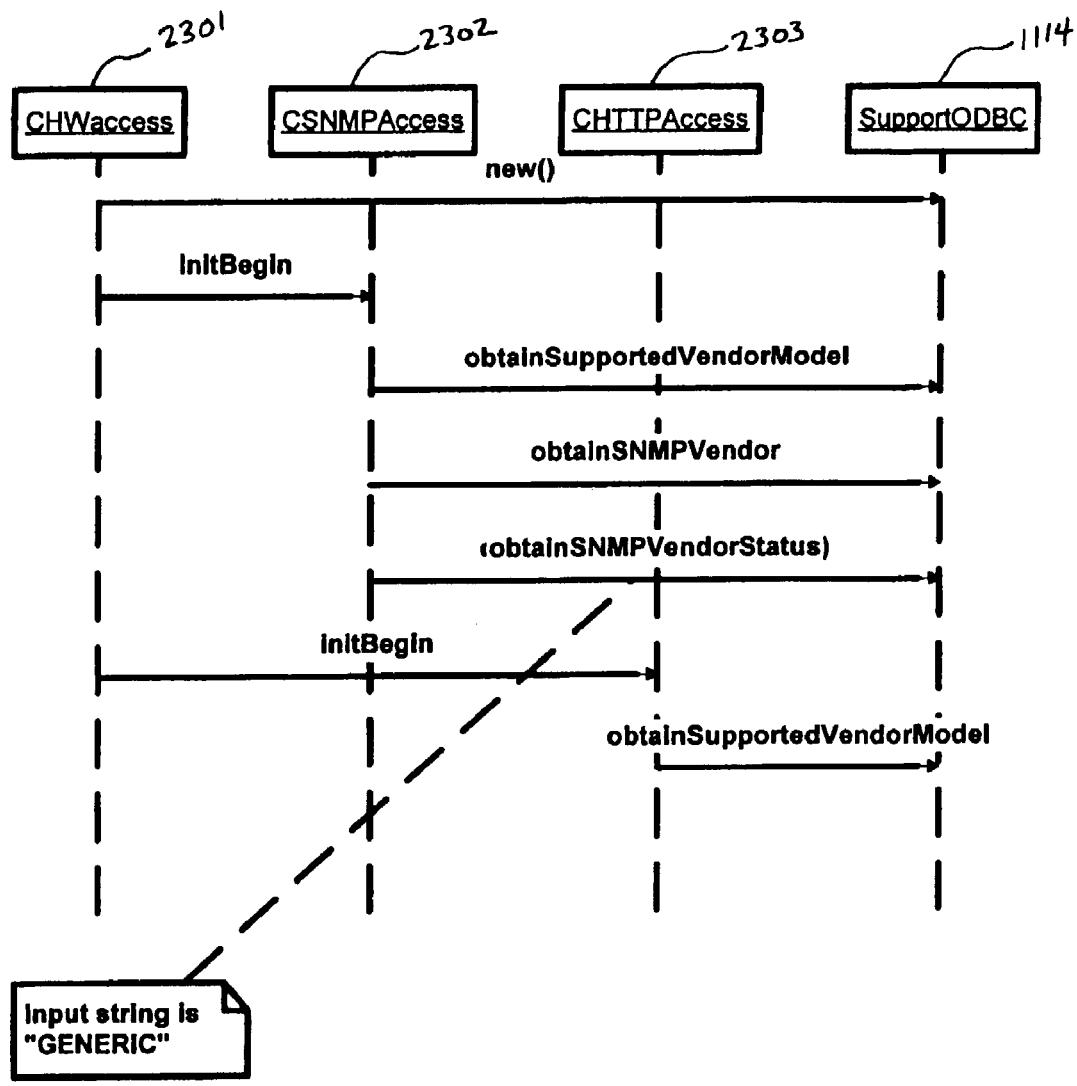
FIG. 24 illustrates the initialization process of the three classes in the HWAccess module in which the process creates the SupportODBC class object and passes it to both CSNMPAccess and CHTTPAccess class objects through their initBegin functions.

FIG. 24 shows the sequence associated with the initBegin function of CHWaccess class 2301 for initializing objects of the classes in the Access module 2201. First, the process creates a SupportODBC class object using the built-in C++ function new and passes it to objects within the CSNMPAccess and CHTTPAccess classes through initBegin. CSNMPAccess and CHTTPAccess class objects in turn use the SupportODBC object to obtain necessary information according to the data structures described below.

Figure 25:
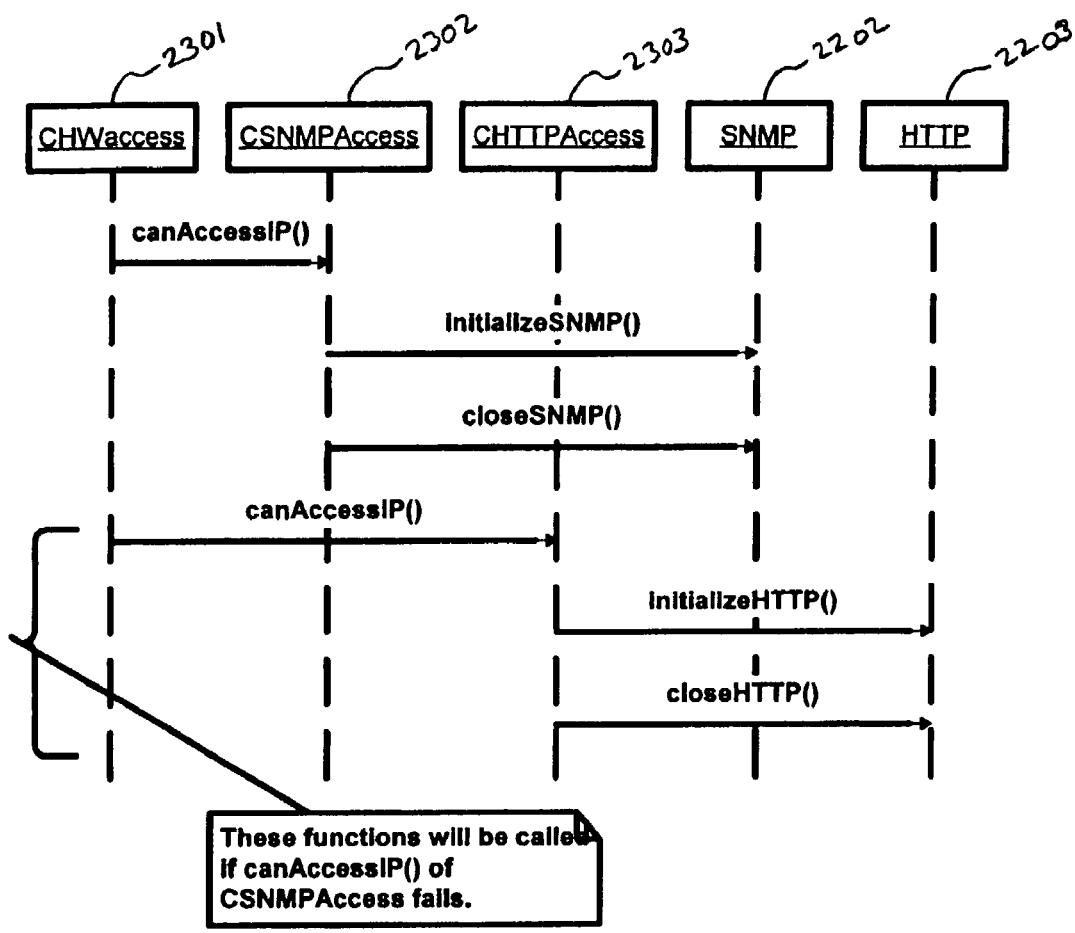
FIG. 25 illustrates the process of checking if a device can be accessed at the particular IP address through SNMP and HTTP protocols according to the present invention.

FIG. 25 shows the sequence associated with the canAccessIP function of the CHWaccess class 2301 for checking if a device can be accessed at a particular IP address through the SNMP and HTTP protocols. First, SNMP is checked through a canAccessIP call to a CSNMPAccess object. If the device can be accessed through SNMP, the canAccessIP function indicates that the device can be accessed, and the functions initializeSNMP and closeSNMP are called. If SNMP access failed, a CHTTPAccess object is called to determine if HTTP access is possible at the given IP address.

Figure 26:
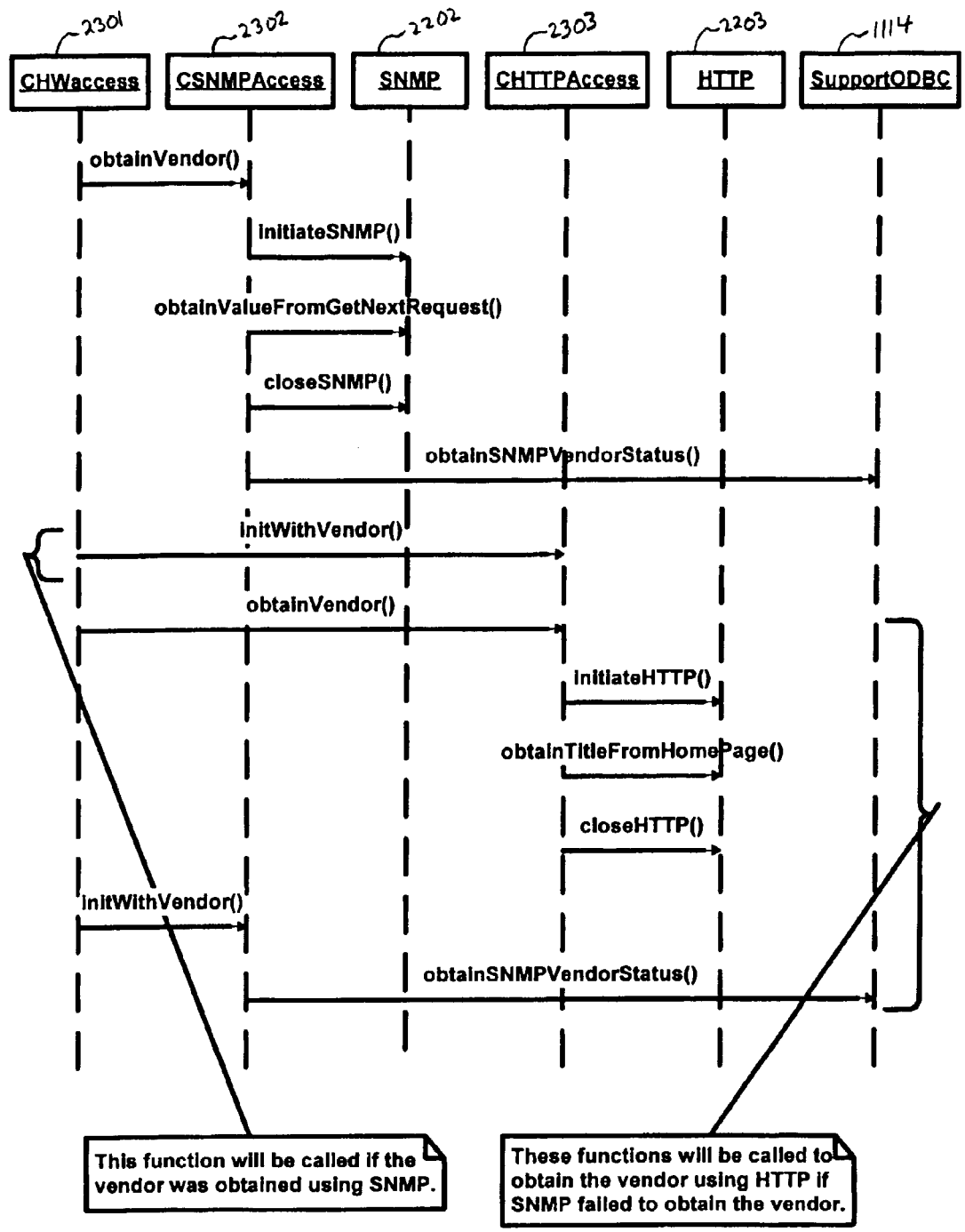
FIG. 26 illustrates the sequence that obtains a vendor name from a device and then stores the vendor-related information obtained from the SupportODBC.

FIG. 26 shows the sequence associated with the obtainVendor function of the CHWaccess class 2301 for obtaining the vendor name from the device and then storing the vendor-related information from objects of the SupportODBC Module 1114. Because SNMP requires fewer resources, the sequence first tries to access the device and obtain the vendor information using the SNMP protocol. If the vendor is identified, but if it is not in the supported vendor list, the function returns. If the vendor is identified and is supported, a CSNMPAccess class object accesses the Support database 1024 through the SupportODBC module to get the OID(s) related to the vendor to be used for the status check of the particular vendor. If SNMP fails to get the vendor name, HTTP is used to get the vendor name. If the vendor name is obtained and is supported by the system, a CSNMPAccess class object is instructed through the initWithVendor function to get the OID(s) related to the vendor to be used for the status check of the particular vendor. In the present invention, there is no vendor common information to be stored in CHTTPAccess. If, however, the information is common among the same vendor devices and can be collected through HTTP, the interface function is defined for SupportODBC and the function is called after identifying the vendor by a CHTTPAccess class object, so that the information can be stored.

Figure 27:
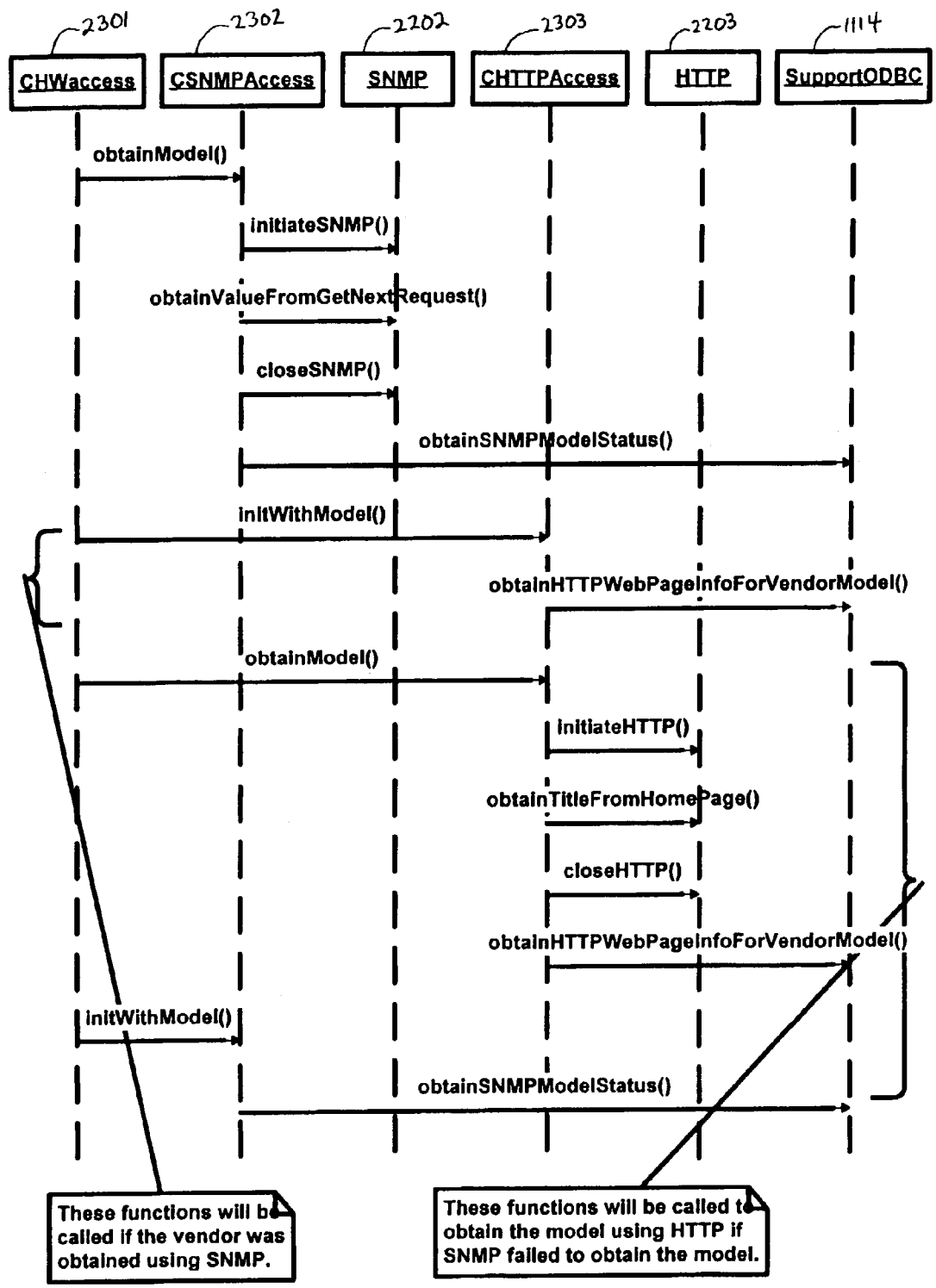
FIG. 27 illustrates the sequence to obtain model information according to the present invention.

FIG. 27 shows the sequence associated with the obtainModel function of the CHWaccess class 2301 for obtaining device model information. The process is similar to that for the obtainVendor function described above. However, one difference is that a CHTTPAccess class object calls the SupportODBC module after obtaining the model information, so that it can obtain the information retrieval method of the vendor and model specific status.

FIG. 28 shows the sequence associated with the obtainUniqueID function of the CHWaccess class 2301 for obtaining the unique ID from the device, first through SNMP and second, if SNMP fails, through HTTP. Note that the HTTP protocol needs to access SupportODBC to obtain the information of the name of the web page and how to extract the unique ID from the web page.

Figure 29:
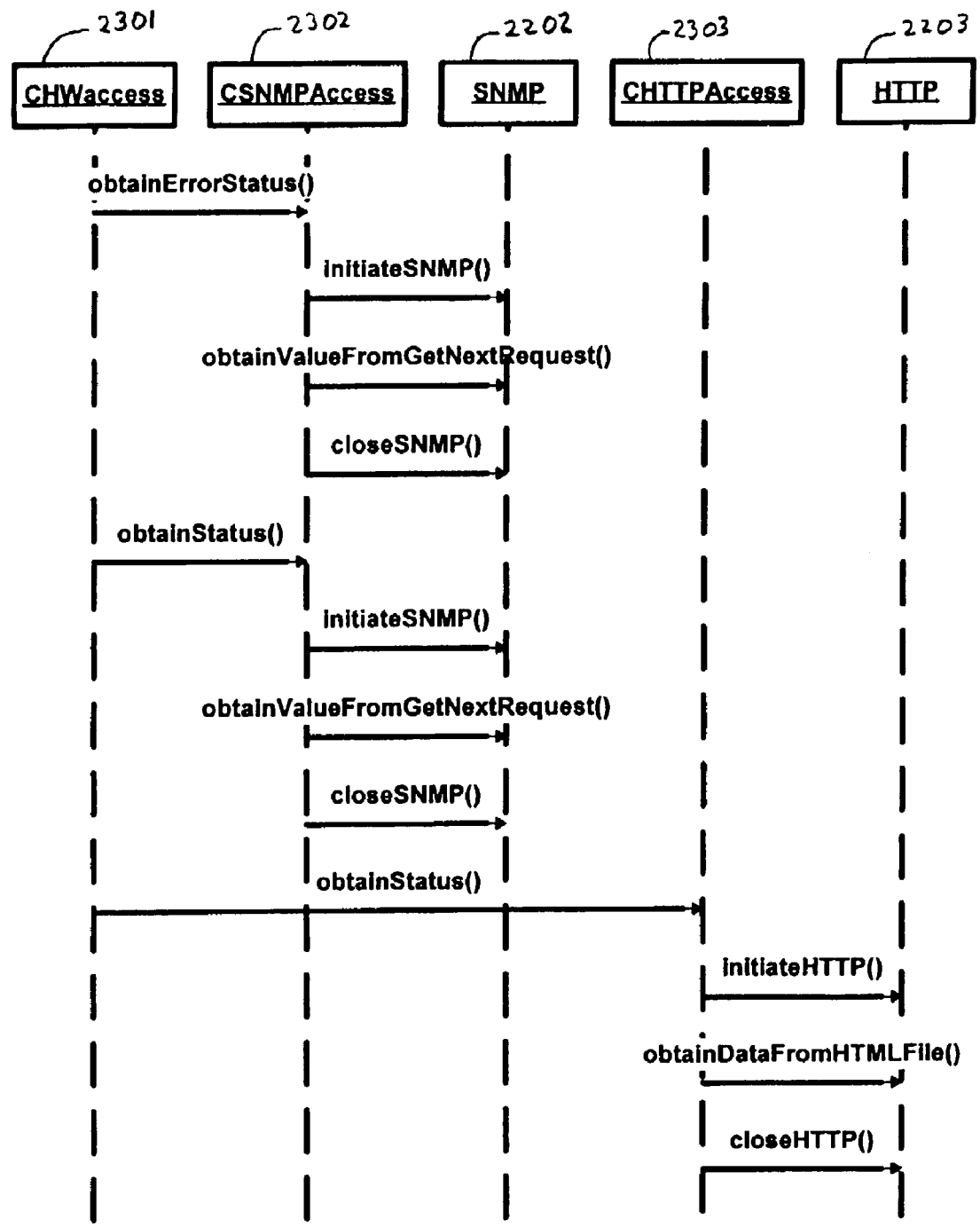
FIG. 29 illustrates the sequence of obtaining the status from a device, SNMP first and then HTTP, according to the present invention.

FIG. 29 shows the sequence associated with the obtainStatus function of the CHWaccess class 2301 for obtaining the status from the device, first with SNMP, and then with HTTP. For a further description of this process, see co-pending application Ser. No. 10/328,026 entitled "Method of using Vectors of Structures for Extracting Information from the Web Pages of Remotely Monitored Devices," filed Dec. 26, 2002, incorporated herein by reference. However, note that for HTTP, the information that has been obtained at the previous SNMP portion is deleted from the list of status information to be obtained from the device, as discussed in more detail below.

Figure 30A:
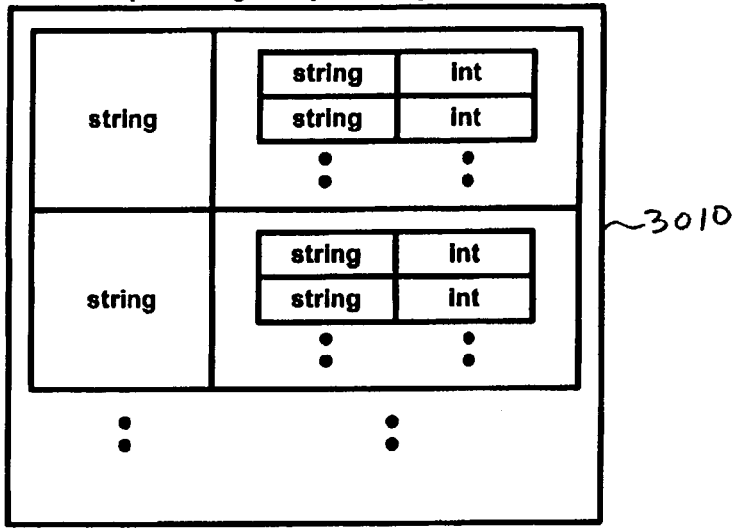
FIGS. 30A and 30B illustrate two data structures used by CHTTPAccess to maintain information about the devices supported by the system and the information used to access status information from the devices.
Figure 30B:
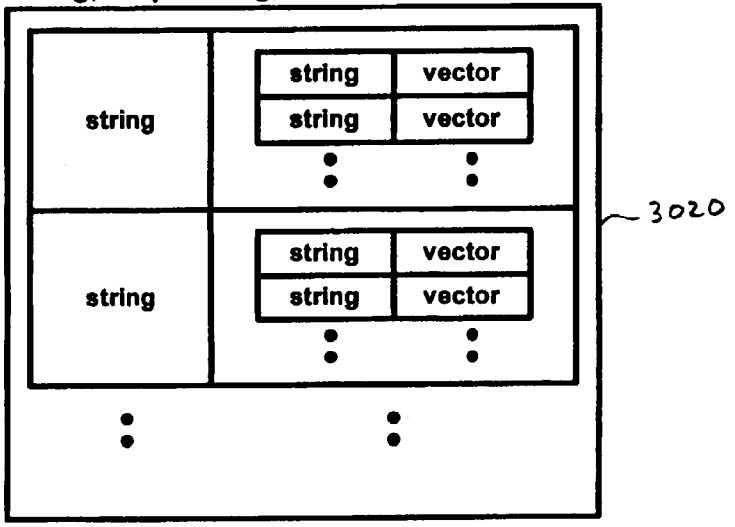

FIGS. 30A and 30B illustrate two data structures used by CHTTPAccess for storing support information obtained from the SupportODBC Module 1114. The first data structure 3010 shows the Vendor (first column), Model (the second column) and delay needed for the processing of HTTP by the device.

The second data structure 3020 contains the vector of information used for the retrieval of status information from a device of the particular model and vendor.

Figure 31A:
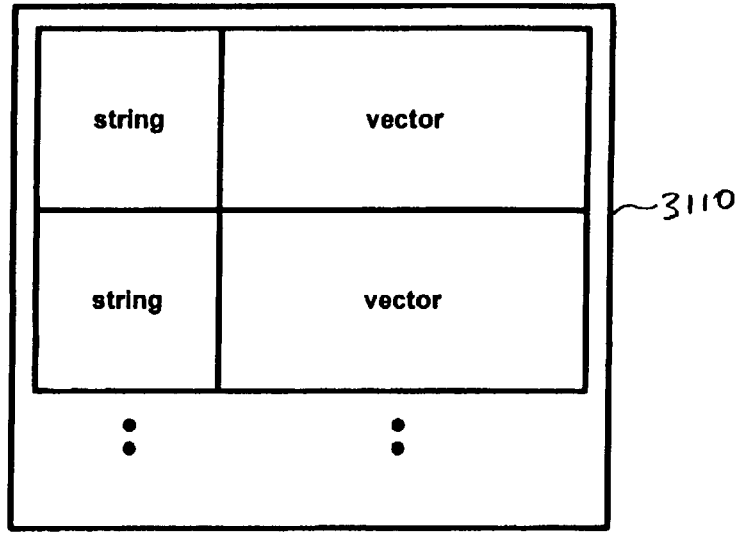
FIGS. 31A and 31B illustrate two data structures used by CSNMPAccess to maintain information about the devices supported by the system and the information used to access status information from the devices.
Figure 31B:
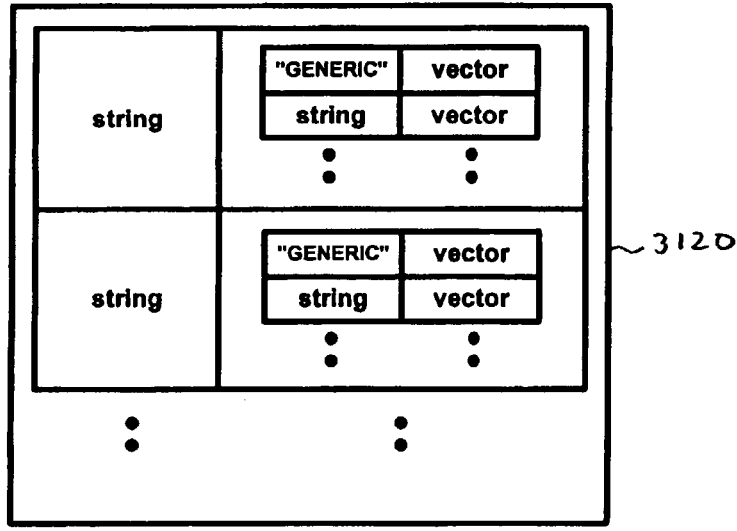

FIGS. 31A and 31B illustrate two data structures used by the CSNMPAccess class for storing support information obtained from objects in the SupportODBC Module 1114, similar to the data structures of FIGS. 30A and 30B used by CHTTPAccess. The first data structure 3110 contains Vendor as a key and a vector of models as a value in the map data structure. The second data structure 3120 contains the vendor and model information, including "GENERIC" in the key fields of map, and the vector SOIDinfoType, which contains the standard information and corresponding OID. The "GENERIC" string denotes the information common among all the devices. The status of a particular device through SNMP is obtained from three different sources: common information among all the devices, common information among devices from a particular vendor, and information specific to the vendor and the model. Some of the model information may not be in the SupportODBC Module 1114. If so, the first two sources are used. If the system does not support the vendor, only the first information source is used.

SNMP Module

The SNMP module 2202 is responsible for obtaining information about the network devices using SNMP. The devices contain information about the device. The SNMP module 2202 will access the information and extract the desired information using OID.

Figure 32:
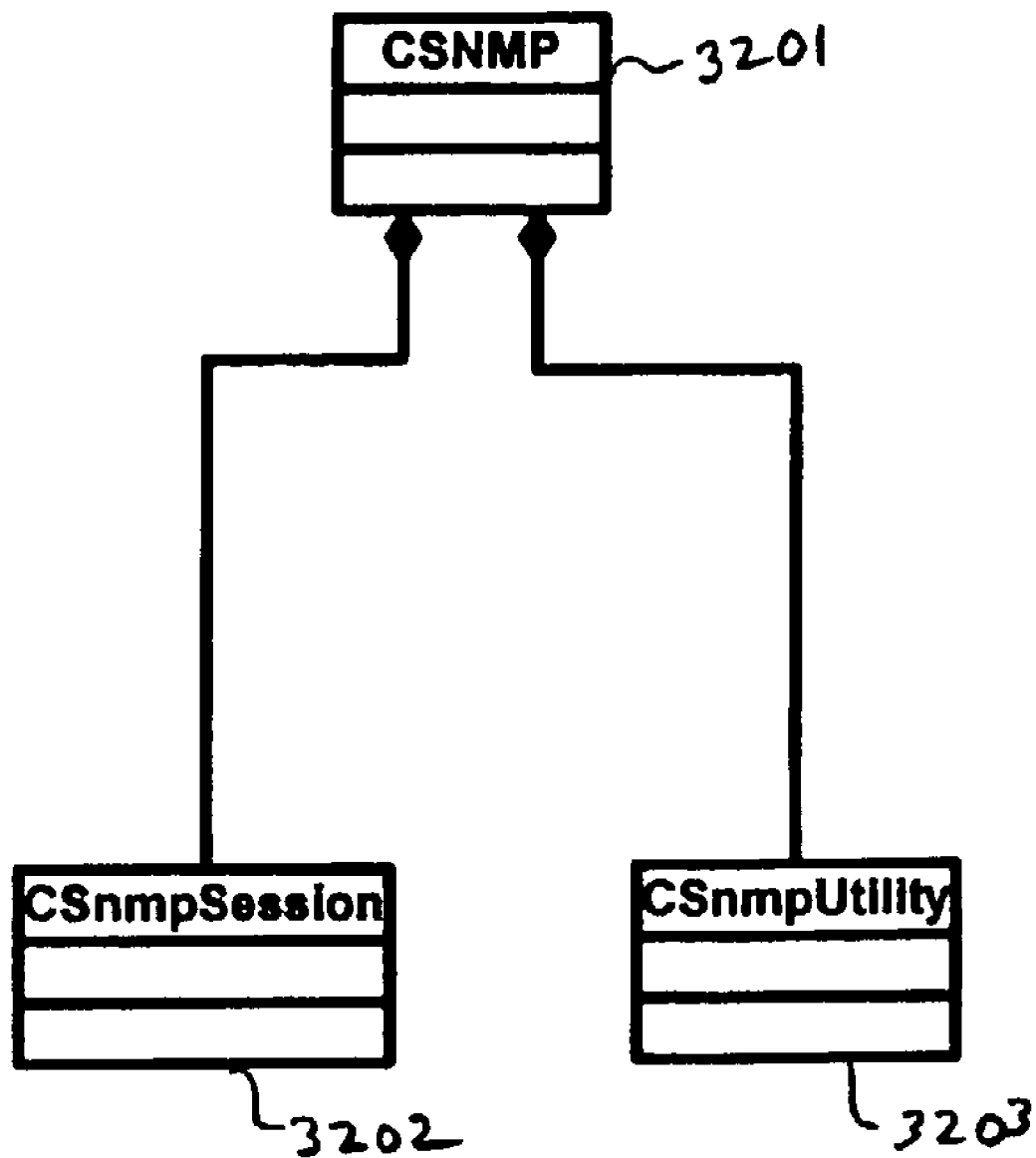
FIG. 32 shows the SNMP module class structure, which includes three classes used to obtain the information from devices through the SNMP protocol.

FIG. 32 illustrates the class structure of the SNMP Module 2202 (a sub-module of the HWAccess module 1116), which includes the CNSMP class 3201, the CSnmpSession class 3202, and the CSnmpUtility class 3203. The classes are used to obtain information from the monitored hardware devices through the SNMP protocol.

Figure 33A:
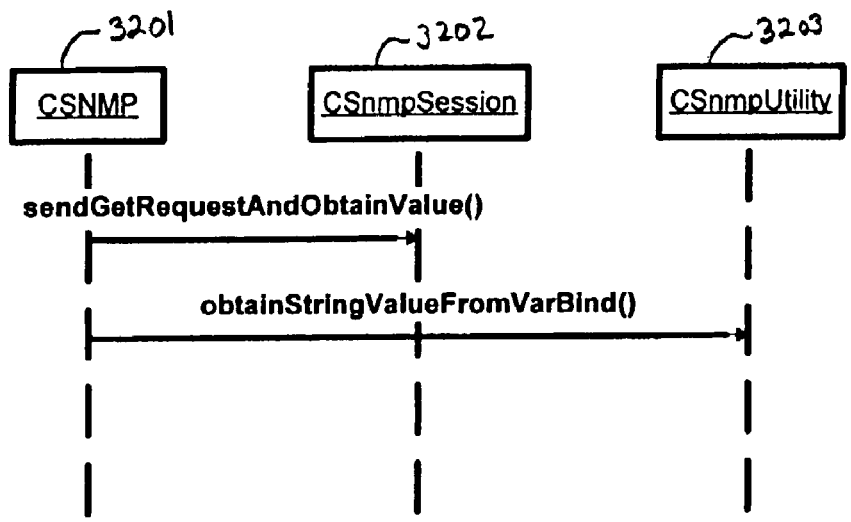
FIGS. 33A and 33B show the calling sequences for two CSNMP functions (obtainValueFromGetRequest and obtainValueFromGetNextRequest) used to get values for a given OID.

FIG. 33A shows the sequence associated with the function obtainValueFromGetRequest of the CSNMP class 3201 for getting the values for the given OID.

Figure 33B:
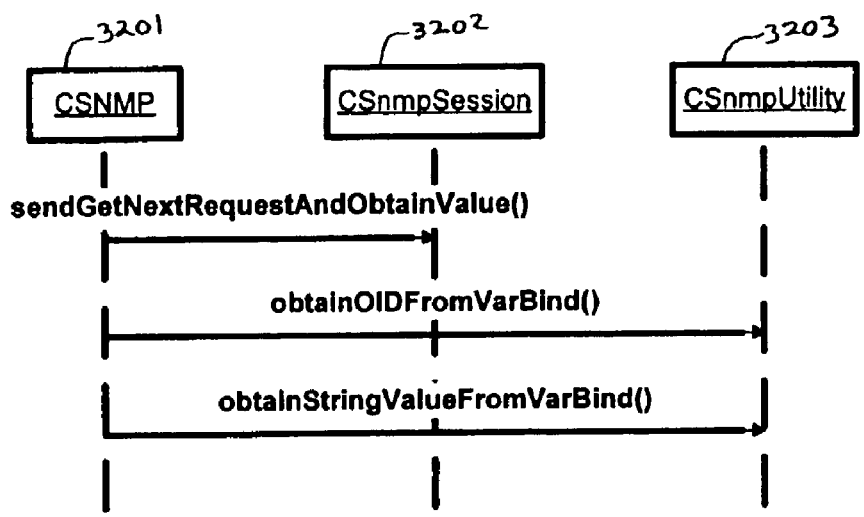

FIG. 33B shows the sequence associated with the function obtainValueFromGetNextRequest of the CSNMP class 3201 for getting the values for the given OID.

HTTP Module

The HTTP module 2203 is responsible for obtaining information about the network devices using HTTP. The monitored devices on the network may include a web server that contains HTML files. The HTTP Module 2203 will access the HTML files and extract the desired information from them. The HTTP Module 2203 is also responsible for obtaining the title of the home page of the HTML file(s).

Figure 34:
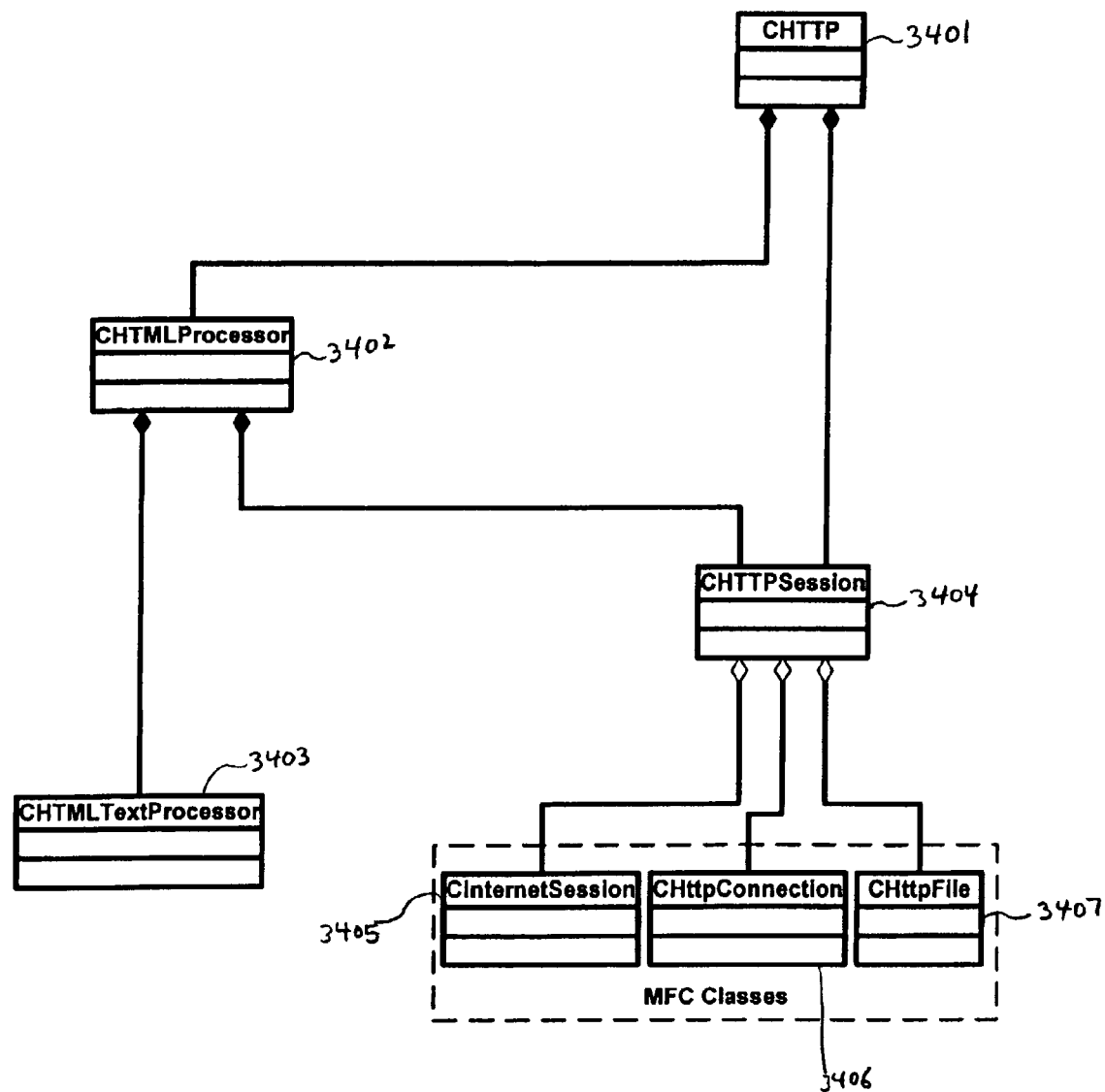
FIG. 34 shows the HTTP module class structure, including classes used to obtain information from devices through the HTTP protocol based on the HTML format.

FIG. 34 shows the class structure of the HTTP Module 2203 (a sub-module of the HWAccess Module 1116), which includes the CHTTP class 3401, the CHTMLProcessor class 3402, the CHTMLTextProcessor class 3403, the CHTTPSession class 3404, as well the three MFC classes CInternetSession 3405, CHttpConnection 3406, and CHttpFile 3407. These classes are used to obtain information from the monitored hardware devices through the HTTP protocol based upon the HTML format.

Figure 35A:
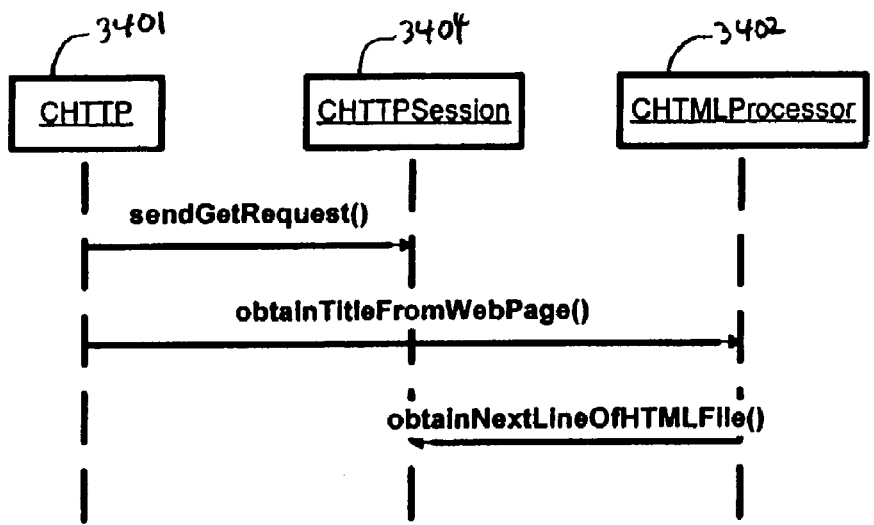
FIGS. 35A and 35B show the calling sequences for two CHTTP functions (obtainTitleFromHomePage and obtainDataFromHTMLFile) used to get information from HTML files associated with the devices.

FIG. 35A shows the sequence diagram associated with the obtainTitleFromHomePage function of the CHTTP class for getting information from HTML files.

Figure 35B:
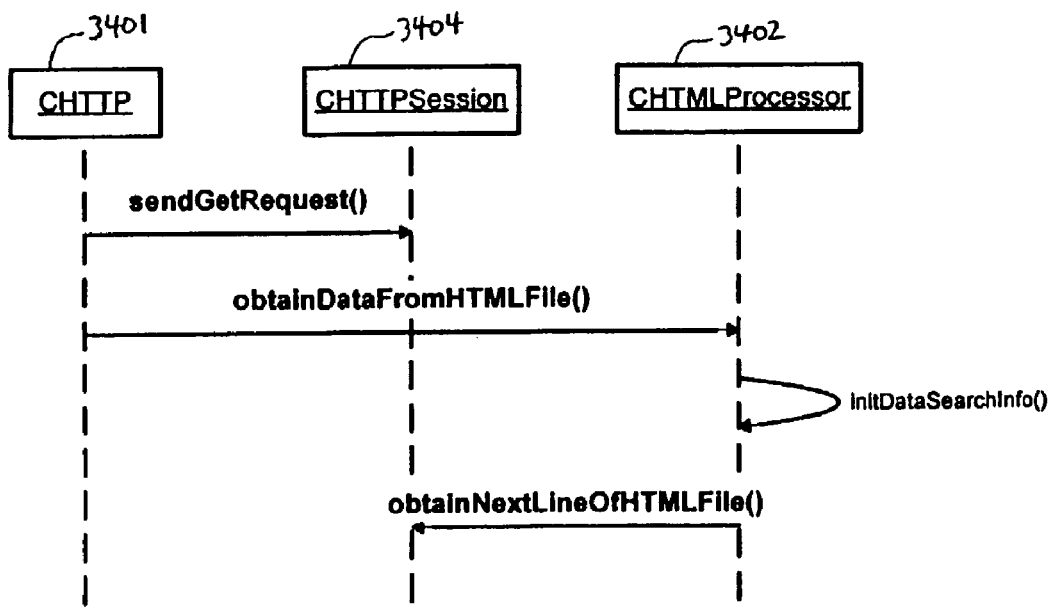

FIG. 35B shows the sequence diagram associated with-the obtainDataFromHTMLFile function of the CHTTP class for getting information from HTML files.

Figure 36:
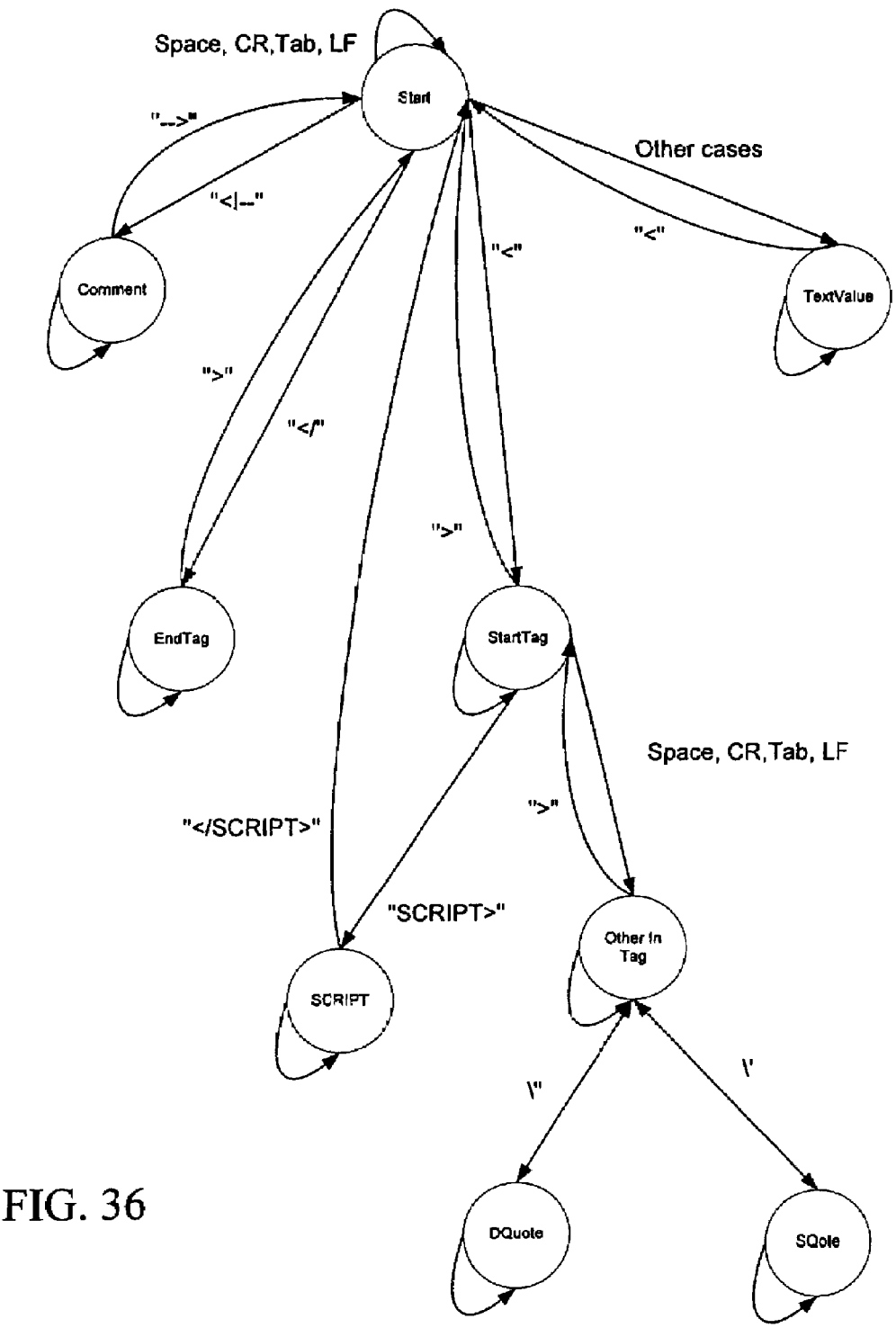
FIG. 36 illustrates the state transition diagram used to parse an HTML file in the CHTMLTextProcessor.

FIG. 36 shows the state transition used to parse an HTML data stream by functions associated with the CHTMLTextProcessor class. Note that FIG. 36 does not show general parsing of an HTML file, but rather parsing for getting the minimum necessary information from the HTML file to monitor the device. For example, SCRIPT and any attributes in the start tag are ignored. This parsing process is described in more detail below with regard to FIG. 41.

SupportODBC Module

Figure 37:
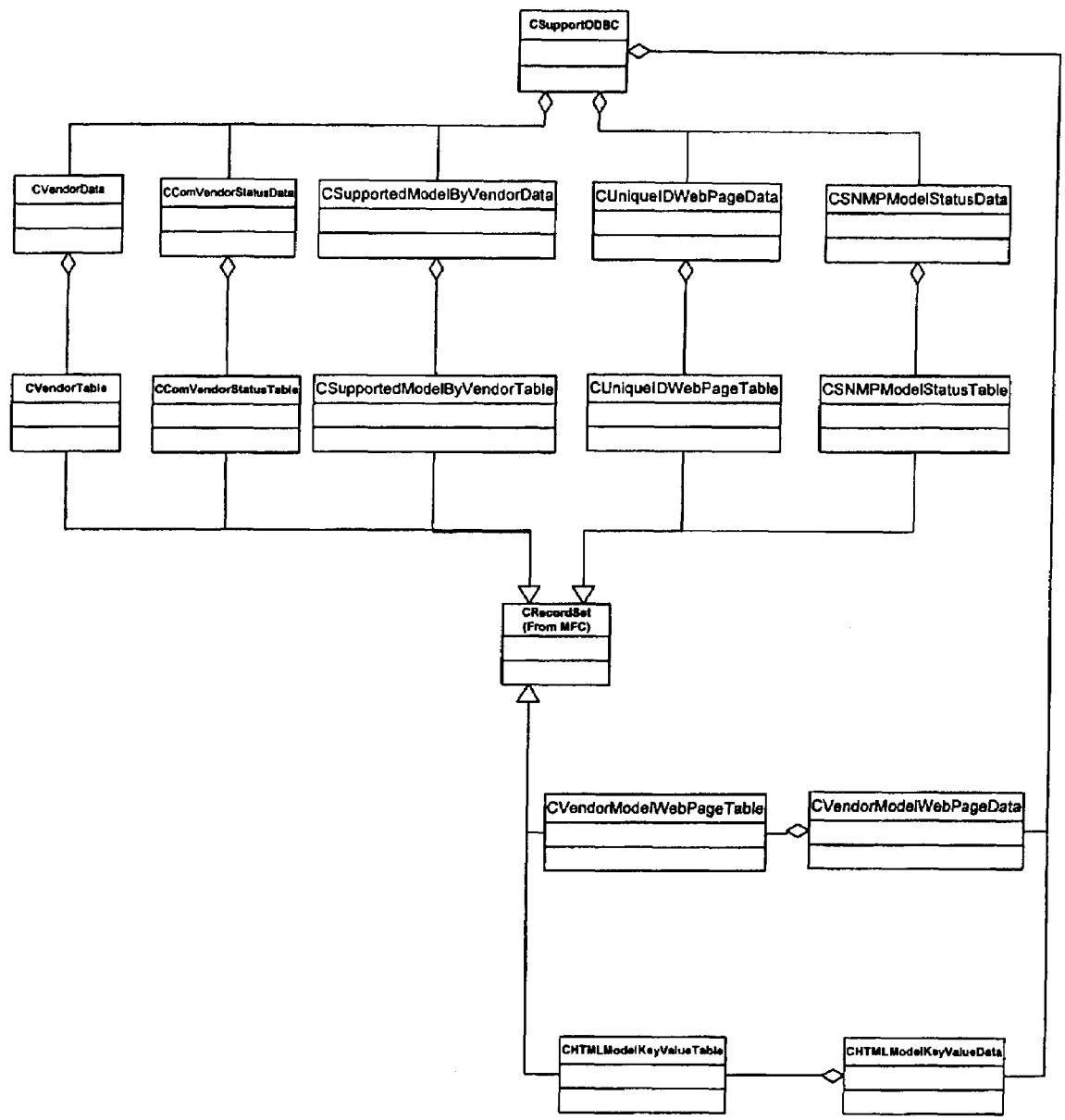
FIG. 37 illustrates the SupportODBC module class structure according to the present invention.

FIG. 37 shows the class structure of the SupportODBC module. Those classes ending with "Table" are derived from CRecord in the MFC to access the tables in the database shown above.

Figure 38:
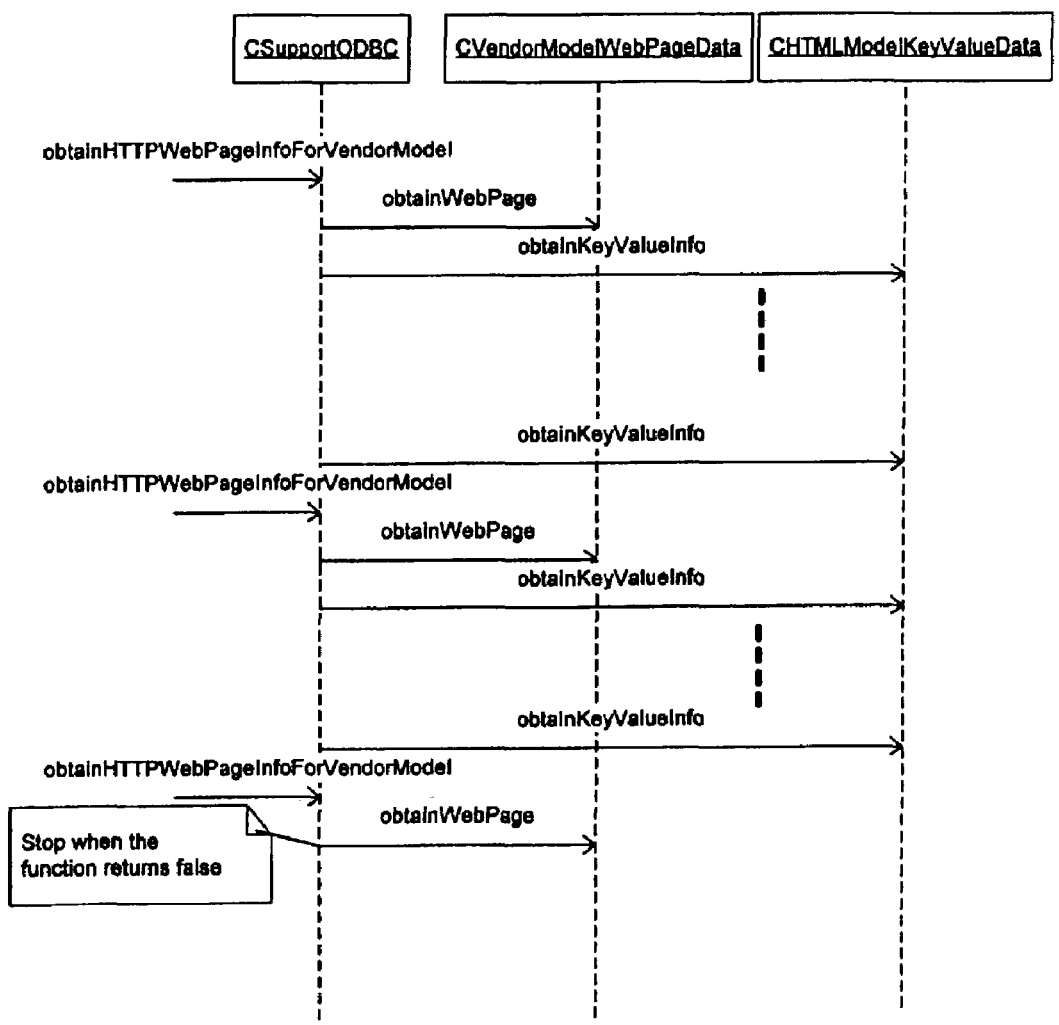
FIG. 38 shows a sequence diagram using the CSupportODBC function obtainHTTPWebPageInfoForVendorModel.

FIG. 38 shows the sequence diagram for the CSupportODBC function obtainHTTPWebPageInfoForVendorModel. Note that this function accesses two database tables.

Monitoring Methods

Figure 39:
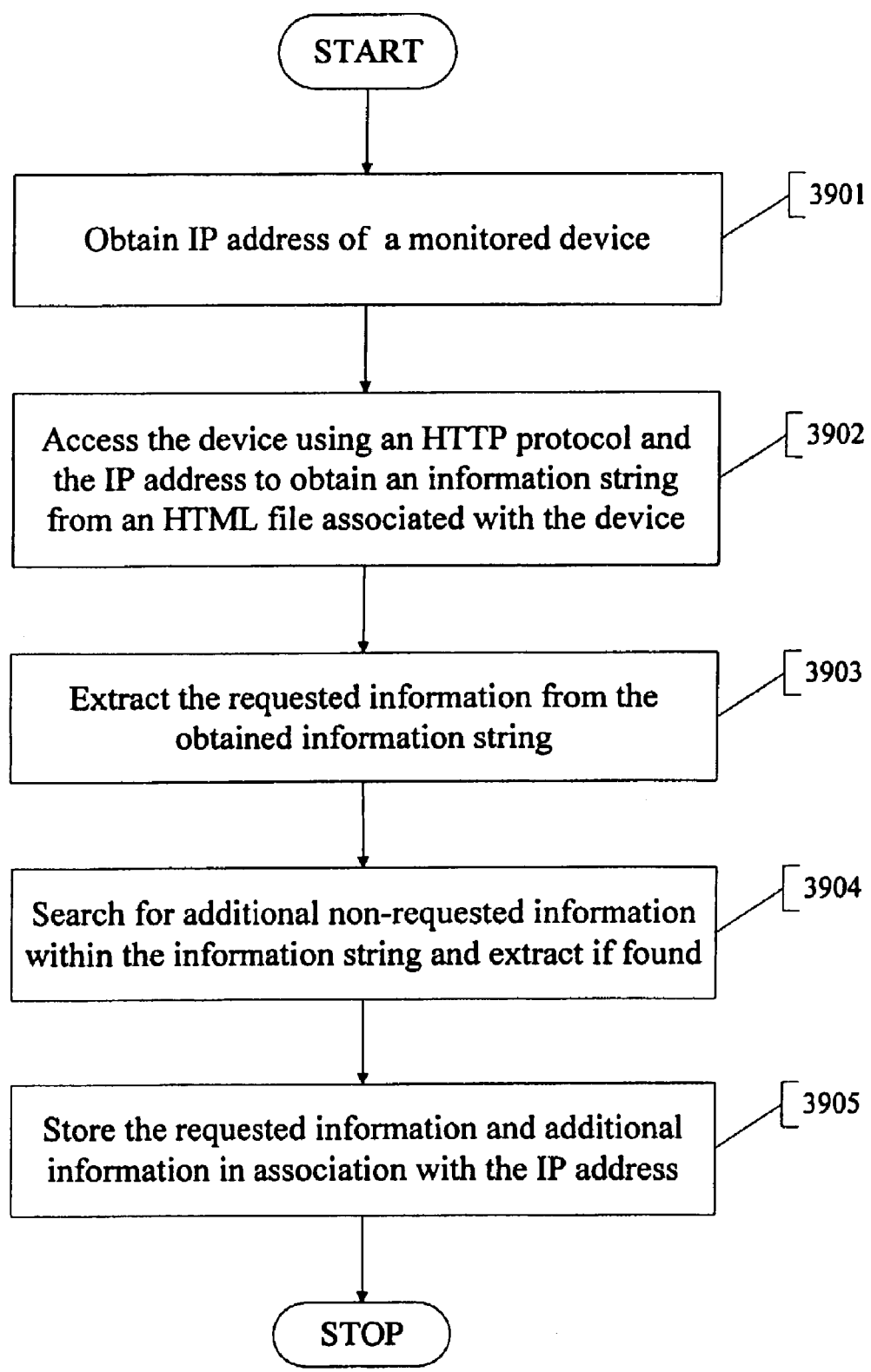
FIG. 39 is a flowchart of a method of extracting requested information associated with a remotely monitored device communicatively coupled to a network according to the present invention.

FIG. 39 illustrates a method of extracting requested information associated with a remotely monitored device communicatively coupled to a network according to the present invention. For example, the requested information might be information related to the vendor or model of the device. Moreover, for a particular device, additional, non-requested information may be readily obtainable when the requested information is extracted.

In step 3901, the IP address of the target device from which monitoring data is to be extracted is obtained. Typically, this information will be stored at least in the Support Database 1024 and is obtained by the SupportODBC module 1114.

In step 3902, the device is accessed using the HTTP protocol and the IP address to obtain an information string associated with the device. For example, the information string may be extracted from an HTML file that resides in memory on the device.

In step 3903, the information string is processed according to a predetermined method to extract the requested information related to the device, such as the vendor information. However, the obtained information string may also contain useful device information that was not specifically requested.

Accordingly, in step 3904, additional device information is searched for within the information string. For example, the model information is often found in the vicinity of the vendor information in an HTML file stored on the device. If the additional, non-requested information is located within the information string, that information is extracted.

Finally, in step 3905, the requested information and any additional device information extracted in steps 3903 and 3904 are cached in association with the IP address of the device. Accordingly, the additional information extracted will not have to be obtained at another time or with another communication protocol.

Figure 40:
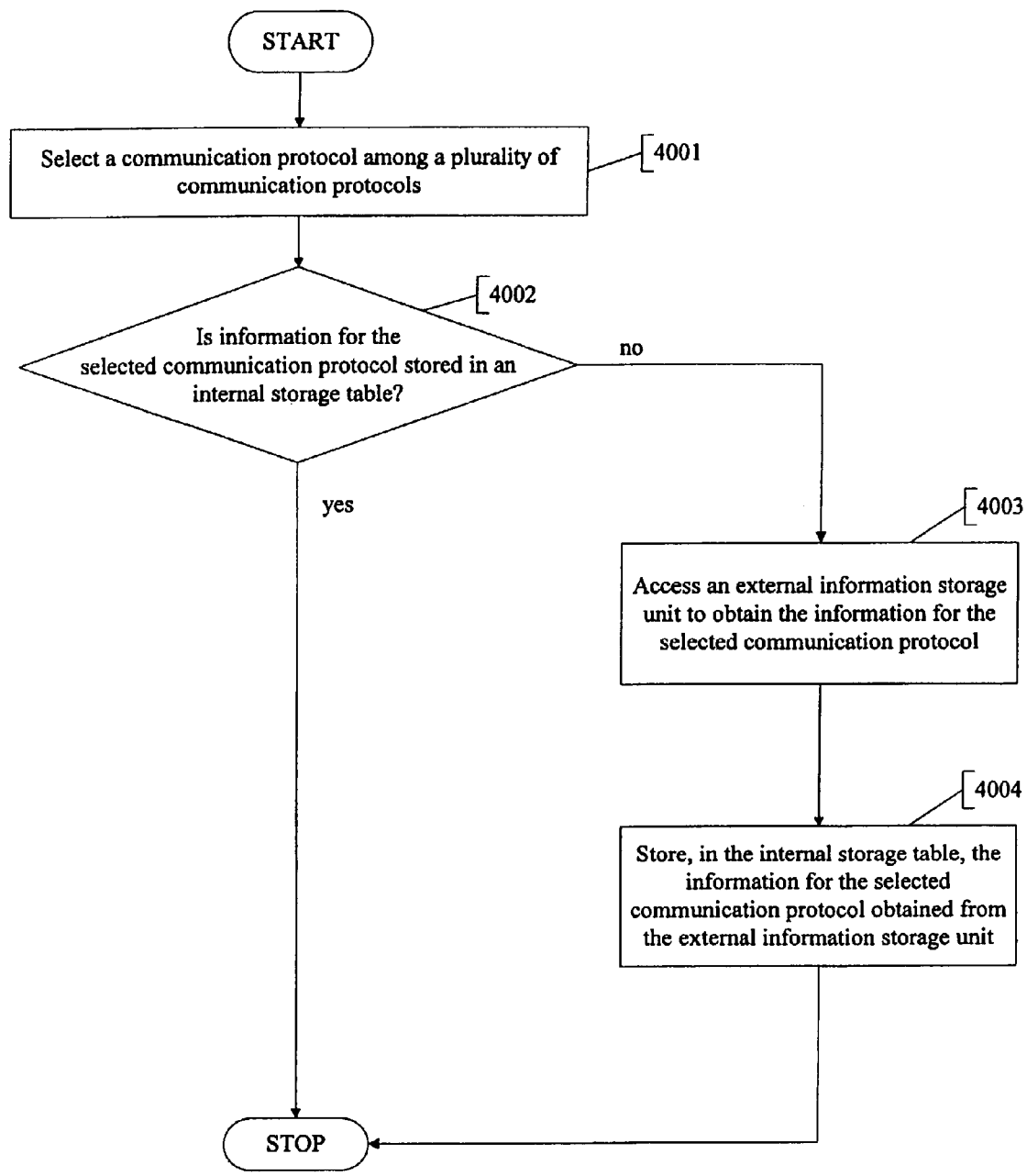
FIG. 40 is a flowchart of a method of efficiently storing information configured to be used by a plurality of communication protocols to extract status information related to a remotely monitored device among distinct devices communicatively coupled to a network according to the present invention.

FIG. 40 illustrates a method of efficiently storing information configured to be used by a plurality of communication protocols to extract status information related to a remotely monitored device among distinct devices communicatively coupled to a network, according to the present invention. In particular, the information needed to support the extraction of device information is stored by the HWaccess module based on protocol, vendor, and model information, rather than being stored by the Device module based on individual devices. The support information is stored in the data structures shown in FIGS. 30A, 30B, 31A and 31B. Moreover, the support information is extracted through SupportODBC and stored in these data structures at the time of initialization as vendor and model information are collected for the devices.

In step 4001, a communication protocol among the plurality of communication protocols (SNMP, HTTP, etc.) is selected to be used for accessing the device.

Next, in step 4002, an inquiry is made whether information needed to support the selected communication protocol to access a particular device is currently stored in an internal storage table, or only in the Support database 1024. If the answer to the inquiry of step 4002 is that the information needed to support the selected communication protocol is not stored in the internal storage table, steps 4003 and 4004 are executed. Otherwise, step 4005 is executed.

In step 4003, the information needed to support the selected communications protocol is obtained from the Support database 1024.

Finally, in step 4004, the information needed to support the selected communications protocol, which was obtained from the Support database 1024, is stored in the internal storage table, shown, for example, in FIGS. 30A, 30B, 31A, and 31B.

Figure 41:
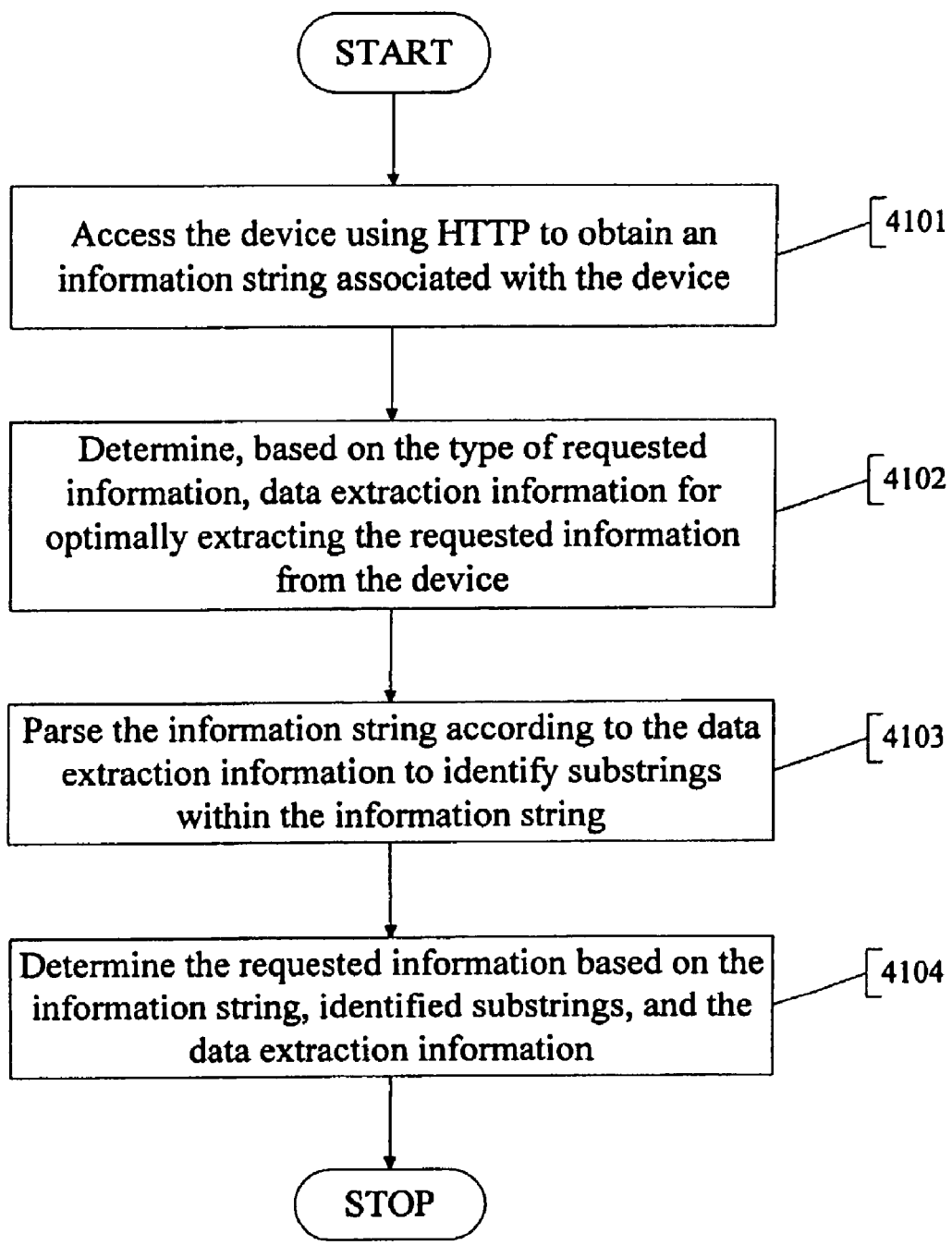
FIG. 41 is a flowchart of a method of parsing an information string to extract requested information related to a remotely monitored device communicatively coupled to a network according to the present invention.

FIG. 41 illustrates a method of parsing an information string to extract requested information related to a remotely monitored device communicatively coupled to a network, according to the present invention.

In step 4101, a particular device is accessed using an HTTP protocol to obtain an information string associated with the device. For example, the information string may be obtained from an HTML file stored on the device.

Next, in step 4102, based on a type of the requested information, data extraction information is determined for optimally extracting the requested information from the device. In a preferred embodiment, the data extraction information includes key word, type, and position information for optimally extracting the requested information from the device. For example, the data extraction information may include the information in the SKeyValueInfo data structure shown in FIG. 12A.

In step 4103, the obtained information string is parsed according to the data extraction information to identify various substrings within the information string. For example, HTML tags such as "</script" are extracted and identified in step 4103.

Finally, in step 4104, determining the requested information based on the information string, identified substrings, and the data extraction information. In this step, the requested information is extracted from the information string, based on the data extraction information and the identified substrings, using the methodology of a finite state machine, as shown in FIG. 36. For example, HTML script information may be ignored. Note that the search process of step 4104 is optimized through the use of the data extraction information (e.g., SKeyValueInfo), which serves as a map for extracting the requested information. See the related description of the data elements of FIG. 12A above.

Figure 42:
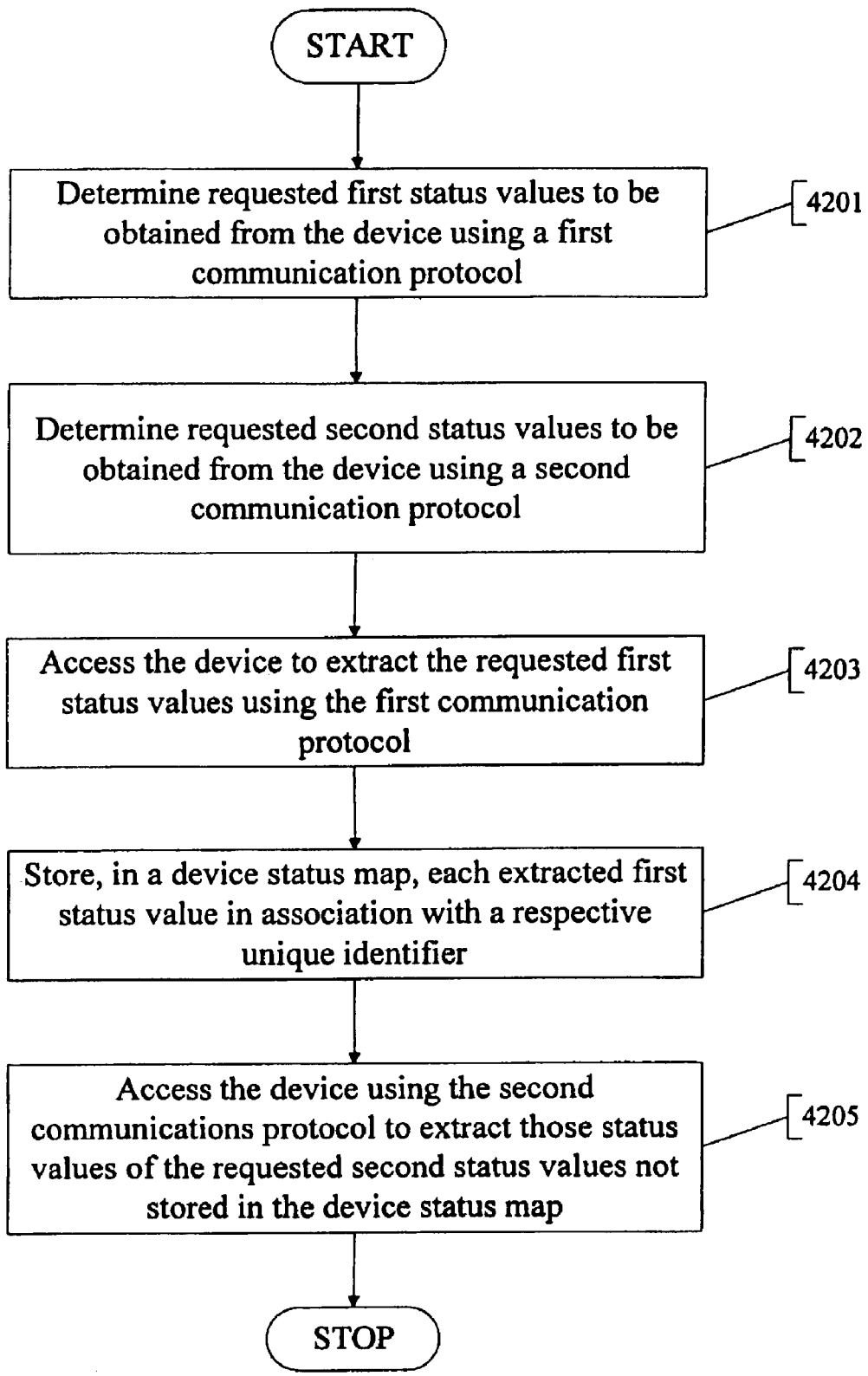
FIG. 42 is a flowchart of a method of efficiently extracting status information related to a remotely monitored device communicatively coupled to a network according to the present invention.

FIG. 42 illustrates a method of efficiently extracting status information related to a remotely monitored device communicatively coupled to a network, according to the present invention.

In step 4201, a first target list of status values to be obtained from the device using a first communication protocol (e.g., SNMP) is determined. Typically, this information is initially stored in the Support database 1024 and then stored in the data structures of FIGS. 31A and 31B.

Next, in step 4202, a second target list of status values to be obtained from the device using a second communication protocol (e.g., HTTP) is determined. Step 4202 is analogous to step 4201, but for a different protocol. Note that, for various reasons, the first and second target lists typically will not include the same status values to be extracted.

In step 4203, using methods described above, the monitored device is accessed using the first communication protocol to extract the status values on the first target list of status values.

Next, in step 4204, the status values obtained from the device in step 4203 are added to a device status map, which stores extracted status values in association with a respective predetermined unique identifier of infoType. Note that each identifier in the device status map for a particular device is protocol-independent.

Finally, in step 4205, the monitored device is accessed using the second communication protocol to extract those status values on the second target list of status values that are not already stored in the device status map. Thus, the second target list of status values must first be compared to the device status map to check for redundancies. Accordingly, resources are not wasted in attempting to extract status values already obtained using another communications protocol.

Although the present invention is shown to include a few devices, which require monitoring, connected to a network, it will be appreciated that any number of devices may be connected to the network without deviating from the spirit and scope of the invention. Also, the present invention may also be applied in a home environment wherein various devices need to be monitored and controlled.

The present invention enables the monitoring of the various devices in a multi-vendor environment and further facilitates retrieving and displaying detailed information in a user-comprehensible or user-friendly manner even without having specific private management information base (MIB) information.

The controller of the present invention may be conveniently implemented using a conventional general purpose digital computer or a microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product residing on a storage medium including instructions that can be used to program a computer to perform a process of the invention. The storage medium can include, but is not limited to, any type of disk including floppy disks, optical discs, CD-ROMs, and magneto-optical disks, ROMS, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of efficiently storing information configured to be used for a plurality of communication protocols to extract status information related to a remotely monitored device among distinct devices communicatively coupled to a network, comprising:

selecting a communication protocol among the plurality of communication protocols;

accessing the remotely monitored device to obtain a vendor name and a model name of the remotely monitored device by using the selected communication protocol;

determining whether information for extracting status information from the remotely monitored device using the selected communication protocol is stored in an internal storage table;

accessing an external information storage unit to obtain the information for extracting status information from the remotely monitored device using the selected communication protocol if the determining step determines that the information for extracting status information from the remotely monitored device using the selected communication protocol is not stored in the internal storage table; and storing, in the internal storage table, the information for extracting status information from the remotely monitored device using the selected communication protocol obtained from the external information storage unit, wherein the accessing the remotely monitored device to obtain the vendor name and the model name comprises:

determining that the selected communication protocol failed to obtain the vendor name of the remotely monitored device;

accessing the remotely monitored device to obtain the vendor name of the remotely monitored device by using another communication protocol and the information for accessing the device;

determining that the another communication protocol failed to obtain the vendor name of the remotely monitored device;

accessing the remotely monitored device to obtain a model name of the remotely monitored device by using one of the plurality of communication protocols and the information for accessing device;

determining that the one of the plurality of communication protocols failed to obtain the model name of the remotely monitored device; and accessing the remotely monitored device to obtain information that is common to all vendors and models from the remotely monitored device when the model name and vendor name of the remotely monitored device have not been obtained.

2. The method of claim 1, wherein the information for extracting status information comprises information to extract common information for each of the distinct devices communicatively coupled to the network.

3. The method of claim 1, wherein the information for extracting status information comprises information to extract common information for those devices, of the distinct devices, from a common vendor.

4. The method of claim 1, wherein the information for extracting status information comprises information to extract common information for those devices, of the distinct devices, having common vendor and model information.

5. The method of claim 1, wherein the selected communication protocol is one of an HTML/XML protocol and an SNMP protocol.

6. A system for efficiently storing information configured to be used for a plurality of communication protocols to extract status information related to a remotely monitored device among distinct devices communicatively coupled to a network, comprising:

an information storage unit configured to support a plurality of communication protocols, said information storage unit storing information used for a selected communication protocol among the plurality of communication protocols;

a storage table configured to store information for accessing the remotely monitored device using the plurality of communication protocols; and a processor configured to access the remotely monitored device to obtain a vendor name and a model name of the remotely monitored device by using the selected communication protocol, determine whether information for extracting status information from the remotely monitored device using the selected communication protocol is stored in the storage table, and to access the information storage unit to obtain the information for extracting status information from the remotely monitored device using the selected communication protocol if the processor determines that the information for extracting status information from the remotely monitored device using the selected communication protocol is not stored in the storage table, wherein the processor is configured to store the information for extracting status information from the remotely monitored device obtained from the information storage unit in the storage table, to determine that the selected communication protocol failed to obtain the vendor name of the remotely monitored device, to access the remotely monitored device to obtain the vendor name of the remotely monitored device by using another communication protocol and the information for accessing the device, to determine that the another communication protocol failed to obtain the vendor name of the remotely monitored device, to access the remotely monitored device to obtain a model name of the remotely monitored device by using one of the plurality of communication protocols and the information for accessing device, to determine that the one of the plurality of communication protocols failed to obtain the model name of the remotely monitored device, and to access the remotely monitored device to obtain information that is common to all vendors and models from the remotely monitored device when the model name and vendor name of the remotely monitored device have not been obtained.

7. The system of claim 6, wherein the information for extracting status information comprises information to extract common information for each of the distinct devices communicatively coupled to the network.

8. The system of claim 6, wherein the information for extracting status information comprises information to extract common information for those devices, of the distinct devices, from a common vendor.

9. The system of claim 6, wherein the information for extracting status information comprises information to extract common information for those devices, of the distinct devices, having common vendor and model information.

10. The system of claim 6, wherein the information storage unit is configured to store information used by the processor to access the device in an HTML/XML protocol, a SNMP protocol, or both of said protocols.

11. A computer readable storage medium encoded with instructions, which when executed by a computer, causes the computer to implement a method of efficiently storing information configured to be used for a plurality of communication protocols to extract status information related to a remotely monitored device among distinct devices communicatively coupled to a network, the method comprising:

selecting a communication protocol among the plurality of communication protocols;

accessing the remotely monitored device to obtain a vendor name and a model name of the remotely monitored device by using the selected communication protocol;

determining whether information for extracting status information from the remotely monitored device using the selected communication protocol is stored in an internal storage table;

accessing an external information storage unit to obtain the information for extracting status information from the remotely monitored device using the selected communication protocol if the determining step determines that the information for extracting status information from the remotely monitored device using the selected communication protocol is not stored in the internal storage table; and storing, in the internal storage table, the information for extracting status information from the remotely monitored device using the selected communication protocol obtained from the external information storage unit, wherein the accessing the remotely monitored device to obtain the vendor name and the model name comprises:

determining that the selected communication protocol failed to obtain the vendor name of the remotely monitored device;

accessing the remotely monitored device to obtain the vendor name of the remotely monitored device by using another communication protocol arid the information for accessing the device;

determining that the another communication protocol failed to obtain the vendor name of the remotely monitored device;

accessing the remotely monitored device to obtain a model name of the remotely monitored device by using one of the plurality of communication protocols and the information for accessing device;

determining that the one of the plurality of communication protocols failed to obtain the model name of the remotely monitored device; and accessing the remotely monitored device to obtain information that is common to all vendors and models from the remotely monitored device when the model name and vendor name of the remotely monitored device have not been obtained.

12. A system for efficiently storing information configured to be used for a plurality of communication protocols to extract status information related to a remotely monitored device among distinct devices communicatively coupled to a network, comprising:

means for selecting a communication protocol among the plurality of communication protocols;

means for accessing the remotely monitored device to obtain a vendor name and model name of the remotely monitored device by using the selected communication protocol;

means for determining whether information for extracting status information from the remotely monitored device using the selected communication protocol is stored in an internal storage table;

means for accessing an external information storage unit, to obtain the information for extracting status information from the remotely monitored device using the selected communication protocol if the means for determining determines that the information for extracting status information from the remotely monitored device using the selected communication protocol is not stored in the internal storage table; and means for storing, in the internal storage table, the information for extracting status information from the remotely monitored device using the selected communication protocol obtained from the external information storage unit, wherein the means for accessing the remotely monitored device to obtain the vendor name and the model name comprises:

means for determining that the selected communication protocol failed to obtain the vendor name of the remotely monitored device;

means for accessing the remotely monitored device to obtain the vendor name of the remotely monitored device by using another communication protocol and the information for accessing the device;

means for determining that the another communication protocol failed to obtain the vendor name of the remotely monitored device;

means for accessing the remotely monitored device to obtain a model name of the remotely monitored device by using one of the plurality of communication protocols and the information for accessing device;

means for determining that the one of the plurality of communication protocols failed to obtain the model name of the remotely monitored device; and means for accessing the remotely monitored device to obtain information that is common to all vendors and models from the remotely monitored device when the model name and vendor name of the remotely monitored device have not been obtained.

13. The method of claim 1, further comprising:

accessing the remotely monitored device and using the vendor name of the remotely monitored device and the model name of the remotely monitored device to obtain the status information from the remotely monitored device.

14. The system of claim 6, wherein the processor is configured to access the remotely monitored device and use the vendor name of the remotely monitored device and the model name of the remotely monitored device to obtain the status information from the remotely monitored device.

15. The computer readable storage medium of claim 11, wherein the method further comprises:

accessing the remotely monitored device and using the vendor name of the device and the model name of the device to obtain the status information from the device.

16. The system of claim 12, further comprising a means for accessing the device and using the vendor name of the device and the model name of the device to obtain the status information from the device.

17. A method of efficiently storing information configured to be used for a plurality of communication protocols to extract status information related to a remotely monitored device among distinct devices communicatively coupled to a network, comprising:

selecting a communication protocol among the plurality of communication protocols;

accessing the remotely monitored device to obtain a vendor name and a model name of the remotely monitored device by using the selected communication protocol;

determining whether information for extracting status information from the remotely monitored device using the selected communication protocol is stored in an internal storage table;

accessing an external information storage unit to obtain the information for extracting status information from the remotely monitored device using the selected communication protocol if the determining step determines that the information for extracting status information from the remotely monitored device using the selected communication protocol is not stored in the internal storage table; and storing, in the internal storage table, the information for extracting status information from the remotely monitored device using the selected communication protocol obtained from the external information storage unit, wherein the accessing the remotely monitored device to obtain the vendor name and the model name comprises:

determining that the selected communication protocol failed to obtain the vendor name of the remotely monitored device;

accessing the remotely monitored device to obtain the vendor name of the remotely monitored device by using another communication protocol and the information for accessing the device;

determining that the another communication protocol obtained the vendor name of the remotely monitored device;

accessing the remotely monitored device to obtain a model name of the remotely monitored device by using one of the plurality of communication protocols and the information for accessing device;

determining that the one of the plurality of communication protocols failed to obtain the model name of the remotely monitored device; and accessing the remotely monitored to obtain information that is specific to the obtained vendor name and independent of the model name from the remotely monitored device when the model name is not obtained and the vendor name is obtained.

* * * * *